(12) United States Patent
Fujisawa et al.

(10) Patent No.: US 8,477,267 B2
(45) Date of Patent: Jul. 2, 2013

(54) LIGHT-CONDENSING FILM, LIQUID-CRYSTAL PANEL AND BACKLIGHT AS WELL AS MANUFACTURING PROCESS FOR LIGHT-CONDENSING FILM

(75) Inventors: Katsuya Fujisawa, Ibaraki (JP); Tokuo Ikari, Ibaraki (JP); Kazuo Genda, Tokyo (JP); Atsushi Kumano, Tokyo (JP); Noboru Oshima, Tokyo (JP); Yoshiki Matsuoka, Ehime (JP); Toshimasa Eguchi, Tokyo (JP); Shigenori Yamaoka, Tokyo (JP); Yoshiyuki Ono, Chiba (JP); Hisatomo Yonehara, Chiba (JP); Tatsumi Takahashi, Tokyo (JP); Motoyuki Suzuki, Shiga (JP); Akimitsu Tsukuda, Shiga (JP); Norimasa Sekine, Tokyo (JP); Kazushige Takechi, Tokyo (JP); Ken Sumiyoshi, Tokyo (JP); Ichiro Fujieda, Tokyo (JP); Yasuo Tsuruoka, Ibaraki (JP)

(73) Assignees: Kuraray Co., Ltd., Okayama (JP); Konica Minolta Holdings, Inc., Tokyo (JP); JSR Corporation, Tokyo (JP); Sumitomo Chemical Company Limited, Tokyo (JP); Sumitomo Bakelite Co., Ltd., Tokyo (JP); Dainippon Ink and Chemicals, Inc., Tokyo (JP); Dai Nippon Printing Co., Ltd., Tokyo (JP); Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 12/939,407

(22) Filed: Nov. 4, 2010

(65) Prior Publication Data

US 2011/0126975 A1 Jun. 2, 2011

Related U.S. Application Data

(62) Division of application No. 10/571,543, filed as application No. PCT/JP2004/018250 on Dec. 8, 2004, now Pat. No. 7,852,435.

(30) Foreign Application Priority Data

Jul. 16, 2004 (JP) .................................. 2004-209783

(51) Int. Cl.
*G02F 1/1335* (2006.01)
(52) U.S. Cl.
USPC ............................................. 349/95; 349/112
(58) Field of Classification Search
None
See application file for complete search history.

(56) References Cited

U.S. PATENT DOCUMENTS 5,555,109 A 9/1996 Zimmerman et al.
5,949,506 A 9/1999 Jones et al.
(Continued)

FOREIGN PATENT DOCUMENTS

CN 1493891 5/2004
JP 54-126559 10/1979
(Continued)

OTHER PUBLICATIONS

International Search Report dated Mar. 22, 2005, from corresponding International Application No. PCT/JP2004/018250.
(Continued)

*Primary Examiner* — Lucy Chien
(74) *Attorney, Agent, or Firm* — Katten Muchin Rosenman LLP

(57) ABSTRACT

A conventional liquid crystal display comprises a number of components, so that a manufacturing cost cannot be reduced. Furthermore, a large-area substrate has problems in shipping. According to this invention, a liquid-crystal panel is prepared by forming individual optically functional films, a TFT device and a light-emitting device on a long thin film and then laminating the film by a transfer process. A base film to be a substrate in a liquid-crystal panel preferably has a thickness of 10 μm to 200 μm, a curvature radius of 40 mm or less as a measure of flexibility and a coefficient of thermal expansion of 50 ppm/° C. or less. Furthermore, it more preferably gives a variation of ±5% or less in mechanical and optical properties to a thermal history at 200° C.

2 Claims, 35 Drawing Sheets

U.S. PATENT DOCUMENTS

| | | | |
|---|---|---|---|
| 6,124,906 | A | 9/2000 | Kawada et al. |
| 6,331,882 | B1 * | 12/2001 | Shimodaira et al. .......... 349/122 |
| 6,545,827 | B1 | 4/2003 | Okabe et al. |
| 6,995,907 | B2 | 2/2006 | Osawa et al. |
| 2002/0015314 | A1 * | 2/2002 | Umemoto et al. ............ 362/561 |
| 2002/0122257 | A1 * | 9/2002 | Suga et al. ................... 359/580 |
| 2002/0167725 | A1 | 11/2002 | Goto |
| 2002/0172030 | A1 | 11/2002 | Matsumoto et al. |
| 2003/0128313 | A1 | 7/2003 | Kaminsky et al. |
| 2003/0214804 | A1 | 11/2003 | Irie |
| 2004/0160669 | A1 | 8/2004 | Osawa et al. |
| 2007/0009674 | A1 | 1/2007 | Okubo et al. |

FOREIGN PATENT DOCUMENTS

| | | |
|---|---|---|
| JP | 62-150218 | 7/1987 |
| JP | 63-283934 | 11/1988 |
| JP | 7-318707 | 12/1995 |
| JP | 2000-29034 | 1/2000 |
| JP | 2000-352608 | 12/2000 |
| JP | 2001-312913 | 11/2001 |
| JP | 2002-62524 | 2/2002 |
| JP | 2002-69210 | 3/2002 |
| JP | 2002-90919 | 3/2002 |
| JP | 2002-98957 | 4/2002 |
| JP | 2002-148607 | 5/2002 |
| JP | 2002-358024 | 12/2002 |
| JP | 2003-66230 | 3/2003 |
| JP | 2003-232921 | 8/2003 |
| JP | 2004-110002 | 4/2004 |
| JP | 2004-151592 | 5/2004 |
| JP | 2005-259672 | 9/2005 |

OTHER PUBLICATIONS

Japanese Office Action dated Feb. 10, 2006, from corresponding Japanese Application No. 2004-209783.

International Preliminary Report on Patentability and Written Opinion of the International Searching Authority dated Jan. 16, 2007, from corresponding International Application No. PCT/JP/2004/018250.

United States Office Action dated Jul. 7, 2009, from corresponding U.S. Appl. No. 10/571,543.

United States Office Action dated Feb. 16, 2010, from corresponding U.S. Appl. No. 10/571,543.

United States Advisory Action dated Jun. 1, 2010, from corresponding U.S. Appl. No. 10/571,543.

Supplementary European Search Report dated Nov. 21, 2012, from corresponding European Application No. 04 82 2207.9.

* cited by examiner

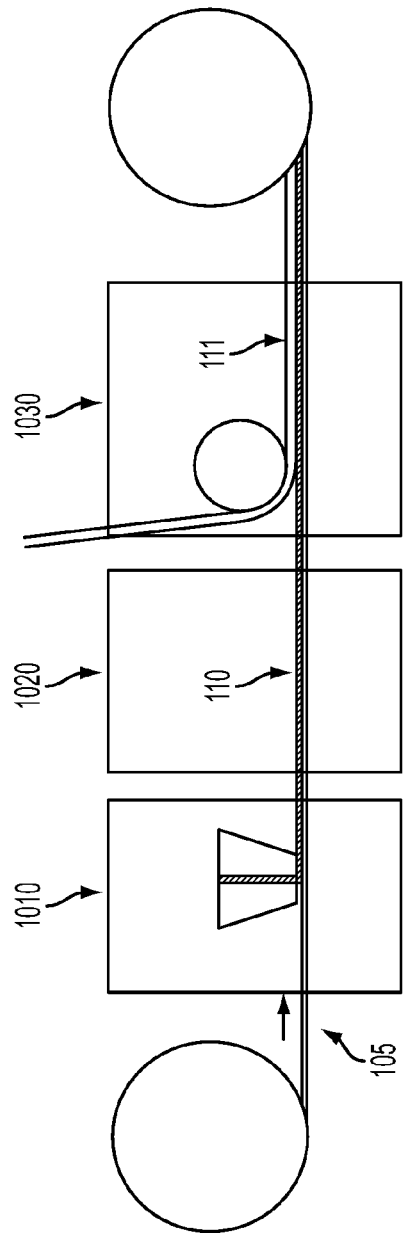
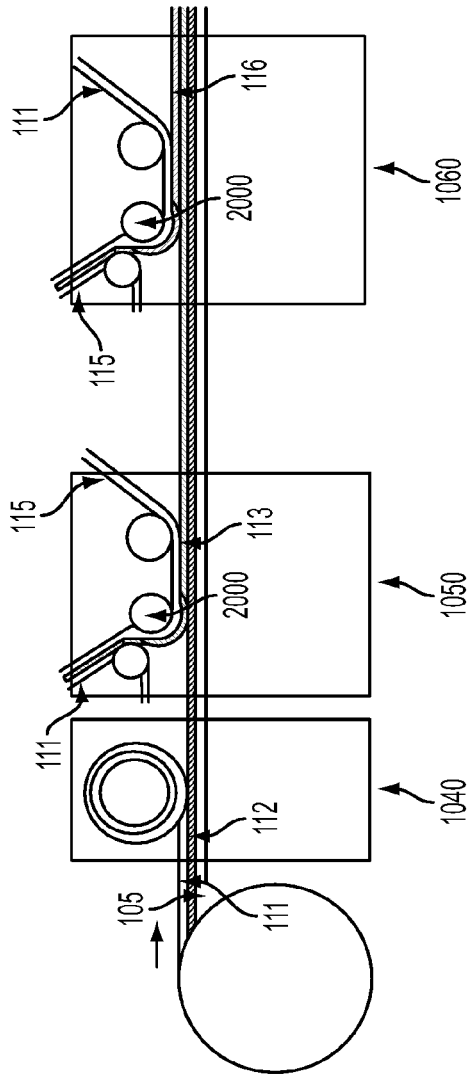

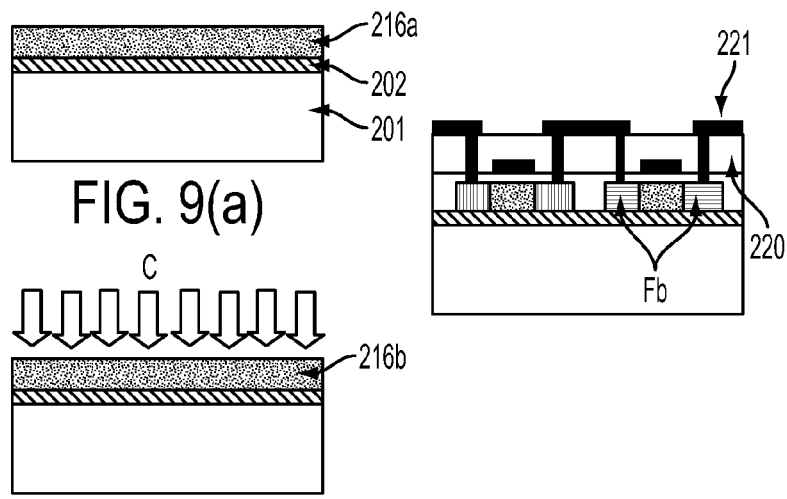
FIG. 9(a)
FIG. 9(b)
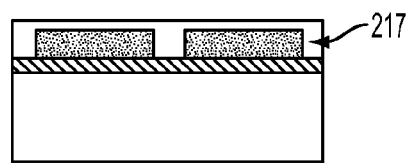
FIG. 9(c)
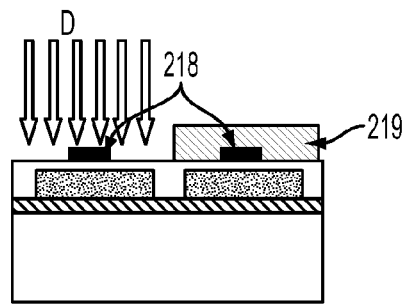
FIG. 9(d)
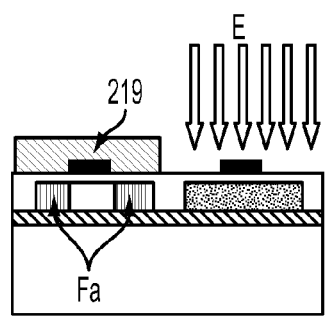
FIG. 9(e)

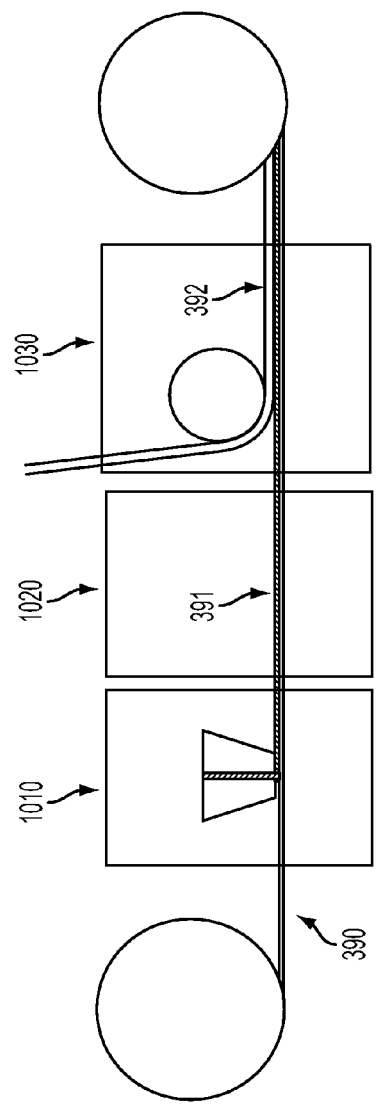
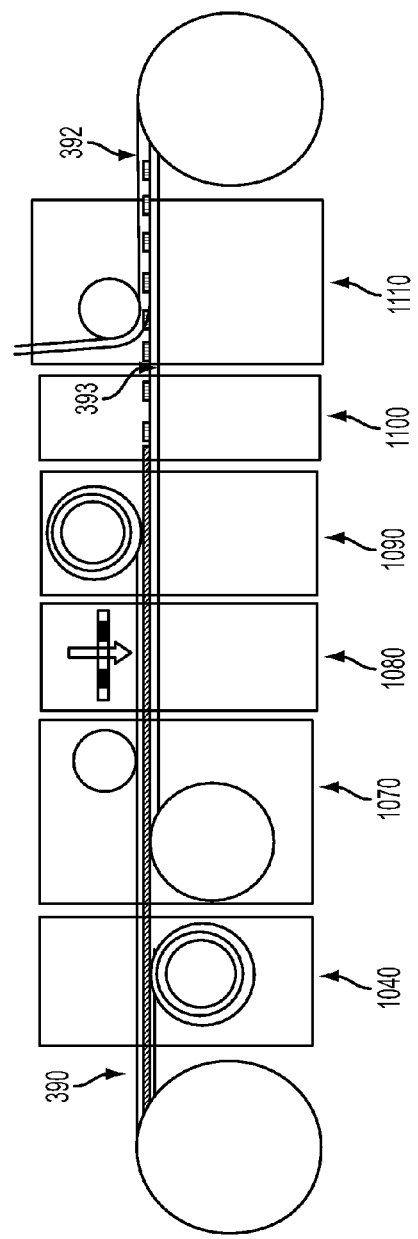

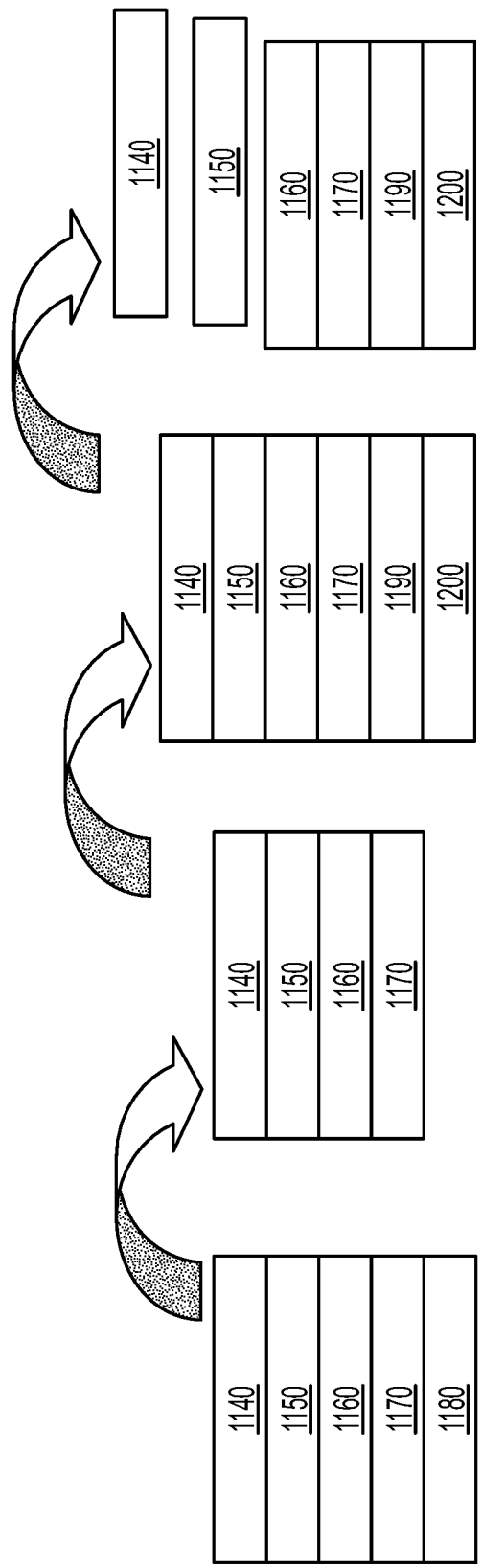

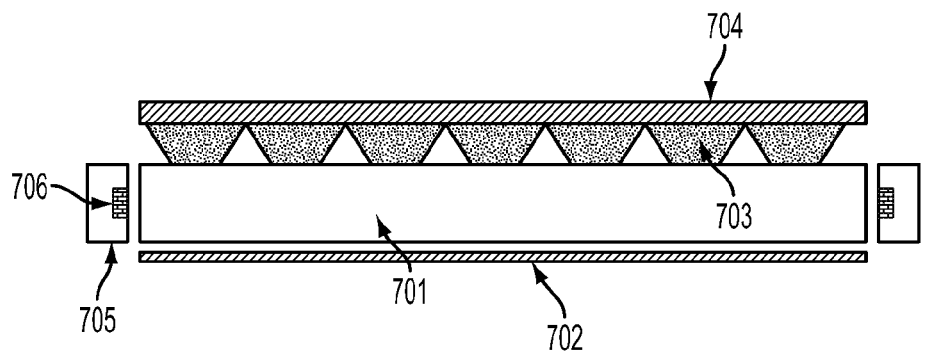
FIG. 30(a)
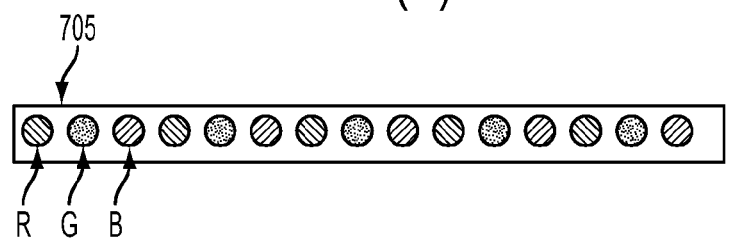
FIG. 30(b)
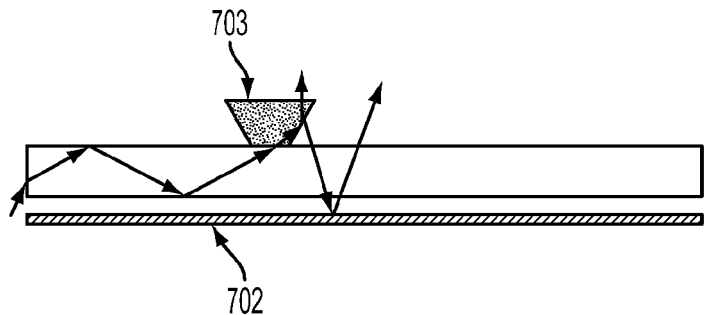
FIG. 30(c)
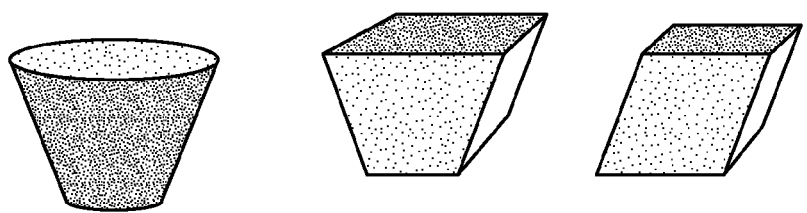
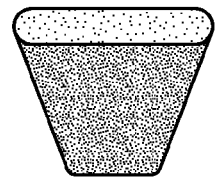
FIG. 31

LIGHT-CONDENSING FILM, LIQUID-CRYSTAL PANEL AND BACKLIGHT AS WELL AS MANUFACTURING PROCESS FOR LIGHT-CONDENSING FILM

TECHNICAL FIELD

This invention relates to a light-condensing film, a liquid-crystal panel and a backlight as well as a manufacturing process for a light-condensing film.

BACKGROUND ART

As an information society has been recently developed, an indoor stationary type of imaging apparatus has been required to have a larger display while for a mobile type apparatus, it has become essential that it can be used in both dark and bright places. Furthermore, weight reduction has been required for both types. As a result, a conventional CRT (Cathode Ray Tube) display has been replaced by a flat display.

Application of information devices have been expanded from indoor stationary types to mobile types. In contrast to stationary types, mobile type information devices are used in various situations. Stationary type devices are required to have a larger display and exhibit higher brightness and a wide viewing angle. Mobile type devices are required to exhibit stable visibility in both dark and bright places and improved impact resistance such as drop-impact resistance because they are used in a wide variety of situations.

Known flat displays include a plasma display, a liquid crystal display and an organic EL display (Organic Light Emitted Display). A plasma display is not suitable for a mobile device because it requires a high voltage from its operation principle, while a liquid crystal display and an organic EL display which can be operated with low power consumption are suitable for a mobile device.

A plasma display has been ahead as a large display because of its higher brightness and wide viewing angle. However, a liquid crystal display can be reduction in weight and, as a plasma display, large-sized. Thus, the liquid crystal display has been recently large-sized as a plasma display.

Meanwhile, in terms of a mobile device, a plasma display is not suitable for a mobile device because it requires a high voltage from its principle of operation, while a liquid crystal display and an organic EL display which can be operated with low power consumption are suitable for a mobile device.

Although liquid crystal displays prevail at present, it is expected that organic EL displays will be increased because of their clear picture.

Organic EL displays and liquid crystal displays are classified into "active driving types" where each pixel is equipped with an active device for driving, and "simple matrix types" where a pixel is driven by two groups of orthogonal electrodes. An active driving type can drastically reduce a response time in comparison with a simple matrix type, allowing a number of pixels to be used for movie displaying. Furthermore, it can more precisely control image-quality factors such as contrast and gradation, allowing a movie to be displayed in a quality comparable to a CRT. As a result, an "active driving type" is now a dominant driving system.

While a CRT or an organic EL display is a self-luminous type, a liquid crystal display develops colors using a transmitted or reflected light. Liquid crystal displays can be classified into three groups, i.e., transmission, reflection and semi-transmissive types, in which a pixel electrode transmits, reflects or partially transmits and partially reflects a light, respectively.

When a device is exclusively for indoor use as a stationary type, an image is clear in a transmissive liquid crystal display or an organic EL display. However, image contrast is deteriorated in an outdoor area which is brighter than emission intensity of natural light, leading to an obscure image. When a light source is intensified for preventing contrast deterioration outside, dazzling occurs in an indoor image and power consumption is increased.

In contrast, a reflective liquid crystal display has an advantage of higher outdoor visibility because it reflects an outside light to display an image, but has a drawback that an image is obscure in a dark place. Although the problem can be improved by incorporating a front light, a front light has a drawback that it cannot evenly illuminate the whole display even for a small display as in a mobile device.

There is a semi-transmissive liquid crystal display as a liquid crystal display with advantages of the transmission and the reflective types. A semi-transmissive liquid crystal display utilizes both backlight and outside light for displaying, by making a pixel electrode semi-transparence or forming an opening, ensuring visibility in both outdoor and indoor places. In most of mobile information terminals, semi-transmissive liquid-crystal panels are used at present.

However, an image in a semi-transmissive liquid crystal display is inferior to that in a transmissive liquid crystal display or organic EL display in a dark place and inferior to that in a reflective liquid crystal display in a bright place. Therefore, it is necessary to further improve image quality for using it as a mobile information terminal.

Furthermore, displays are used in a wide variety of private and commercial applications including information terminals such as mobile devices, e.g., a cell phone and a PDA (Personal Digital Assistant), digital cameras and digital video cameras, which are used in various places. Thus, such display apparatus are required to be robust.

Properties needed in a display panel for a mobile device include, in addition to image quality described above, a display size, panel thinness and power consumption.

Robustness leads to a thinner panel. Furthermore, it is necessary to use a substrate resistant to impact. In terms of a thickness of a panel, an organic EL display can be thinned to a thickness of one substrate in principle. In contrast, for a liquid crystal display panel, a reflective liquid crystal display can be thinned to a thickness of two substrates, while a transmission/semi-transmission type liquid crystal display inevitably becomes thicker because it requires a backlight.

There will be discussed factors other than image quality, including an overall dimension, a weight, robustness, power consumption and a price. In terms of an overall dimension and a weight, an organic EL display is overwhelmingly advantageous, which does not need a light source such as a backlight. It can be theoretically thinned and weight-reduced substantially to a level of one supporting substrate by effective sealing technique. Without incorporating an auxiliary light source, a reflective liquid crystal display panel can be thinned and weight-reduced to a level of two supporting substrates. However, it is still less advantageous in comparison with an organic EL display.

These devices exhibit substantially equivalent robustness as long as the same substrate is used. A reflective liquid crystal display is advantageous in terms of power consumption. However, when it is equipped with an auxiliary light source, it is comparable to a transmissive liquid crystal display or organic EL display.

In a semi-transmissive liquid crystal display, power consumption can be reduced in a bright place by turning a backlight off. Furthermore, a liquid crystal display has a longer history of commercial production than an organic. EL display, and therefore more advantageous in terms of a price.

In a liquid crystal display with the best performance, visibly perceptible fineness and the number of colors have substantially reached the upper limit. Further improvement in image quality is, therefore, insignificant. Thus, current research activities have been also focused on improvement performance factors other than image quality.

For example, by low-temperature polysilicon thin-film transistor (poly-Si TFT) technique, an electronic circuit which has been conventionally provided as an external device can be integrated on a glass substrate. Thus, in a liquid crystal display, the number of parts has been reduced, a frame has been narrowed and power consumption has been reduced. Studies on a liquid crystal display comprising a plastic substrate in place of a conventional glass substrate have been conducted, pursuing film thinning, weight-reduction and toughness to falling.

An organic EL display may be more promising than a liquid crystal display in terms of thinness, weight reduction and higher visibility, and thus have been studied for improvement in emission efficiency and a life.

As described above, a plasma display, a transmissive liquid crystal display or an organic EL display are suitable for stationary applications while a semi-transmissive liquid crystal display is suitable for mobile applications.

In the light of suitability for both stationary and mobile applications, it can be found that a liquid crystal display has advantages which a plasma display or organic EL display does not have.

FIG. 27 shows a cross-sectional view of a conventional semi-transmissive liquid crystal display panel. A liquid-crystal panel has a configuration that a liquid crystal is sandwiched by two substrates as shown in the upper par of FIG. 27. On one side of one glass substrate 312, there are regularly arranged pixels comprising a thin-film transistor 311 and a pixel electrode 310, and there is formed an interconnection for transferring a signal for driving the thin-film transistor 311. The pixel electrode 310 is designed to have a transmittance of 30 to 70%; often a transmittance of 70%.

On one side of the other glass substrate 304, there is arranged a color filter 305. The color filter (CF) 305 and a black matrix (BM) are disposed, facing a pixel electrode and a border between pixel electrodes, respectively, and covered by a transparent electrode 307. On the surfaces of these two substrates, there are formed oriented films 307, 309, respectively, for orienting a liquid crystal to a desired direction. These two substrates are fixed by a sealing material B disposed on the periphery of the substrates. A liquid crystal fills the space between these two substrates.

On the outer surfaces of each of these two substrates sandwiching the liquid crystal, there is attached a film substrate having various optical functions. In this figure, two film substrates, i.e., a polarizing plate (linear polarizing plate) 302, 314 and a retardation film (¼ wavelength plate) 303, 313, are laminated for converting an incident light into a circularly-polarized light. Furthermore, there is provided an antireflective plate 301 for preventing reflection of an outside light.

When applying the sealing material B, an opening is left for later injecting a liquid crystal. Spacers corresponding to a given space distance (for example, about 6 μm) are distributed for maintaining the given distance between these two substrates. The spacers are considerably smaller than a pixel electrode. After firing them under a certain load, a liquid crystal is injected from the opening in the sealing material. Finally, the opening in the sealing material is sealed with a UV-curable material to provide a liquid-crystal panel.

The lower part of FIG. 27 shows a configuration of a backlight.

The backlight comprises a light source C emitting a white light such as a lamp and a light-emitting diode (LED), an optical guide 317, a reflection plate 318, a diffusion sheet 316 and a field-angle regulating sheet 315.

A configuration of these components is optimized to allow the backlight to operate as a plane light emitter as even as possible and to guide a light from the light source C toward a liquid-crystal panel as efficiently as possible. In general, an optical guide is a transparent plastic substrate made of polymethyl methacrylate (PMMA) with a thickness of, for example, about 1.0 mm. The reflection plate 318, the diffusion sheet 316 and the field-angle regulating sheet 315 have been processed to effect individual optical functions. Thus, the overall thickness of the backlight components in FIG. 27 is about 2.0 mm.

There will be described operation of a semi-transmissive liquid crystal display as a transmissive liquid crystal display with reference to FIG. 27.

A white light from the light source C enters the optical guide 317, alters its path by the reflection plate 318 and then is diffused by the diffusion sheet 316. The diffused light is adjusted by the field-angle regulating sheet 315 to have a desired orientation and then reaches the liquid-crystal panel.

Although this light is non-polarized, only one linearly-polarized light passes through the straight polarizing plate 314 in the liquid-crystal panel. The linearly-polarized light is converted into a circularly-polarized light by the retardation film (¼ wavelength plate) 313, and sequentially passes through the glass substrate 312, the pixel electrode 310 made of a semi-transparent material, finally to the liquid crystal layer 308.

Orientation of the liquid crystal molecules are controlled, depending on the presence of a potential difference between the pixel electrode 310 and the opposite transparent electrode (counter electrode) 306. That is, in an extreme orientation state, a circularly-polarized light entering from the lower part of FIG. 27 is transmitted, as it is, through the liquid crystal layer 308 and then through the transparent electrode 306. Then, a light with a particular wavelength is transmitted through the color filter 305 to the retardation film (¼ wavelength plate) 313. Thus, it substantially completely passes through the polarizing plate (straight polarizing plate) 314. The pixel, therefore, most brightly displays a color determined by the color filter.

In contrast, in another extreme orientation state, polarity of a light passing through the liquid crystal layer is altered, so that a light passing through the color filter is substantially completely absorbed by the retardation film (¼ wavelength plate) 303 and the polarizing plate (straight polarizing plate) 302. Thus, the pixel displays black color. In an intermediate orientation state between these two states, a light is partially transmitted, so that the pixel displays an intermediate color.

Next, there will be described operation of a semi-transmissive liquid crystal display as a reflective liquid crystal display.

When an outside light enters a liquid-crystal panel from the upper part of FIG. 27, a circularly-polarized light which has been transmitted through the polarizing plate (straight polarizing plate) 302 and the retardation film (¼ wavelength plate) 303, passes through a liquid crystal layer. Then, 30% of the light is reflected by a pixel electrode to be utilized for displaying. Therefore, the display operates as a reflective liquid crystal display.

Next, there will be described operation of a semi-transmissive liquid crystal display.

In a semi-transmissive liquid crystal display, a pixel electrode is made of a semi-transparent material and its operation as a transmissive liquid crystal display is as described above, although when designing a light transmittance in the pixel electrode to, for example, 70%, 30% of the light is not used for displaying. On the other hand, when an outside light enters the liquid-crystal panel from the upper part of FIG. 27, a circularly-polarized light which has been transmitted through the straight polarizing plate and the ¼ wavelength plate passes through a liquid crystal layer and 30% of the light is reflected to be utilized for displaying. It, therefore, operates as a reflective liquid crystal display.

In the prior art, a substrate constituting a thin-film transistor has been a glass substrate which can tolerate an high-temperature during manufacturing the thin-film transistor. On the other hand, there has been investigated technique for forming a thin-film transistor at a lower temperature. For such technique, device properties are not adequate for forming a functional device on the substrate on which a thin-film transistor for driving a liquid crystal is formed, in response to the recent need for size reduction. Thus, the technique has not been practically used.

Thin-film transistors can be classified into three categories: high-temperature polysilicon transistors formed on a quartz substrate, low-temperature polysilicon transistors formed on a glass substrate and amorphous silicon transistors formed on a glass or plastic substrate. For size-reduction of a liquid-crystal panel, it has been attempted to form a driver IC which has been conventionally an external device, on a glass substrate. An amorphous silicon transistor can be manufactured at a lower temperature, but its properties adequate to operate a driver IC cannot be practically achieved on a plastic substrate. It is, therefore, more practical to form a low-temperature polysilicon transistor on a glass substrate, in the current manufacturing technique.

As shown in FIG. 28, a transmissive liquid crystal display utilizing a plastic substrate has been experimentally manufactured as described by Asano et al. (A. Asano and T. Kinoshita, "Low-temperature polysilicon TFT color LCD panel made of plastic substrates," in Society for Information Display International Symposium Digest of Technical Papers (Society for Information Display, Boston, 2002,) Vol. 33, pp. 1196-1199.).

According to the above paper, on a glass substrate comprising an antietching layer is formed, by a well-known process for manufacturing a low-temperature polysilicon thin-film transistor, a polysilicon TFT, on which is then applied a removable adhesive, through which is then glued a temporary substrate (FIG. 28(a)). Next, the glass substrate is etched off by hydrofluoric acid (HF) (FIG. 28(b)). Then, after removing the antietching layer, a polysilicon TFT is glued via an adhesive to a plastic substrate with a thickness of 0.2 mm (FIG. 28(c)). Subsequently, the temporary substrate and the removable adhesive are sequentially removed (FIG. 28(d)). Next, the substrate and a substrate comprising, for example, a color filter and a transparent electrode are disposed, facing each other. Liquid crystal molecules are injected into the space between the substrates to form an active driving liquid crystal display panel.

A conventional transmissive/semi-transmissive liquid crystal display is thick and heavy because it uses a backlight. For solving the problem, there has been proposed a configuration using an organic EL.

JP-2000-29034-A and JP-2002-98957-A have disclosed a configuration using an organic EL as a backlight, which will be described below with reference to FIG. 29.

JP-2000-29034-A shown in FIG. 29A has described that in order to prevent an organic EL from being deteriorated due to a high temperature during forming an oriented film by a conventional firing process, an oriented film 623 which has been preliminarily oriented is laminated with a display-driving substrate 621 and a counter substrate 622.

The liquid crystal display panel in FIG. 29A is manufactured as follows. First, a TFT array substrate 621 and a counter substrate 622 comprising a plane light emitter which is produced by separate processes are laminated. Then, the product is subject to common rubbing to provide the polymer film with an orientating function to the liquid crystal composition 624 to form an oriented film 623. Then, the TFT array substrate 621 and the oriented film 623 to the counter substrate 622 are disposed, facing each other. Then, the space between them is filled with a liquid crystal composition 624.

In the structure in FIG. 29A, an organic film is laminated with the oriented film according to the prior art as shown in FIG. 27, and a backlight is replaced with an organic EL. Although a substrate for forming the organic EL is needed, a glass substrate has a thickness of 0.4 mm while a conventional optical guide has a thickness of several mm. Thus, it results in reduction in a film thickness.

JP-2000-98957-A has disclosed that in a transmissive liquid-crystal panel, an organic EL light-emitting device is used in place of a conventional fluorescent tube as a backlight for reducing a film thickness and a weight. FIG. 29B shows its structure.

The liquid crystal display panel comprises a first electrode substrate 650, a second electrode substrate 660 and a liquid crystal layer between these substrates.

The first electrode substrate 650 is comprised of a transparent glass substrate 651, whose surface to be in contact with a liquid crystal layer, comprises a scan line 652, a signal line 653 (not shown), a pixel electrode 654, a TFT 655, an auxiliary capacity 656 (not shown) and an auxiliary capacity line 657.

In the second electrode substrate 680, a transparent glass substrate 681 has a surface to be in contact with a liquid crystal on which a transparent electrode 682 to be a counter electrode to a liquid crystal and a surface facing the surface comprising substrate transparent electrode 682 in the glass substrate 681 comprises emitting parts 683, 685, 687, 689 in an organic EL and non-emitting parts 684, 686, 688 as spaces between the emitting parts 683, 685, 687, 689.

FIG. 29B shows that a film thickness can be reduced by eliminating an optical guide for a backlight which has been required in the prior art, by means of forming a plane light-emitting device consisting of an organic EL on the rear surface of the substrate comprising a counter electrode in a liquid-crystal panel. Thus, the number of substrates can be reduced to two while the conventional configuration needs three substrates as shown in FIG. 29A, resulting in thickness reduction in a liquid-crystal panel.

JP-54-126559-A has disclosed the use of a long flexible film as a substrate in a liquid-crystal panel. The application has, however, disclosed only an example where a long flexible film comprising a transparent electrode and an oriented film is used to form a simple matrix driving type of a monochrome liquid-crystal panel. The technique disclosed in JP-54-126559-A is related to manufacturing a liquid-crystal panel using a long plastic substrate in the era when a large and flat glass substrate was expensive and could not be easily produced. Furthermore, JP-62-150218-A and JP-06-27448-A have disclosed that a liquid crystal fills a space between long flexible films in which oriented films are formed on two electrodes.

However, a liquid-crystal panel had been required to be colorized and to display a movie. In order to increase a response speed, active matrix driving has been dominant as a driving system, where pixels in a liquid crystal are directly driven by a thin-film transistor. Furthermore, color displaying needs, in addition to an oriented film, other optically functional films such as a retardation film and a polarizing film. Additionally, as improvement in display visibility has been needed, there have been developed various types of liquid-crystal panels such as transmissive, reflective and semi-transmissive panels. Thus, the above technique could not respond to these.

Although there were problems of size increase and flatness in a glass substrate around 1975, these problems have been overcome by improvement in manufacturing technique for a glass substrate, and it is believed that a glass substrate is optimal for an active driving type liquid-crystal panel using a thin-film transistor.

In various types of liquid-crystal panels such as transmissive, reflective and semi-transmissive types, it is necessary to laminate a plurality of optically functional films with a substrate. In this process, the films are laminated one by one with the liquid-crystal panel, so that it requires many steps of laminating the optically functional films.

For simplifying the lamination process, JP-2002-358024-A and JP-2002-148607-A have disclosed that a long flexible film is laminated with a glass substrate.

Patent document 1 JP-2000-29034-A
Patent document 2: JP-2002-98957-A
Patent document 3 JP-54-126559-A
Patent document 4 JP-62-150218-A
Patent document 5: JP-2002-358024-A
Patent document 6: JP-2002-148607-A
Nonpatent literature 1: A. Asano and T. Kinoshita, "Low-temperature polysilicon TFT color LCD panel made of plastic substrates," in Society for Information Display International Symposium Digest of Technical Papers (Society for Information Display, Boston, 2002,) Vol. 33, pp. 1196-1199.

DISCLOSURE OF THE INVENTION

Problems to be Resolved by the Invention

As described above, a liquid-crystal panel has a structure where a liquid crystal is sandwiched between electrodes. Thus, it is necessary to form a driving electrode and a counter electrode on separate substrates.

Conventionally, since a TFT (thin-film transistor) requires a high temperature heat treatment, it has been believed that using a glass substrate is essential. It has been, however, indicated that a plastic substrate may be used by employing the method as described by Asano et al.

A liquid crystal can be prepared by a known method. A liquid-crystal panel is manufactured by laminating one substrate comprising a driving electrode and the other substrate comprising a counter electrode, on both of which there are disposed films having functions such as light polarization, forming phase difference and orientation.

A backlight is manufactured by a step other than that for the liquid-crystal panel, and then disposed on the rear surface of the liquid-crystal panel.

A configuration of a semi-transmissive or transmissive liquid-crystal panel requires three substrates even when using an organic EL as a backlight and a TFT is manufactured as described by Asano et al. Consequently, the liquid-crystal panel and the backlight have thicknesses of about 0.4 mm and about 0.2 mm, respectively, leading to the minimum overall thickness of 0.6 mm.

There have been strong needs for a thin-film and light-weight display panel. Thus, E Ink Corporation (U.S.A) has developed an active matrix type device with a thickness of 3 mm, one tenth of a liquid crystal display panel, using an electron ink.

A liquid crystal display panel is composed of optically functional films laminated on a rectangular substrate (a glass substrate or plastic substrate). When using a rectangular substrate, the following problem is inevitable.

A liquid crystal display is needed to have a wide range of display size, from 2.1 inches for a cell phone to 15, 17 inches for a personal computer, and from 17 inch wide to 40 inch wide for a television. Since it is difficult to construct a production line for each substrate size, a rectangular large-area substrate must be used.

The step of forming a liquid crystal display is similar to the step of forming a semiconductor device on a silicon wafer. Since productivity is improved when forming many sheets on one base in sheet processing, the step has become larger-scaled. In contrast to a semiconductor apparatus with a size of several centimeters, a liquid crystal display may have a diagonal size of more than 40 inches. Thus, there has been proposed a glass substrate as a base with a size of larger than 1 m×1.5 m.

The production line must use a rectangular large-area substrate for responding to various sizes.

A liquid-crystal panel has a configuration where films having an optical function (hereinafter, referred to as "optically functional film") are placed one by one on a substrate comprising a TFT and/or a substrate comprising a counter electrode. In the liquid-crystal panel shown in FIG. 27, the two substrates sandwiching the liquid crystal have one surface comprising an oriented film facing the liquid crystal and the other surface comprising optically functional films such as a retardation film and a polarizing film (plate).

These films must be placed one by one on the substrate, leading to a longer production step and a longer turn around time (TAT) in the manufacturing process.

When using a rectangular substrate, a substrate is carried one by one or from a cassette. However, the following problem has become significant as a substrate size has been increased to over 1.5×1.5 m².

For a glass substrate, (1) a sheet is carried while supporting the lower surface of the glass, so that a larger size of a glass substrate has led to significant increase in an area for placing an apparatus, resulting in the need of a huge manufacturing facility. For cassette carrying, a cassette which can be inserted with a space for avoiding mutual contact between substrates, but carrying becomes difficult as the cassette becomes larger and heavier. (2) Conventionally, although a glass substrate has been thinner, further thinning of the substrate cannot be achieved when the substrate become heavier in association with size increase. As occurs in a manufacturing line for a semiconductor integrated circuit, it may even lead to increase in a substrate thickness.

When using a plastic substrate, (1) the plastic substrate is flexible, so that, for example, it may not be inserted into a processing apparatus without designing the apparatus taking flexure during carrying into account.

There has been proposed that a plastic substrate is laminated with a hard substrate such as glass. However, this may lead to the same problem in (1) where a glass substrate is used.

Furthermore, it leads to increase in the number of steps such as lamination and peeling, and the use of a glass substrate may result in increase in a material cost.

As a liquid-crystal panel becomes larger or more displays with a smaller size are taken, a substrate becomes thicker. On the other hand, there are needs for thinning a mobile display device whose applications are diverse, e.g., outdoor and indoor, bright and dark places, fine and rainy weather, etc.

When a large substrate is used for responding to thinning of a substrate, a manufacturing apparatus is required to be more precise, leading to an expensive apparatus. Thus, it may cancel cost reduction in manufacturing a liquid-crystal panel by size increase in a substrate.

Furthermore, a conventional semi-transmissive liquid crystal display panel is designed such that a pixel electrode has a transmittance of, for example, about 0.3 to 0.7 to ensure good visibility in both bright and dark places. Therefore, in comparison with a reflective liquid crystal display having the same pixel area, a utility efficiency of outside light is reduced in a semi-transmissive liquid crystal display, leading to dark display. Furthermore, in comparison with a transmissive liquid crystal display with the same pixel area, a utility efficiency of a light from a backlight is reduced, leading to dark display. In other words, a conventional semi-transmissive liquid crystal display has the problem that a light utility efficiency is lower and display is darker than a reflective liquid crystal display or a transmissive liquid crystal display.

In view of the situation, this invention has been designed. Specifically, an objective of this invention is to provide a thin-shaped liquid crystal display panel. Another objective of this invention is to reduce a manufacturing cost for a liquid crystal display panel by simplifying a manufacturing process.

Means of Solving the Problems

According to this invention, there is provided a light-condensing film, wherein an array of light collectors made of an organic resin is formed on a long light-diffusing film with a flexibility of 40 mm or less of a curvature radius and a coefficient of thermal expansion of 50 ppm/° C. or less and a surface in the light collector facing the surface contacting with the film is flat and has a smaller area than the surface contacting with the film. The light-diffusing film preferably has a Young's modulus of 1.5 GPa or more.

The light-diffusing film is fed from a first roll to a second roll, during which a thin film can be formed on its surface. Furthermore, to a thermal history at 200° C., variation in mechanical and optical properties is preferably ±5% or less, and to a thermal history at 250° C., mechanical and optical variation is preferably ±5% or less.

The light-diffusing film preferably comprises transparent light-diffusing particles with a refractive index different from that of the film. Preferably, the transparent particle is zinc oxide, ITO or silica and has a particle size of 0.5 μm or more and ½ or less of the film thickness.

The light-diffusing film and the light collector are preferably made of the same resin. Furthermore, the resin is preferably selected from an acrylic resin and a cyclic olefin resin.

The light-condensing film may be laminated, on the surface facing the light diffusing film in the light collector in the above light-condensing film, with a long light-guiding film having a coefficient of thermal expansion of 50 ppm/° C. or less.

The light-guiding film preferably has a Young's modulus of 1.5 GPa or more.

Furthermore, the light-guiding film is fed from the first roll to the second roll, during which a light-condensing film comprising a light collector on a light diffusing layer can be laminated with the surface facing the light diffusing film in the light collector.

In terms of the light-guiding film, variation in mechanical and optical properties is preferably ±5% or less to a thermal history at 200° C., more preferably ±5% or less to a thermal history at 250° C.

The light-guiding film preferably comprises an inorganic fillers, which preferably has a particle size of 1 nm to 380 nm.

The inorganic fillers is preferably made of a material selected from titanium dioxide, zinc oxide, alumina and silicon oxide.

Furthermore, the light-guiding film preferably has a light transmittance of 80% or more.

The light-guiding film is preferably made of an acrylic resin or a cyclic olefin resin.

Furthermore, the light-diffusing film, the light collector and the light-guiding film are preferably made of the same resin, which is preferably selected from an acrylic resin and a cyclic olefin resin.

There is provided a functional film comprising an optically functional thin film formed on a light-diffusing film in a light-condensing film comprising the light-diffusing film, a light collector and a light-guiding film; a transparent counter electrode in a liquid crystal device; and an oriented film on the counter electrode. The functional film and each oriented film in a functional film comprising a liquid crystal functional thin film comprising, for example, a pixel electrode for a liquid crystal, an optically functional thin film and the oriented film are disposed, facing each other. Then, a liquid crystal can be sandwiched between the oriented films to form a liquid-crystal panel.

The light-condensing film comprising the light-diffusing film, the light collector and the light-guiding film is divided into desired shape pieces, and then a light source is placed adjacently to at least one plane substantially perpendicular to the plane on which the light collector in the optical guide is placed, to form a backlight.

According to another aspect of this invention, there is provided a process for manufacturing a light-condensing film comprising the steps of filling an irregularity in a support corresponding to the irregularity of the light collector with an organic resin and transferring the filling resin to the long light-diffusing thin film.

According to another aspect of this invention, there is provided a process for manufacturing a light-condensing film comprising the steps of forming a thin film made of an organic resin on a long light-diffusing film and transferring the shape of the light collector to the thin film.

The step of transferring the shape of the light collector can be conducted by pressing a template having an irregularity corresponding to the shape of the light collector.

The step of transferring the shape of the light collector may optionally comprise the step of curing the organic resin under pressure. The organic resin can be cured by UV-ray irradiation.

The process may comprise the step of depositing a light-guiding thin film on the light collector.

This invention is characterized in that various thin films constituting a liquid-crystal panel and/or a backlight are formed a flexible base film by transfer using a roll-to-roll process.

This invention is particularly characterized in that a backlight comprising an optical guide can be manufactured by a roll-to-roll process.

In this invention, transfer is conducted between films, so that intermittent operation can be eliminated during transfer between a substrate and a film, resulting in a simplified configuration of a transfer apparatus. Furthermore, when using substrates, transfer must be conducted for each substrate. It is, therefore, necessary to form a functional thin film on a film in conformity to the size of the substrate or to separate a functional thin film after transferring to the substrate.

When forming a variety of functional thin films directly on a base film, a resin constituting an optically functional thin film is cured by heating or light irradiation. If a cured resin is exposed to further heating or light irradiation, the cured resin may be decomposed or deteriorated due to further curing. Thus, the optimal curing conditions cannot be chosen for some materials.

According to this invention, each functional thin film can be formed under the optimal conditions for the film because heating during transferring is at a lower temperature and for a shorter period, so that the functional thin film is not deteriorated.

Various functional thin films formed on a supporting film as a flexible base film using a roll-to-roll process have a flexibility equivalent to that of the base film. As a result, the functional thin films constituting a liquid-crystal panel is not peeled by bending of the substrate. When matching a coefficient of thermal expansion between the base film and the supporting film, there is not generated stress due to expansion coefficient difference between the films in a functional thin film transferred to the base film. Thus, the cause for peeling of a transferred film can be eliminated.

Furthermore, using an optical guide as a backlight also contributes to weight reduction in a liquid-crystal panel, and the panel has a flexibility equivalent to the base film, so that impact such as falling can be absorbed by bending of the base film as a substrate, resulting in significant improvement in shock resistance.

When this invention is applied to a display in a device such as a mobile display which is supposed to be used in substantially all places, damage in the display can be minimized.

The panel can be manufactured while forming a plurality of functional thin films on a film by a roll-to-roll process. Even when manufacturing a large-sized display panel or a number of display panel from one sheet of substrate, it can be carried while being wound-up as a roll. It can be, therefore, carried between apparatuses in a narrow space, and accidents such as breakage during carrying can be prevented.

Furthermore, even when a liquid-crystal panel is large-sized, it is not necessary to increase a thickness of a film to be an optical guide, so that thinning or weight reduction in the liquid-crystal panel is not be inhibited.

In a conventional glass substrate, bending in a substrate caused by a difference in a coefficient of thermal expansion between the substrate and an optically functional thin film formed on the substrate due to a hardness of a glass substrate has not been a significant problem. It is anticipated that bending due to a difference in a coefficient of thermal expansion in a substrate will occur when a glass substrate becomes further thinner or a plastic substrate is used, substrate.

In this invention, since a functional film and a substrate (base film) as a main component in a backlight are made of the same material, bending in a liquid-crystal panel due to a difference in a coefficient of thermal expansion between materials can be prevented.

BRIEF DESCRIPTION OF THE DRAWINGS

FIG. 3 is a conceptual view illustrating a process for transferring a polarizing film and a retardation film according to this invention.

FIG. 9 is a process cross-sectional view illustrating a process for manufacturing a thin-film transistor according to this invention.

FIG. 11 is a conceptual view illustrating a process for manufacturing a color filter according to this invention.

FIG. 28 is a process-explanatory view illustrating a process for transferring a TFT according to the prior art.

FIG. 30 shows a rear light source using an optical guide.

FIG. 31 shows a shape of a light collector.

Figure 1:
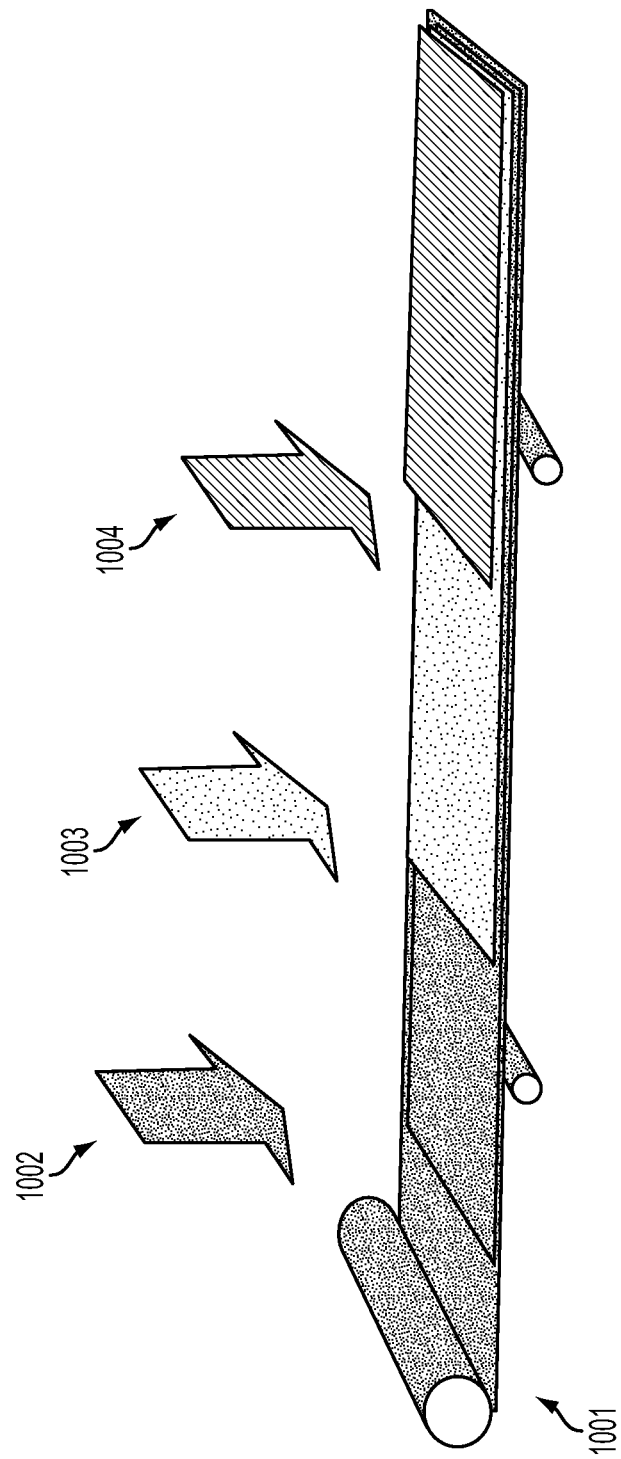
FIG. 1 is a conceptual view of a manufacturing process according to this invention.

In these drawings, the symbols have the following meanings; 1: vacuum chamber, 2: wind-off roll, 3: base film, 4: exhaust pump, 5: target, 6: exhaust pump, 7: temperature-controlling drum, 8: reactant gas inlet tube, 9: discharge gas inlet tube, 10: exhaust pump, 11: wind-up roll, 100: polarizing film, 101: functional film A, 102: matrix base, 103: optically functional layer, 104: functional film B, 105: base film, 106: opaque electrode, 107, 110: organic EL layer, 111: cover film, 112: functional film, 113: polarizing film, 115: supporting film, 116: retardation film, 151: oriented film, 152: UV-ray source, 153: polarized filter, 154: base film, 155: transistor layer, 321: display-driving substrate, 323: oriented film, 322: counter substrate, 324: liquid crystal composition, 351: antireflection film, 352: polarizing film, 353: retardation film, 354: base film, 355: color filter, 356: transparent electrode, 357: oriented film, 358: liquid crystal, 359: oriented film, 360: pixel electrode, 361: interconnection, thin-film transistor, 362: base film, 363: retardation film, 364: polarizing film, 365: transparent electrode, 366: organic EL layer, 367: reflection electrode, 368: base film, 371: second functional film, 372: first functional film, 373: matrix base, 374: matrix base, 375: device layer, 376: optically functional thin film, 377: third functional film, 380: base film, 381: TFT layer, 390: base film, 391: photosensitive resin, 392: cover film, 393: CF base, 394: black matrix, 395: R (red), 396: G (green), 397: B (blue), 398: spacer, 399: color filter, 401: base film, 402: thin-film transistor, interconnection, 403: pixel electrode, 404: color filter, 405: oriented film, 406: liquid crystal, 407: oriented film, 408: counter electrode, 409: retardation film, 410: polarizing film, 411: transparent electrode, 412: organic EL layer, 413*a*: transparent electrode, 413: reflection film, 414*b*: flattening film, 414*a*: film, 414: base film, A: spacer, 451: base film, 452: transistor layer, 453: supporting film, 454: color filter, 455: spacer, 456: oriented film, 621: display-driving substrate, 623: oriented film, 622: counter substrate, 624: liquid crystal composition, 650: first electrode substrate, 660: second electrode substrate, 654: transparent electrode, 655: TFT, 682: transparent electrode, 683, 685, 687, 689: emitting part, 684, 686, 688: non-emitting part, 701: optical guide, 702: reflection film, 703: light collector array, 704: light diffusing film, 705: light source, 706: light-emitting diode, 707: resin, 708: supporting film, 709: UV-curable resin, 710: UV-irradiation apparatus, 711: light-diffusing material, 712: light-diffusing layer, 713: liquid crystal, 714: sealing material, 715: counter base film, 716: liquid crystal cell, 717: base film with a collector array, 718: optical guide, 719: precise cutting, 720: rough cutting, 721: lamination, 801: forming a barrier layer, 802: forming a retardation layer, 803: forming a polarizing layer, 804: transferring a TFT, 805: forming a color filter (CF), 806: forming a reflection electrode, 807: forming an organic EL, 808: forming an upper electrode, 809: forming a barrier layer, 810: forming a polarizing layer, 811: forming a retardation layer, 812: forming a transparent electrode, 813: orientation treatment, 814: injecting a liquid crystal, 815: sealing, 820: first functional film, 830: second functional film, 1000: base film, 1001: retardation function, 1002: polarizing function, 1003: antireflecting function, 1010: application, 1020: drying and cooling, 1030: applying a cover film, 1040: peeling a cover film, 1050: transferring a polarizing film, 1060: transferring a retardation film, 1070: applying a CF base, 1080: exposure, 1090: peeling a base film, 1100: development and drying, 1110: applying a cover film, 1120: sealant, 1130: spacer, 1140: temporary substrate, 1150: removable adhesive, 1160: polysilicon TFT, 1170: anti-etching layer, 1180: glass substrate, 1190: adhesive, 1200: plastic substrate, 2000: transfer roller, A: polymerization, B: outgoing light, BU: blue, C: laser beam, D: boron ion doping, E: phosphorous ion doping, F: p-type area, G: etching, GR: green, BM: black matrix, and R: red.

DETAILED DESCRIPTION OF PREFERRED EMBODIMENTS

According to this invention, a liquid-crystal panel is manufactured by forming optically functional films, a TFT device and a light emitting device on thin films consisting of a long substrate made of an organic resin, which are then laminated.

Figure 14:
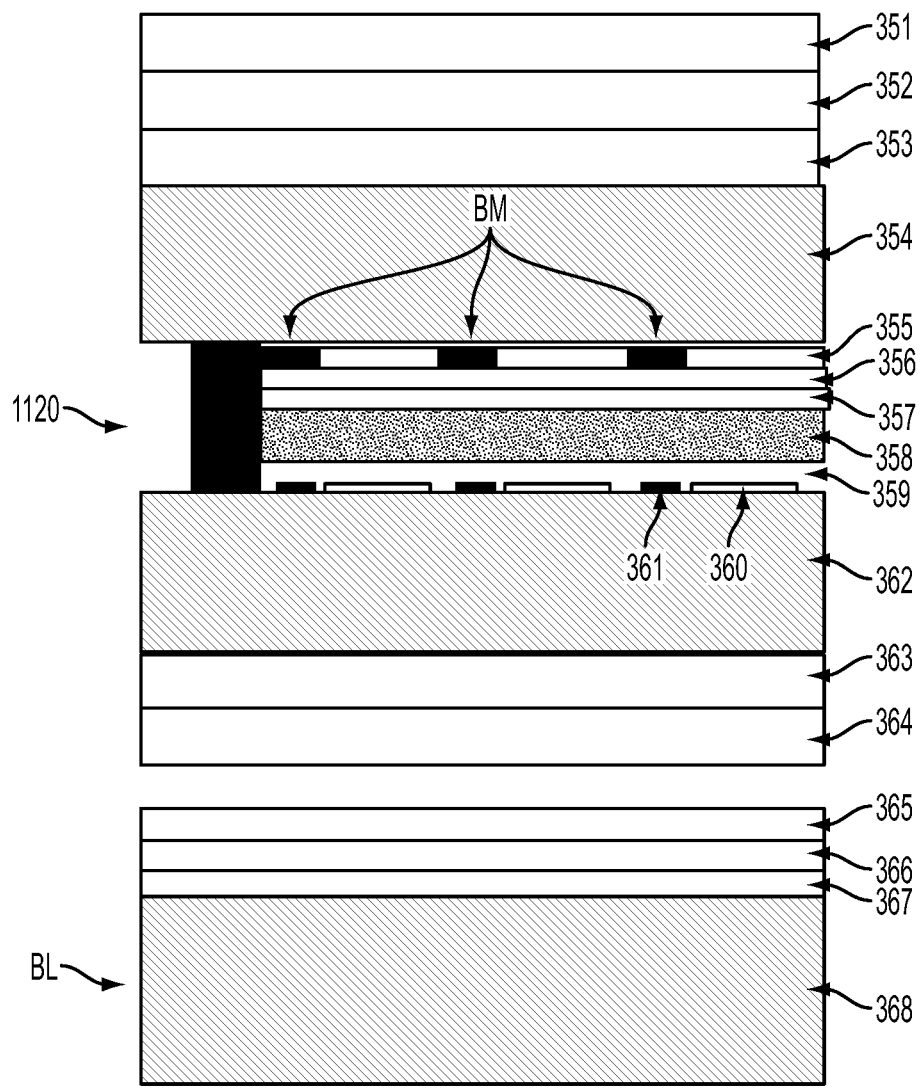
FIG. 14 is a cross-sectional structural view of a liquid-crystal panel according to this invention.
Figure 16:
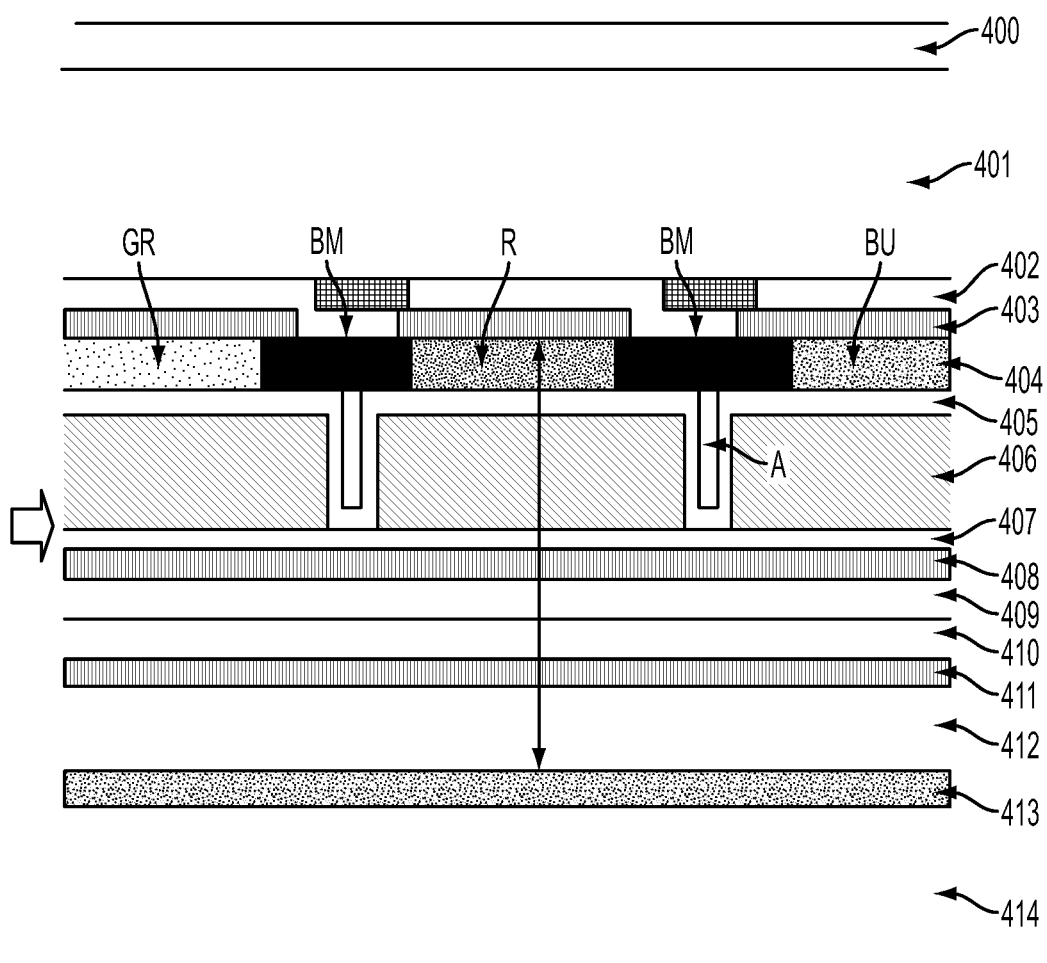
FIG. 16 is a cross-sectional structural view of a liquid-crystal panel according to this invention.
Figure 18:
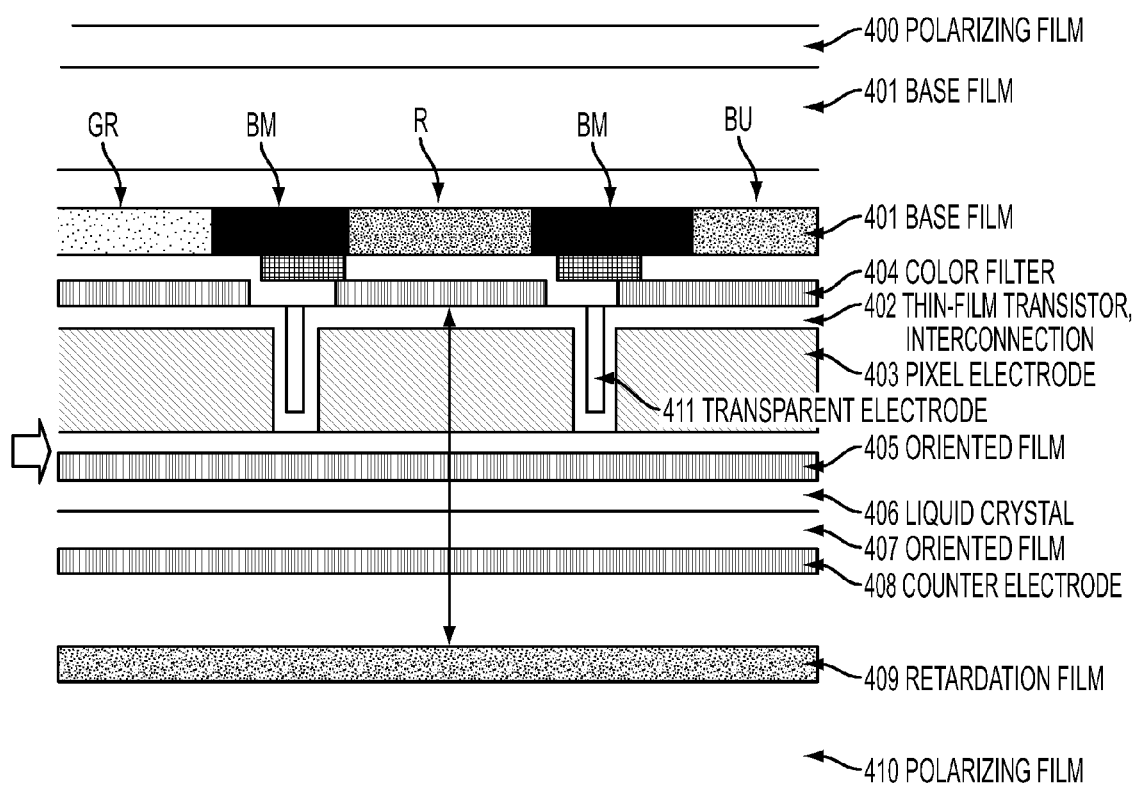
FIG. 18 is a cross-sectional structural view of a liquid-crystal panel according to this invention.

A liquid-crystal panel according to this invention has a configuration such as those illustrated in FIGS. 14, 16 and 18. The liquid-crystal panel comprises a flat light emitting device unit to be a backlight and a liquid crystal device unit. The configuration will be generally described with reference to FIG. 14. In FIG. 14, the flat light emitting device unit constituting a backlight is a backlight using a light-condensing film according to this invention.

The light-condensing film has a configuration similar to that using a conventional optical guide, having advantages that it can be thinner than an optical guide and that a well-established light source can be used.

The backlight comprises a functional film capable of collecting a light (light-condensing film) and a light source. The light-condensing film is a laminated film in which a light collector 366 and a supporting film 365 are formed on a base film 368. The light source is formed on the side surface of the light-condensing film.

In the above light-condensing film of this invention, an array of light collectors made of an organic resin are formed on a light-diffusing film, and a light-guiding film (hereinafter, sometimes referred to as an "optical guide") together with a laminated light source disposed at the end constitutes the backlight.

In the liquid crystal device unit, on one side of a first base film 362, there are formed a retardation film 363 and a polarizing film 364 as optically functional thin films which have an optical function. On the other side of the first base film 362, there are laminated an interconnection, a thin-film transistor 361 and a pixel electrode 360 involved in some functions of a laminated liquid crystal device, and a device functional thin film consisting of an oriented film 359.

One side of the second base film 354 constituting the liquid crystal device unit comprises a retardation film 353, a polarizing film 352 and an anti-reflection film 351 as optically functional thin film which are optically functional. In the other side of the second base film, there is laminated a device functional thin film comprising a color filter 355, a transparent electrode 356 and an oriented film 357, which is involved in some of functions of the liquid crystal device.

The liquid crystal device unit is formed by facing the oriented film 359 in the first functional film where the optically functional thin films and the device functional thin film are laminated and an oriented film 357 in a second functional film via a space and filling the space with a liquid crystal 358.

These optically functional thin films having optical functions and a device functional thin film involved in some functions of a device are laminated on, for example, a supporting film other than a base film during a manufacturing process. These films are collectively referred to as "functional films". Optically functional thin films or device functional thin films formed on such a functional film are collectively referred to as "functional thin films".

In addition to an interconnection, a thin-film transistor and a pixel electrode, an active device and/or a passive device may be formed. Furthermore, since an interconnection, a thin-film transistor, a pixel electrode and other active and passive devices may not be formed in one layer, each of these layers may be called a "device functional thin film".

It will be clearly understood that a backlight may be an organic EL device or inorganic EL device which a light emitting device is formed on its surface and can be thinned, instead of the above light-condensing film, and that a light may not be necessarily emitted from its overall surface. For example, even a vertical cavity surface emitting laser diode (VCSEL) or resonant cavity light emitting diode (RCLED) can be of course used as long as it can be formed as a thin film.

A color filter or oriented film may be called a device functional thin film having a device function from operation of a liquid-crystal panel, and also may be called an optically functional thin film having an optical function.

It will be clearly understood that a device functional thin film and an optically functional thin film are not limited to these examples, but may be varied, depending on a configuration of a liquid-crystal panel.

Embodiment 1 of this invention will be described with reference to FIG. 1. FIG. 1 is a conceptual view illustrating a process for manufacturing a liquid-crystal panel using a long film made of an organic resin. While applying a tension for preventing shrinkage, a base film wound-up as a roll is fed from a wind-off roll to a wind-up roll. In the course of the process, the base film is sequentially endowed with various functions such as retarding function and polarizing function, to form a functional film A having optical functions.

Figure 2A:
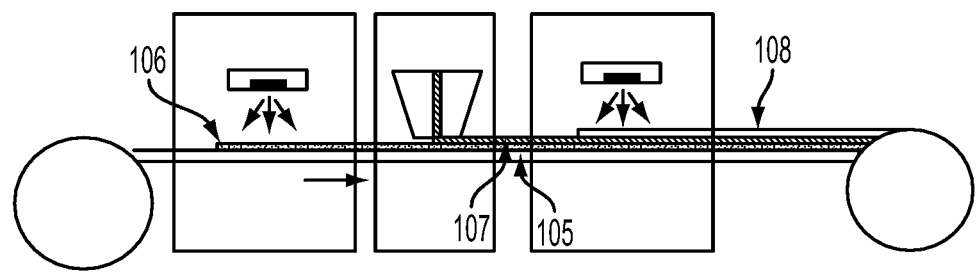
FIG. 2 is a conceptual view of a manufacturing process according to this invention.

FIG. 2A is a conceptual view illustrating a process for forming a device function on a base film, where an organic EL light emitting device is formed on the base film On a base film 105 fed from a wind-off roll is formed an opaque electrode layer by physical vapor deposition and a light-emitting layer consisting of an organic EL layer made of an organic material by deposition or application, then a transparent electrode by physical deposition as described for the opaque electrode and then a functional film B comprising a light emitting device, and finally the film is wound into a wind-up roll.

Figure 2B:
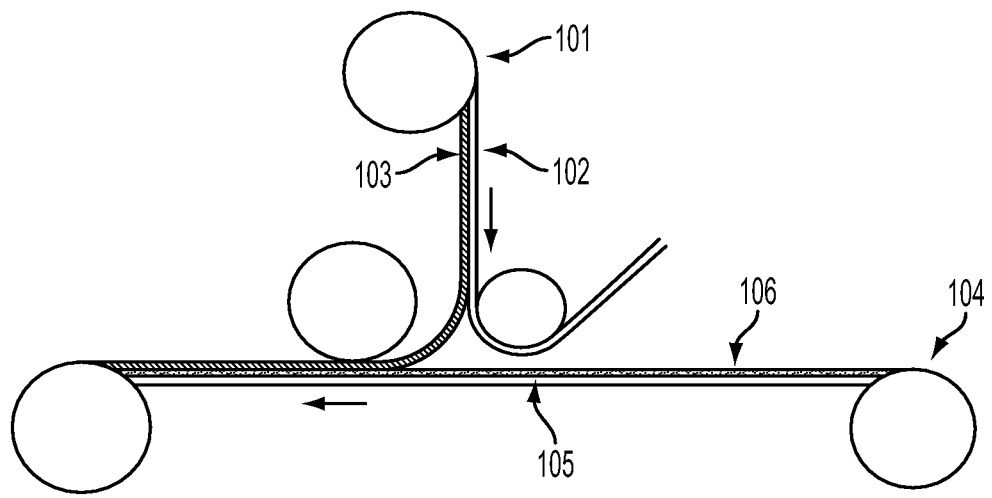

FIG. 2B is a conceptual view illustrating the step of transferring only an optically functional layer from the functional film A having an optical function to the functional film B comprising the light emitting device.

The functional film B is fed to a wind-up roll from the wind-up roll B, while in the functional film A similarly fed from a wind-off roll, an optically functional layer 103 is peeled from a matrix base 102 and transferred on a device layer 106 in the functional film B. The functional film B comprising the optically functional layer 103 transferred on the device layer 106 is then wound into a wind-up roll.

In terms of required properties, the matrix base 102 preferably has a coefficient of thermal expansion and flexibility comparable to the base film. A coefficient of thermal expansion and flexibility are preferably comparable to those in the base film. A coefficient of thermal expansion is preferably 50 ppm/° C. or less. More preferably, a difference between its coefficient of thermal expansion and that in the base film is preferably ±30% or less, more preferably ±15% or less.

Matching flexibility and a coefficient of thermal expansion between films can prevent stress accumulation on a transferred film to avoid peeling.

A coefficient of thermal expansion can be reduced by adding inorganic fillers. The inorganic fillers must have a size smaller than a light wavelength for keeping transparency of the film, and when conducting resin curing using UV rays, a particle size must be smaller than the wavelength of UV rays needed photoUV rays used for photo-curing often have a wavelength of 200 nm to 300 nm. Herein, it is preferably 1 nm to 200 nm or less, more preferably 1 nm to 100 nm. If it is 200 nm or less, a photocurable film formed on the matrix base 102 can be irradiated with UV rays having a wavelength of 200 nm to 300 nm through the matrix base 102. Since UV rays can be irradiated through the matrix base 102, a deposition mechanism can be placed on the upper surface of the matrix base 102 while a UV-ray irradiation mechanism can be placed on the lower surface of the matrix base 102. Here, it is not necessary to place a deposition mechanism and a UV-ray irradiation mechanism on the upper surface of the matrix base 102. Thus, freedom in designing an apparatus is increased, resulting in further size reduction of a manufacturing apparatus.

Although a particle size of the inorganic fillers may be 1 nm or less, it is difficult to prepare fillers with a size of 1 nm or less by current technique.

The amount of the inorganic fillers is preferably 5% by weight to 90% by weight both inclusive, more preferably 10% by weight to 50% by weight both inclusive. When it is 5% by weight or more, a coefficient of thermal expansion can be reduced, while when it is 90% by weight or less, its fragility is acceptable.

The inorganic fillers may be added in such an amount that matching of a coefficient of thermal expansion with the base film can be achieved within the above range.

It is preferable that the cover film is also matched with the base film for a coefficient of thermal expansion as is in the supporting film.

Examples of the inorganic fillers include titanium dioxide, zinc oxide, alumina and silicon oxide. The inorganic fillers can be incorporated, for example, by dispersing dry powdery silicon oxide particles using a mixer having higher dispersing ability; by blending a colloid (sol) dispersed in an organic solvent and other components and removing the organic solvent in vacuo optionally with stirring; or by blending a colloid (sol) dispersed in an organic solvent and other components, removing the solvent as necessary and then further removing the solvent by flow casting. An example of an apparatus having higher dispersing ability is a bead mill.

Furthermore, when a film formed on the matrix base 102 is deteriorated by, for example, moisture in the air (e.g., a polarizing film), it is preferable to form a gas barrier layer on the surface of the matrix base 102. When it is formed on one side of the matrix base 102, it may be effective on either side, but it may be more effective when being formed on the surface on which a film is to be formed.

When a film is cured by UV-ray irradiation, the gas barrier layer must be transparent to UV rays. Thus, examples of a material of the gas barrier layer include organic materials such as polyvinyl alcohols and polyvinylidene chlorides; organic-inorganic composite materials such as those of an organic material with an inorganic material including a clay mineral (an amorphous clay mineral such as $Al_2O_3 \cdot 2SiO_2 \cdot 5H_2O$ and $Al_2O_3 \cdot SiO_2 \cdot 2 \cdot 3H_2O$, or a crystalline clay mineral such as $(Si,Al)O_4$ tetrahedral sheet and $(Al,Mg)(O,OH)_6$ octahedral sheet); and a thin film of an inorganic material such as silicon oxide and aluminum oxide. A film thickness may be more reduced by using an inorganic material because it exhibits good gas barrier properties under a high humidity atmosphere and is effective with a smaller thickness. Furthermore, two or more of these layers may be laminated.

An organic material may reduce a cost because a gas barrier film can be in the form of a coating or laminated film in contrast to an inorganic material. It is inevitably inferior to a gas barrier film made of an inorganic material in terms of temperature dependency and moisture resistance.

A thickness of a gas barrier layer is preferably 1 µm to 10 µm when it is made of an organic material or an organic-inorganic composite material and preferably 10 nm to 1 µm when it is made of an inorganic material. When it is made of an organic material or an organic-inorganic composite material, a thickness of 1 µm or more can adequately prevent common air components such as oxygen and moisture from entering a liquid crystal layer or an organic EL layer. A thickness of 10 µm or less does not influence properties of the base film such as an expansion coefficient.

When it is made of an inorganic material, a thickness of 10 nm or more can adequately prevent common air components such as oxygen and moisture from entering a liquid crystal layer or an organic EL layer, while a thickness of 1 µm or less can prevent breakage during bending.

A gas barrier layer can be formed on a film by an application method for an organic material or an organic-inorganic composite material and by any of various film deposition methods for an inorganic material. In an application method, a liquid such as a liquid organic material or a solution thereof is applied on a film and is dried or cured to form a film. Examples of film deposition include physical growth methods such as vapor deposition, ion plating and sputtering; and chemical vapor growth methods such as plasma CVD and catalytic CVD under reduced pressure, and CVD under an atmospheric pressure. Among these, sputtering is particularly preferable because it can provide a dense film at a low temperature.

When a film formed on a matrix base 120 is UV-ray curable, a base film detailed in Embodiment 2 can be used because transparency is required. Furthermore, light transmittable resins can be used, including polyethylene resins, polypropylene resins, polyester resins, ethylene vinyl copolymer resins, polyvinyl chloride resins, cellulose resins, polyamide resins, polyimide resins, polycarbonate resins, polystyrene resins and vinyl acetate resins.

When it is necessary to protect a film from moisture or UV rays, it is preferable not only to form a gas barrier layer on a supporting substrate 120 but also to laminate a cover film made of a resin exhibiting good water proof. Examples of such a resin include polyethylene, polypropylene, polyvinyl alcohol, cellulose, polycarbonates, polyesters, acrylic compounds, polyether sulfones, polyamides, polyimides and polyolefins. Among these, preferred are celluloses such as triacetylcellulose; polyesters such as polycarbonates and polyethylene terephthalate; and acrylic compounds.

A cover film is desirably selected from those which are chemically and thermally stable and easily peelable from a thin film layer. Specifically, preferred are thin sheet films with good surface flatness including polyesters, polyethylene, polypropylene, polyethylene terephthalate and polyvinyl alcohol. A mold-released film for endowing with peelability may be used.

Furthermore, forming a gas barrier layer on a cover film is effective. The gas barrier layer can be formed on both sides or one side of the cover film. When the gas barrier layer is formed on one side of the cover film, it is effective that it is formed on a side contacting with a matrix base 120 in the cover film.

There will be more specifically described a process for forming a functional device layer or an optically functional layer on a base film with reference to FIG. 3. FIG. 3 is a conceptual view illustrating a partial manufacturing step in a manufacturing process for an organic EL light emitting device.

A functional film in which a reflection electrode is formed on a base film 105 is fed from a wind-off roll to a wind-up roll. During the functional film comprising the reflection electrode is wound-up into a wind-up roll, a thin film made of an organic material to be the next light-emitting layer is formed. In terms of the organic EL layer 110, the organic EL layer 110 made of an organic material to be a light-emitting layer is formed on the reflection electrode by vapor deposition or application. In FIG. 3A, an application method is illustrated. In an application method, a light-emitting layer is formed by application, dried, cooled and then wound-up into a wind-up roll. Since the transparent electrode is not continuously deposited in FIG. 3A, it is wound-up into the wind-up roll after laminating the cover film 111 on the organic EL layer 110 by lamination.

A cover film is desirably selected from those which are chemically and thermally stable and easily peelable from a thin film layer. Specifically, preferred are thin sheet films with good surface flatness including polyesters, polyethylene, polypropylene, polyethylene terephthalate and polyvinyl alcohol. A mold-released film for endowing with peelability may be used.

In the functional film comprising the organic EL layer 110, a transparent electrode is then formed on an organic EL layer 110 by vacuum deposition or sputtering, to provide an organic EL light emitting device. As in forming the organic EL layer 110, a cover film 111 is formed on a transparent electrode and wound-up by a winding-up roller. There will be described a method for laminating a polarizing film and a retardation film on the functional film comprising the organic EL light emitting device with reference to FIG. 3(*b*).

The functional film comprising the organic EL light emitting device is fed from a winding-off roll, a cover film on the functional film is peeled, and then a polarizing film is laminated on a functional thin film layer (transparent electrode) 112 on the functional film by lamination. In the functional film in which a polarizing film 113 is formed on a supporting film 115 and a cover film 111 is laminated on the polarizing film 113, a cover film 111 is peeled, and then a polarizing film 113 is laminated by a lamination method, on a functional thin film layer (transparent electrode) 112 on the functional film using a transfer roller via the supporting film 115. Next, the supporting film 115 is peeled, the polarizing film 113 is exposed, and a retardation film 116 is laminated on the polarizing film 113 by a lamination method.

The retardation film 116 is, after peeling the supporting film 115, transferred on the polarizing film 113 via the cover film 111 by a transfer roller.

When it is transferred via a transfer roller by lamination, it may be directly transferred on the functional thin film 112 using the transfer roller, but transfer via a film is more preferable because dust or damage is prevented in the functional thin film 112, the transferred polarizing film 113 and the retardation film 116.

For preventing a roller from damaging a functional thin film during transfer, the cover film is preferably an excoriation-resistant protective film. Preferable examples of an excoriation-resistant material include polyester resins and polyethylene resins.

For a functional film where a functional thin film is formed between a supporting film and a cover film, either the supporting film or the cover film can be peeled first.

Transfer via a transfer roller may be conducted by an appropriate method such as compression, thermocompression and adhesive methods, which is selected depending on a design.

Although the retardation film 116 is continuously transferred after transferring the polarizing film 113 in FIG. 3B, only the polarizing film 113 may be transferred by a roll-to-roll process and then the retardation film 116 may be transferred in a similar manner as shown in FIG. 3A.

After transferring the retardation film 116, the cover film 111 may be laminated on the retardation film 116 as shown in FIG. 3A (not shown).

In order to facilitate transfer and peeling, a peel layer may be placed between the film and the thin film. In FIG. 3, there is shown only one transfer roller, but a flat table or roller may be placed in the opposite surface via the film in the transfer roller. In a roll-to-roll process, pressing by a pair of rollers, rather than a flat table, is preferable because the film is not damaged.

In order to improve adhesiveness between the cover film and the functional thin film, an adhesion layer may be formed in the cover film. It is preferable that the adhesion layer is substantially adhesive when the cover film is laminated with the functional thin film layer, while it can be easily peeled during peeling. For example, an adhesive whose adhesive power is reduced by UV rays or heating is preferable.

Figure 4:
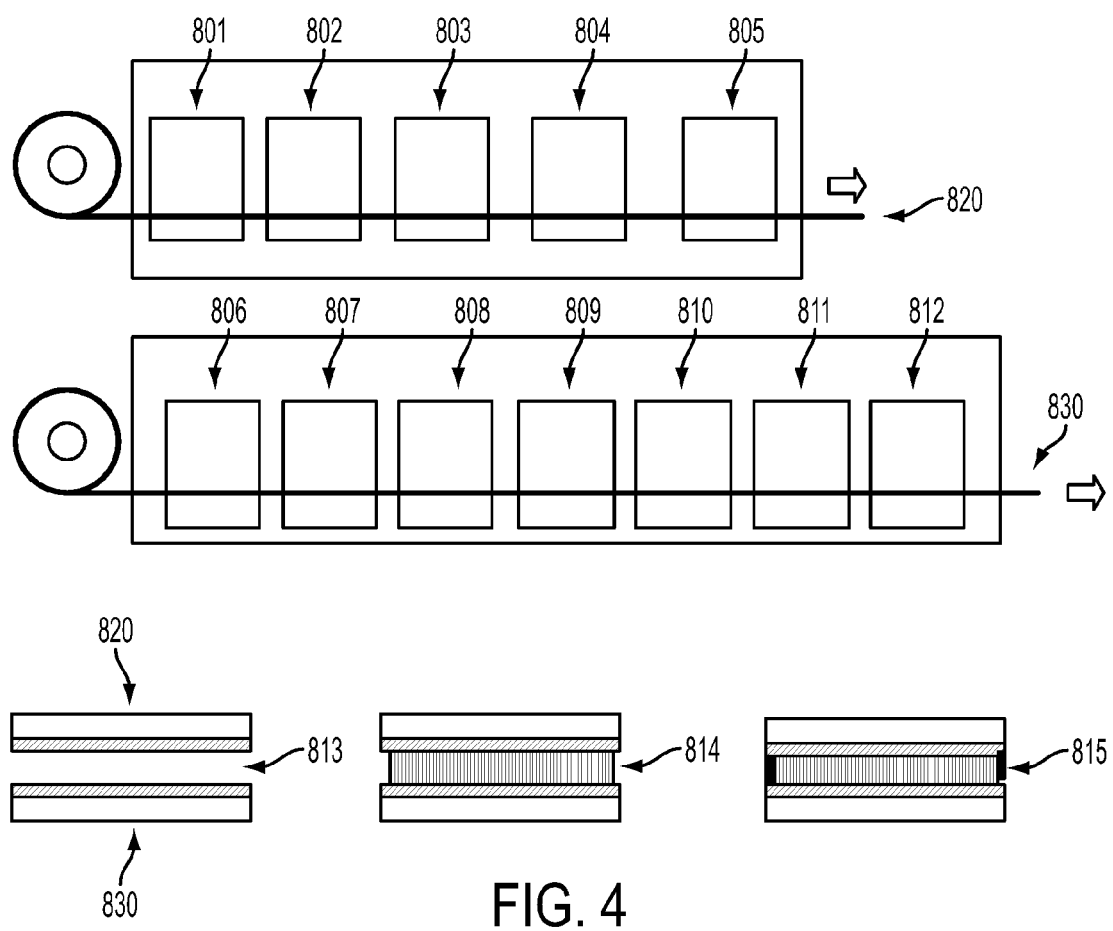
FIG. 4 is a conceptual view illustrating a process for manufacturing a liquid-crystal panel according to this invention.

There will be described a process for manufacturing a liquid-crystal panel equipped with a backlight with reference to the conceptual view of FIG. 4.

A barrier layer is formed on a thin film consisting of a first organic film as a base film. The barrier layer is formed for preventing interaction between a material used later and the base film material. For the purpose of this, an inorganic material such as $SiO_2$ and SiON is suitable. Next, for a retardation function, an optically anisotropic material such as a polymerizable liquid crystal is applied to a film substrate to form a retardation layer. Then, a layer having a polarizing function is formed on the retardation layer. The step is conducted by, for example, laminating a separately formed thin film having a polarizing function on a film substrate. Then, to the film substrate is transferred a circuit consisting of a thin-film transistor formed on a glass substrate by a conventional method, to form a TFT circuit layer. Finally, a color filter (CF)/black matrix (BM) and a spacer which have been formed on a dry film are transferred in one process, to form a color filter layer. Thus, a first functional film is provided. The color filter layer may be formed by applying a color filter material to a film substrate by an ink-jet process.

Next, there will be described a manufacturing process for a backlight. On a base film are formed a reflection electrode and then an organic EL layer. The organic EL layer is formed by vapor deposition when the organic EL material is a low molecular-weight material and an application process by an ink-jet method when the material is a high molecular-weight material. Then, a transparent electrode made of an electrically conductive transparent material to be an upper electrode in an organic EL layer is formed to provide an organic EL device layer to be a light source in a backlight. Next, on the upper surface of the organic EL device layer is formed a barrier layer as a protective layer. Then, a retardation layer and a polarizing layer are formed as described for the first functional film. Finally, a transparent electrode to be an upper electrode in a liquid crystal device is formed over the whole surface to provide a second functional film.

Finally, a first functional film and a second functional film are cut from the roll. Then, each film is oriented, a sealing material is applied and attached to the periphery of the display area, a liquid crystal is injected and the injection port is sealed to give an active matrix liquid-crystal panel with a backlight.

An active matrix liquid-crystal panel with a backlight may be prepared by orienting the first functional film and the second functional film, applying a sealing material to the periphery of the display area, laminating and cutting the first functional film and the second functional film, injecting a liquid crystal and sealing the injection port. In this process, the functional thin film surfaces 105 of the first functional film and the second functional film are faced each other and are laminated such that the longitudinal directions of these functional film are orthogonal to each other. Thus, alignment during lamination can be facilitated (see FIG. 5C).

Figure 5A:
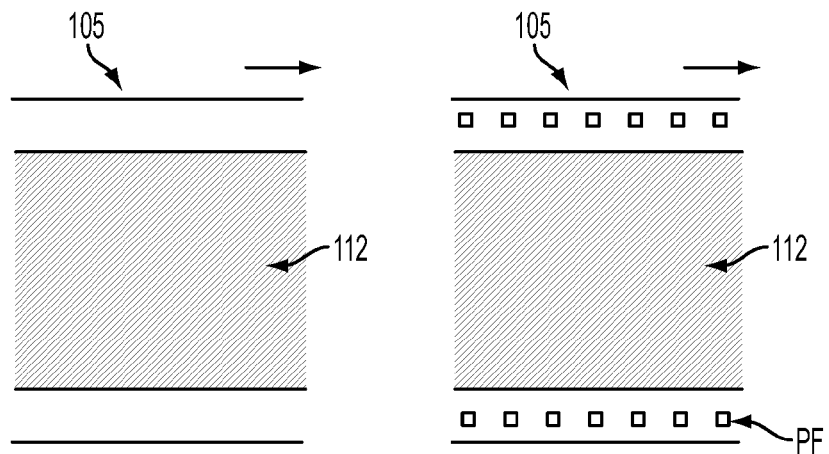
FIG. 5 shows a structure of a base film according to this invention.
Figure 5B:
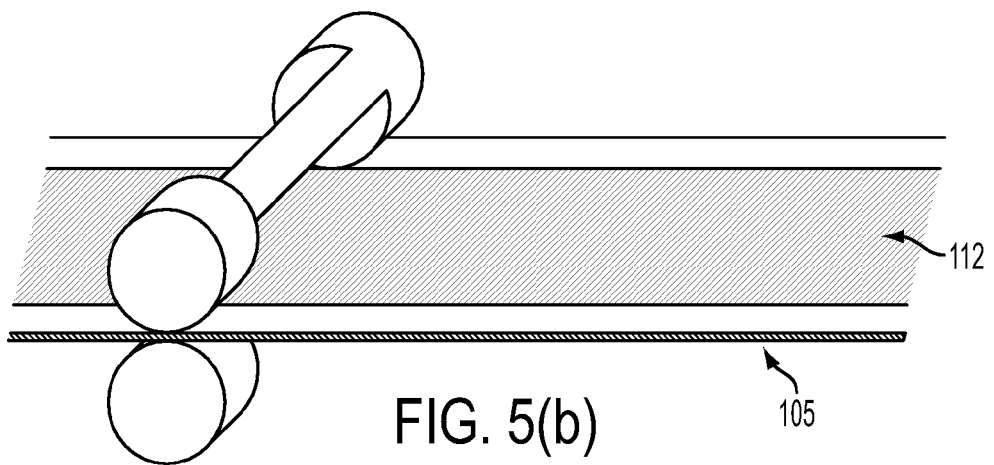
Figure 5C:
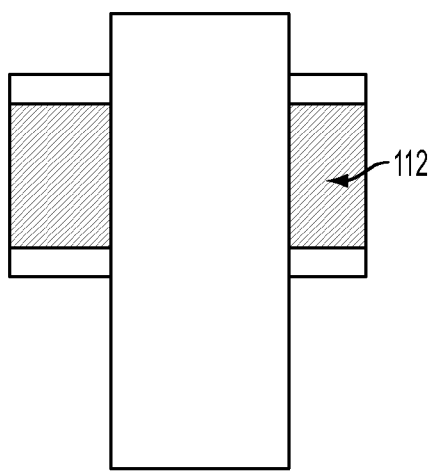

In this embodiment, the film is wounded from a roll to a roll while the functional thin film 112 is formed. If the roll for feeding is in contact with the functional thin film 112 formed on the base film 105, the roll is in contact with the surface of the functional thin film 112, leading to attachment of dusts on the surface of the functional thin film 112. As shown in FIGS. 5A and B, an optically functional layer or a functional device layer is preferably formed on the base film 105 while being separated from the edge orthogonal to the feeding direction of the base film. Since the base film 105 is fed while a functional device is formed on it, it must be designed to prevent bending in the surface of the base film. A distance from the edge is determined depending on the shape of the feeding roll, and the edge of the base film 105 may be perforated.

Each functional film described in the embodiment may be carried to the next process or stored while being wound-up as a roll.

When the functional film of this embodiment is wounded-up as a roll, the operation of each process is finished. The wound-up roll is conveniently carried and stored, as well as needs a narrower space in comparison with a conventional manufacturing process using a substrate.

There will be described a base film made of an organic resin as Embodiment 2 of this invention.

A base film as a supporting substrate for forming a liquid crystal display panel is required to be a plastic material which is thin, highly heat-resistant, transparent to a light, particularly to a light in the visible region and optically isotropic, i.e., having a small phase difference. It may be used as, in addition to a supporting substrate for forming a liquid-crystal panel, a supporting film for a functional thin film.

Furthermore, in terms of flexibility, it desirably has a curvature radius, r=40 mm or less as a measure of bending resistance. When r is at least 40 mm, a roll having a minimum diameter of $\phi$=100 mm which is used in a roll-to-roll process can be used. In addition, a liquid-crystal panel or a liquid crystal display comprising a highly flexible supporting substrate is resistant to falling impact because it can absorb the impact by bending. When r is 20 mm or more, breakage or wrinkling of the film can be prevented.

When a thin-shaped display device such as an electronic book is manufactured, feeling of a conventional paperback such as a pocket edition can be maintained.

When being mounted as a display device in an apparatus for a mobile application, it is essential that it is resistant to an impact and falling. In a conventional glass substrate, shock resistance is dependent on a part receiving a falling impact because of its material properties, and thus an impact to an edge may readily break the substrate. On the other hand, a plastic substrate exhibits a higher shock resistance than a glass, but when it receives an impact on an edge, the supporting substrate and a transistor or interconnection mounted on the supporting substrate are directly exposed to the impact as is in a glass substrate.

Reducing a weight of a liquid-crystal panel by improving flexibility of the supporting substrate and thinning the supporting substrate in the liquid crystal display panel may improve shock resistance owing to weight reduction.

In terms of a thickness, there are no particular restrictions to an upper limit when the substrate is used only in a roll-to-roll process. However, in the light of size reduction and weight reduction of the overall display device, the substrate is preferably thinner than 400 μm for a glass substrate, more preferably thinner than 200 μm for a plastic substrate. For meeting the requirements of size reduction and weight reduction in the overall display device, the thickness is preferably 10 μm to 150 μm, more preferably 10 μm to 100 μm. When it is 10 μm or more, wrinkling or breakage during carrying can be prevented.

In terms of heat resistance, the substrate is required to resistant to optical and mechanical distortion at a temperature when a functional film is formed. For the purpose of this, mechanical and optical variation is preferably at least 5% or less to a temperature history at 200° C., more preferably 5% or less to a temperature history at 250° C.

The term "optical variation" refers to deterioration in optical transparency and increase in a phase difference due to temperature variation and the term "mechanical variation" refers to deterioration in flexibility and variation in a dimension.

In terms of transparency, the substrate is required to be transparent in the visible range (380 nm to 800 nm). It exhibits higher transparency at least in the range of 450 nm to 700 nm, more preferably 400 nm to 700 nm, further preferably 380 nm to 800 nm (the visible range). When it exhibits higher transparency in the range of 450 nm to 700 nm, it is practically acceptable. Transparency in the range of 400 nm to 700 nm is more preferable and may be substantially adequate even for a case where the strictest hue is needed, but further preferably, it exhibits a high light transmittance in the overall visible range of 380 nm to 800 nm. A wider wavelength range exhibiting transparency may result in an image display device capable of more precisely reproducing an original color. It is substantially acceptable that to a desired thickness of the base film, a light transmittance (wavelength; 550 nm) is 80% or more, more preferably 85% or more, further preferably 90% or more.

It is necessary that a phase difference (wavelength; 550 nm) to a thickness of the base film is negligible to a ¼λ, ½λ retardation film. Generally, at a wavelength of 500 nm within the visible range, a value in a normal line direction in the plane of the base film is preferably 10% or less (about 10 nm or less), more preferably 5% or less (about 5 nm or less) of ¼λ. Here, 10 nm or less of a phase difference (wavelength; 550 nm) is acceptable.

When the base film has retarding function, ¼λ and ½λ values may be used.

Examples of a plastic material for a base film in terms of heat resistance include acrylic resins, epoxy resins, cyclic olefin resins, polyimides and polyamides. Meanwhile, in terms of higher transparency and optical isotropy, an acrylic resin or a cyclic olefin resin may be preferably used.

Since a base film must show minimum dimensional change during a process for manufacturing a display, a coefficient of thermal expansion is preferably 50 ppm/° C. or less. A coefficient of thermal expansion of a plastic material can be reduced by adding inorganic fillers. Inorganic fillers must be smaller than a wavelength of the visible light for maintaining transparency of the film, and a particle size of 380 nm or less is practically acceptable although transparency may be deteriorated around at the shortest wavelength of the visible light. More preferably a size of 1 to 100 nm can be used without deterioration in transparency in the overall visible range. Although a size of 1 nm or less may be acceptable, it is difficult to prepare fillers with a size of 1 nm or less by current technique.

When a base film is used as a supporting film in an optically functional thin film, it may be cured by UV rays. In such a case, the base film preferably exhibits a higher transmittance to UV rays. Thus, a particle size of inorganic fillers is preferably 1 nm to 200 nm, more preferably 1 nm to 200 nm. Although a size of 1 nm or less may be acceptable, it is difficult to prepare fillers with a size of 1 nm or less by current technique.

The amount of the inorganic fillers is preferably 5% by weight to 90% by weight both inclusive, more preferably 10% by weight to 50% by weight both inclusive. When it is 5% by weight or more, a coefficient of thermal expansion can be reduced and when it is 90% by weight or less, the substrate is resistant to breakage.

Examples of the inorganic fillers include titanium dioxide, zinc oxide, alumina and silicon oxide. The inorganic fillers can be incorporated, for example, by dispersing dry powdery silicon oxide particles using a mixer having higher dispersing ability; by blending a colloid (sol) dispersed in an organic solvent and other components and removing the organic solvent in vacuo optionally with stirring; or by blending a colloid (sol) dispersed in an organic solvent and other components, removing the solvent as necessary and then further removing the solvent by flow casting. An example of an apparatus having higher dispersing ability is a bead mill.

Since the base film of Embodiment 2 is a thin film made of an organic resin, common air components such as oxygen and moisture enters a liquid crystal layer and an organic EL layer. It may lead to adverse influence such as bubble generation and deterioration in a specific resistance in a liquid crystal device and forming of a non-emitting part in an emitting area in an organic EL device. Therefore, a gas barrier layer may be formed either one or both surfaces of the base film for preventing the air from entering. When it is formed in one surface of the base film, it may be effective on either side, but it may be more effective when being formed on the surface on which a functional thin film is to be formed.

A gas barrier layer must be transparent because the substrate must transmit a light. Thus, examples of a material of the gas barrier layer include organic materials such as polyvinyl alcohols and polyvinylidene chlorides; organic-inorganic composite materials such as those of an organic material with an inorganic material including a clay mineral (an amorphous clay mineral such as $Al_2O_3 \cdot 2SiO_2(5H_2O$ and $Al_2O_3SiO_2 \cdot 2\text{-}3H_2O$, or a crystalline clay mineral such as $(Si,Al)O_4$ tetrahedral sheet and $(Al,Mg)(O,OH)_6$ octahedral sheet); and a thin film of an inorganic material such as silicon oxide and aluminum oxide. A film thickness may be more reduced by using an inorganic material because it exhibits good gas barrier properties under a high humidity atmosphere and is effective with a smaller thickness. Furthermore, two or more of these layers may be laminated.

An organic material may reduce a cost because a gas barrier film can be in the form of a coating or laminated film in contrast to an inorganic material. It is inevitably inferior to a gas barrier film made of an inorganic material in terms of temperature dependency and moisture resistance. Thus, the organic material is desirably disposed in the surface facing the outside light in the liquid-crystal panel.

A thickness of a gas barrier layer is preferably 1 µm to 10 µm when it is made of an organic material or an organic-inorganic composite material and preferably 10 nm to 1 µm when it is made of an inorganic material. When it is made of an organic material or an organic-inorganic composite material, a thickness of 1 µm or more can adequately prevent common air components such as oxygen and moisture from entering a liquid crystal layer or an organic EL layer. A thickness of 10 µm or less does not influence properties of the base film such as an expansion coefficient.

When it is made of an inorganic material, a thickness of 10 nm or more can adequately prevent common air components such as oxygen and moisture from entering a liquid crystal layer or an organic EL layer, while a thickness of 1 µm or less can prevent breakage during bending.

A gas barrier layer can be formed on a film by an application method for an organic material or an organic-inorganic composite material and by any of various film deposition methods for an inorganic material. In an application method, a liquid such as a liquid organic material or a solution thereof is applied on a film and is dried or cured to form a film. Examples of film deposition include physical growth methods such as vapor deposition, ion plating and sputtering; and chemical vapor growth methods such as plasma CVD and catalytic CVD under reduced pressure, and CVD under an atmospheric pressure. Among these, sputtering is particularly preferable because it can provide a dense film at a low temperature.

Although there has been described a base film which is thin, heat resistant, transparent to a light, particularly a visible light and optically isotropic, i.e., having a small phase difference (optical lag) as Embodiment 2, an optically anisotropic film can be used.

A base film may have retarding function and/or polarizing function.

For example, when a phase difference in the base film is $\lambda/2$, $\lambda/4$, it is not necessary to endow the base film with retarding function later. When the film has polarizing function, it is not necessary to endow the base film with polarizing function later.

Furthermore, when endowing the base film with light-emitting function, it can have a structure where a light does not pass through the base film as described later. In such a case, the base film is not necessarily light-transmissive, and thus the base film itself may have gas barrier function.

There will be described a manufacturing process where a peripheral functional circuit and a thin-film transistor for driving a pixel are transferred on a base film as Embodiment 3 of this invention.

In order to reduce the number of components, narrow a frame and reduce power consumption in a liquid crystal display, it is essential to integrate, on a substrate, a DA converter, a liquid crystal driving circuit and so forth, which have been conventionally external parts. Therefore, transistor performance of a thin-film transistor for driving a pixel cannot be deteriorated. Thus, in this embodiment, a thin-film transistor is formed on a glass substrate by a conventional process, the glass substrate is removed, and then the thin-film transistor formed on the glass substrate is transferred to a base film.

A polysilicon thin-film transistor may be prepared by either a high-temperature process or low-temperature process. In a high-temperature process, a glass substrate resistant to high-temperature such as a quartz substrate or fused quartz substrate must be used. Since a quartz substrate or fused quartz substrate may lead to problems such as difficulty/much time in etching off, a low-temperature process in which a common glass substrate can be used is preferable.

When etching off the glass substrate, it is necessary to prevent damage on the transistor by forming a barrier film on the glass substrate for stopping etching and a protective film on the surface of the transistor. The barrier film preferably gives a low etching rate to a glass etchant, and is desirably a nitride or oxynitride film.

The protective film must be made of a material resistant to a strong acid such as hydrofluoric acid. During etching, a temperature of the etchant must be kept constant for uniform etching.

There will be described a retardation film in Embodiment 4. The retardation film may be an application type retardation film or lamination type retardation film. First, an application type retardation film will be described.

An application type retardation film is formed by applying a polymerizable liquid crystal composition containing a liquid crystal compound having a polymerizable group on a support by a common application method to give a liquid crystal thin film. The surface which is not in contact with the substrate in the liquid crystal thin film is preferably in contact with the dust-removed dry air or an inert gas such as nitrogen, more preferably an inert gas such as nitrogen. Then, the polymerizable liquid crystal composition is oriented at a temperature within a range where a liquid crystal phase is formed, and then was polymerized to give a solid thin film. A film thickness and a birefringence of the retardation film are selected, depending on phase control properties required for a liquid crystal display panel.

Since the polymerizable liquid crystal composition is directly applied to the support, an application type retardation film may have a significantly reduced film thickness (e.g., 100 µm or less) in comparison with a lamination type retardation film. An application type retardation film has a film thickness of preferably 0.1 µm to 30 µm, more preferably 0.3 to 15 µm, further preferably 0.5 µm to 10 µm. A birefringence may generally vary within a range of 0.0 to 0.5 as a composition of the polymerizable liquid crystal composition varies. A film thickness and a birefringence can be determined, depending on a required retardation as in a ½ wavelength plate or a ¼ wavelength plate and convenient manufacturing conditions.

Next, there will be described a material for an application type retardation film.

A polymerizable liquid crystal compound used in this embodiment may be any compound which can be applied to a plastic sheet and can be oriented utilizing its liquid crystal state, but it must be a compound in which a temperature range where thermal polymerization of the polymerizable group is not initiated is at least partially contained in a temperature range where the compound is in a liquid crystal state. Furthermore, it must be able to be applied and oriented within the temperature range. A film having phase-difference controlling function in this invention preferably has a thickness as small as possible. In other words, a film having a higher birefringence is preferable. Specifically, a composition containing the following compound may be shown as an example.

A polymerizable liquid crystal composition where a monofunctional acrylate or methacrylate is represented by formula (1):

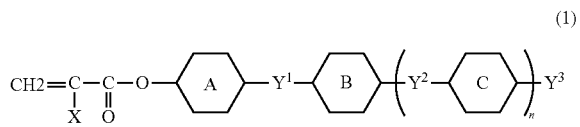

wherein X represents hydrogen or methyl; 6-membered rings A, B and C independently represent

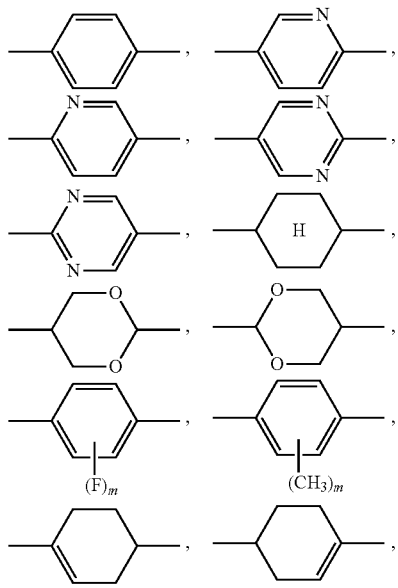

wherein n represents an integer of 0 or 1; m represents an integer of 1 to 4; $Y_1$ and $Y_2$ independently represent a single bond, —CH$_2$CH$_2$—, —CH$_2$O—, —OCH$_2$—, —COO—, —OCO—, —C(C—, —CH=CH—, —CF=CF—, —(CH$_2$)$_4$—, —CH2CH2CH2O—, —OCH$_2$CH$_2$CH$_2$—, —CH=CHCH$_2$CH$_2$— or —CH$_2$CH$_2$CH=CH—; $Y_3$ represents hydrogen, halogen, cyano, alkyl having 1 to 20 carbon atoms, alkoxy, alkenyl or alkenyloxy.

Next, there will be more specifically described a process for manufacturing an application type retardation film.

An application type retardation film is prepared by forming an oriented film on a transparent support, rubbing the film as necessary, applying a layer containing a polymerizable liquid crystal on the film, drying it by removing an unnecessary solvent, orienting the liquid crystal and decomposing a preliminarily added photo- or thermal-polymerization initiator by UV irradiation or heating to initiate polymerization of the liquid crystal. If necessary, a protective layer may be applied on the film.

The polymerizable liquid crystal is preferably dissolved in an appropriate solvent before application. Although the type of a solvent or a concentration cannot be generally determined because a liquid crystal has a different property depending on its structure, a solvent in which the liquid crystal is dissolved in a higher solubility is preferable in the light of providing a homogeneous thin film, preferably including halogen compounds such as dichloromethane and chloroform; ketones such as acetone and methyl ethyl ketone; esters such as ethyl acetate; amides such as dimethylacetamide, dimethylformamide and N-methyl-pyrrolidone; and alcohols such as isopropanol and perfluoropropanol.

It is well known in a liquid crystal that an oriented film may often give significant influence on molecular orientation during forming a liquid crystal phase, and an inorganic or organic oriented film is used. Although there may be a combination of a liquid crystal and a support in which an effective orientation may be obtained only by rubbing the support surface and then applying the combination on it, the most universal method involves the use of an oriented film.

Typical examples of an oriented film formed on a support include an SiO evaporated film as an inorganic rhombic evaporated film and a polyimide film in which an organic polymer film has been rubbed.

A typical example of an organic oriented film is a polyimide film. In this film, a polyamic acid (for example, AL-1254 (JSR Corporation), SE-7210 (Nissan Chemical Industries, Ltd.)) can be applied on a support surface, fired at a temperature of 100° C. to 300° C. and then rubbed to orient the liquid crystal. A coating film of alkyl-chain modified Poval (for example, MP203, R1130 (both from Kuraray Co., Ltd.)) can be endowed with the orienting ability only by rubbing without firing. In addition, most of organic polymer films giving a hydrophobic surface such as polyvinylbutyral and polymethyl methacrylate may be endowed with a liquid crystal orienting ability only by rubbing the surface.

A typical inorganic rhombic evaporated film is an SiO rhombic evaporated film. It is prepared by colliding SiO vaporized particles on a support surface from an oblique direction in a vacuum chamber to form an oblique evaporated film with a thickness of about 20 to 200 nm as an oriented film. With the evaporated film, when the liquid crystal is oriented, an optical axis of the liquid crystal layer is oriented to a particular direction on a plane perpendicular to the support surface including the track of SiO vapor-deposited particles.

It is also advantageous in that when using a silicon oxide (SiO) rhombic evaporated film as an oriented film, a gas barrier film in the base film as described in Embodiment 2 can be used. Here, silicon oxide is desirably SiO$_x$ (x=1.6 to 1.9).

In addition to the above method, a polymerizable liquid crystal applied on a support may be also oriented by magnetic-field or electric-field orientation. In this method, after applying on a support, a liquid crystal compound may be oriented to an oblique direction, using a magnetic or electric field from a desired angle.

In the manufacturing process for a retardation film, a common application method may be employed. Specifically, it may be formed as a liquid crystal thin film on a support by an application step using an appropriate method such as flexographic printing, gravure printing, dip coating, curtain coating and extrusion coating and then a drying step.

Next, there will be described a lamination type retardation film according to another form of this embodiment.

A lamination type retardation film is prepared by laminating a pre-formed retardation film with a base film via an agglutinant or adhesive.

It is preferable in this embodiment to use an aromatic polyamide or aromatic polyimide because a film can been thinned more than ever while maintaining dimensional stability required during manufacturing an LCD. Thus, a thickness of a retarding function layer may be reduced to several microns.

As a result, a thin film can be more thinned than a conventional film such as polycarbonate resin films, polyether sulfone resin films, polysulfone resin films, cyclic polyolefin resin films, cellulose resin films and acrylic resin films having a thickness of 60 μm or more for obtaining a required phase difference and self-supporting ability.

A preferable aromatic polyamide a repeating unit represented by, for example, formula (2) and/or formula. (3) in 50 mol % or more, more preferably 70 mol % or more.

In the light of rigidity and heat resistance of the film, the repeating unit is contained preferably in 50 mol % or more, more preferably in 70 mol % or more;

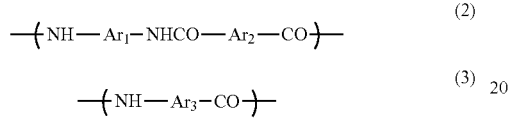

(2)

(3)

wherein $Ar_1$, $Ar_2$ and $Ar_3$ may be selected from, for example,

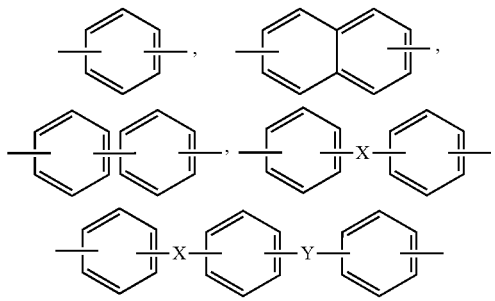

and fluorene residue; and X and Y may be selected from, but not limited to, —O—, —CH$_2$—, —CO—, —SO$_2$—, —S—, —C(CH$_3$)$_2$—, —CF2— and —C(CF$_3$)$_2$—.

It may be selected from those in which one or more hydrogens on the aromatic ring are replaced by a substituent including halogen such as fluorine, chlorine and bromine; nitro; alkyl such as methyl, ethyl and propyl; alkoxy such as methoxy, ethoxy, propoxy and isopropoxy; hydroxyl; and trifluoromethyl, and those in which hydrogen in an amide bond constituting the polymer is replaced by another substituent.

In the light of film properties, preferred is a polymer in which a moiety having the para-oriented aromatic rings, i.e., those in which bivalent bonds are connected coaxially or in parallel, accounts for 50 mol % or more, preferably 75 mol % or more of the total aromatic rings because such a film can exhibit higher rigidity and heat resistance.

In the light of film properties, preferred is a polymer in which a moiety having the para-oriented aromatic rings, i.e., those in which bivalent bonds are connected coaxially or in parallel, accounts for 50 mol % or more, preferably 75 mol % or more of the total aromatic rings because such a film can exhibit higher rigidity and heat resistance. Examples of two aromatic rings having para-orientation are shown in formula (7):

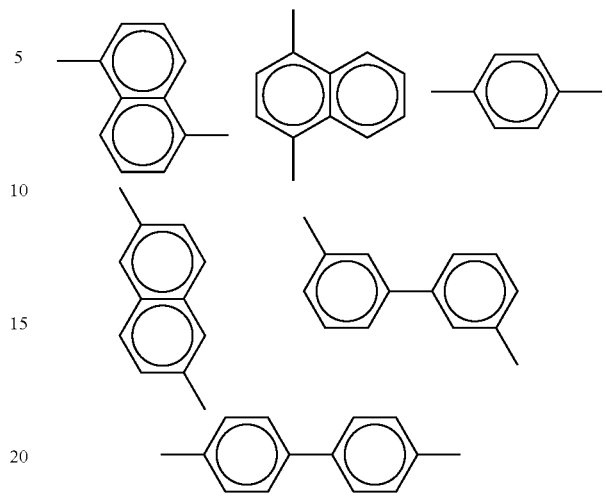

(7)

An aromatic polyamide used in this invention preferably contains the repeating unit represented by general formula (2) and/or general formula (3) in 50 mol % or more. When the content is less than 50 mol %, another repeating unit may be introduced by copolymerization or blending.

A retardation film used in this invention preferably has a thickness of 1 μm to 50 μm for thinning a display. When the thickness is 1 μm or more, the aromatic polyamide film is highly rigid and heat resistant, so that deterioration in flatness or increase in a phase difference spot due to heating during its use can be avoided. When the thickness is 50 μm or less, a light transmittance is not reduced. The thickness is preferably 2 μm to 30 μm, more preferably 2 μm to 15 μm, further preferably 3 μm to 10 μm, most preferably 3 μm to 8 μm.

Next, there will be an aromatic polyimide. An aromatic polyimide according to this embodiment contains at least one aromatic ring and at least one imide ring in a polymer repeating unit, and preferably contains a repeating unit represented by formula (8) and/or formula (9) in 50 mol % or more, more preferably 70 mol % or more.

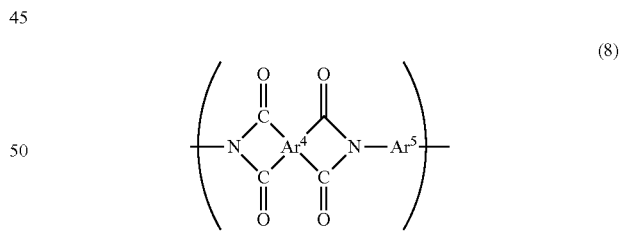

(8)

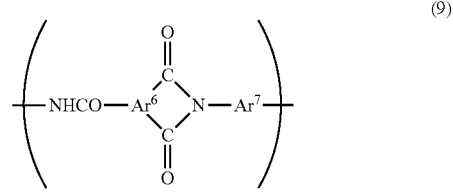

(9)

wherein $Ar^4$ and $Ar^6$ contain at least one aromatic ring; and two carbonyl groups forming an imide ring are bound to the adjacent carbon atom on the aromatic ring. $Ar^4$ is derived from an aromatic tetracarboxylic acid or its anhydride. Typical examples are as follows:

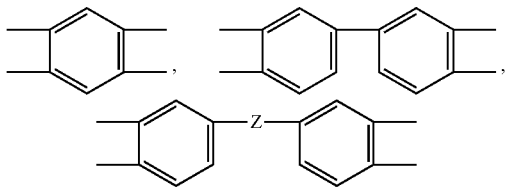

wherein Z is selected from, but not limited to, —O—, —$CH_2$—, —CO—, —$SO_2$—, —S— and —C($CH_3$)$_2$—.

$Ar^6$ is derived from a carboxylic anhydride or its halide. Examples of $Ar^5$ and $Ar^7$ include, but not limited, to:

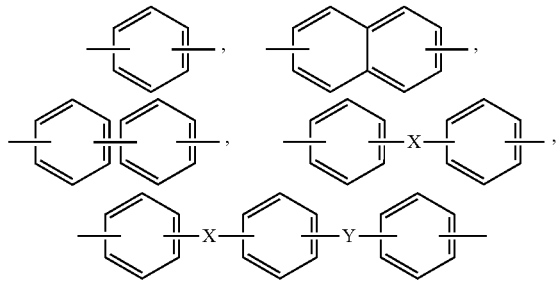

wherein X and Y are selected from, but not limited to, —O—, —$CH_2$—, —CO—, —$SO_2$—, —S— and —C($CH_3$)$_2$—.

It may be selected from those in which one or more hydrogens on the aromatic ring are replaced by a substituent including halogen (in particular, chlorine); nitro; alkyl having 1 to 3 carbon atoms (in particular, methyl); and alkoxy having 1 to 3 carbon atoms, and, when an amide bond is contained in the polymer, those in which hydrogen in the amide bond is replaced by another substituent.

An aromatic polyimide in this invention contains the repeating unit represented by formula (8) and/or (9) in 50 mol % or more, and when the content is less than 50 mol %, another repeating unit may be introduced by copolymerization or blending. The retardation film in this invention has a phase difference of 50 to 3,000 nm, preferably 60 to 500 nm, more preferably 60 to 380 nm, further preferably 80 to 280 nm at a wavelength of 550 nm.

A phase difference in a film must be appropriately designed depending on its application (e.g., ½λ plate, ¼λ plate). However, with a phase difference within the above range, a film exhibiting excellent optical properties and processability can be prepared even when the film is thinned using an aromatic polyamide or aromatic polyimide.

It can be of course understood that a thickness of the retardation film can be reduced by endowing the base film to be laminated with the retarding function.

In the retardation film in this embodiment, it is preferable that a dimensional variation in a lag axis direction and a direction perpendicular to the lag axis direction at 150° C. is 2% or less, more preferably 1.5% or less, further preferably 1% or less, most preferably 0% because wrinkles can be prevented during processing such as lamination and variation in optical properties can be minimized due to variation in a tensile under heating.

The term "lag axis" as used herein refers to a direction in a plane in which a phase difference is maximum. In a retardation film, it is generally a direction in which a draw ratio is maximum.

The retardation film in this embodiment can have a large birefringence without partial deterioration in color tone in a liquid crystal display even when it is exposed to an extreme temperature or external force during processing because a phase difference varies by a photoelastic effect. Furthermore, since the film has a large photoelastic coefficient, it can be thinned. In addition, since it exhibits good heat resistance and rigidity, it may not be distorted even under an high-temperature or a high tension.

For preventing tone variation in a liquid crystal display (LCD), a light transmittance at any wavelength within the range of 450 nm to 700 nm is preferably 80% or more, more preferably 85% or more, further preferably 90% or more.

Furthermore, in a film of this invention, a light transmittance at 400 nm is preferably 65% or more, more preferably 75% or more, most preferably 90% or more. When a light transmittance at 400 nm is 65% or more, transparency can be further improved.

It is preferable that the film of this embodiment has a Young's modulus of 4 GPa or more in at least one direction as determined in accordance with JIS-C2318 because it can be resistant to a force applied during processing or its use and flatness can be further improved. The film can be thinned when a Young's modulus in at least one direction is 4 GPa or more.

If a Young's modulus in any direction is less than 4 GPa, deformation may occur during processing. Although there is not a particular upper limit to a Young's modulus, a Young's modulus of more than 20 GPa may lead to deterioration in film toughness and thus to difficulty in film deposition or processing. A Young's modulus is more preferably 8 GPa or more, further preferably 10 GPa or more.

In the film of embodiment, a coefficient of thermal expansion from 80° C. to 120° C. is preferably 50 to 0 ppm/° C. A coefficient of thermal expansion is measured in the course of cooling after warming to 150° C. using TMA. Assuming that an initial sample length at 25° C. and 75 RH % is L0, a sample length at a temperature of T1 is L1 and a sample length at a temperature of T2 is L2, a coefficient of thermal expansion from T1 to T2 can be determined by the following equation.

Coefficient of thermal expansion (ppm/° C.)=((L2−L1)/L0)/(T2/T1)×10$^6$

A coefficient of thermal expansion is more preferably 30 to 0 ppm/° C., further preferably 20 to 0 ppm/° C. In the film of this embodiment, a coefficient of humidity expansion at 25° C. and from 30% RH to 80% RH is preferably 200 to 0 ppm/% RH. A film sample with a width of 1 cm and a length of 15 cm is fixed in a high-temperature and high-humidity chamber, the atmosphere is dehumidified to a certain humidity (about 30% RH), and after the film length becomes constant, it is humidified (about 80% RH) to extend by moisture absorption. After 24 hours, moisture absorption comes to equilibrium and film extension also comes to equilibrium. From the extended length observed, a coefficient of humidity expansion is calculated in accordance with the following equation.

Coefficient of humidity expansion ((cm/cm) % RH)=extended length/(sample length×humidity difference)

A coefficient of humidity expansion is more preferably 100 to 0 ppm % RH, further preferably 30 to 0 ppm % RH. A small coefficient of thermal expansion and a small coefficient of humidity expansion may result in reduction in environmental dimensional variation and thus less variation in optical properties such as a phase difference.

The film of this embodiment may be used in one sheet as a retardation film, or alternatively may be laminated with the same or different type of retardation film.

There will be described an example of manufacturing an aromatic polyamide film.

An aromatic polyamide can be prepared by various methods such as low-temperature solution polymerization, interfacial polymerization, melt polymerization and solid-phase polymerization. When being prepared by low-temperature solution polymerization, i.e., from a carboxylic dichloride and a diamine, the synthesis is conducted in an aprotic organic polar solvent.

Examples of a carboxylic dichloride include terephthalic dichloride, 2-chloro-terephthalic dichloride, isophthalic dichloride, naphthalenedicarbonyldichloride, biphenyidicarbonylchloride and terphenyidicarbonylchloride. For preparing the aromatic polyamide film of this embodiment, 2-chloro-terephthalic dichloride or terephthalic dichloride is used.

When using an acid dichloride and a diamine as monomers, an aromatic polyamide solution obtained contains hydrogen chloride as a byproduct, which is neutralized with a neutralizing agent including inorganic neutralizing agents such as calcium hydroxide, calcium carbonate and lithium carbonate; and organic neutralizing agents such as ethylene oxide, propylene oxide, ammonia, triethylamine, triethanolamine and diethanolamine. A reaction between an isocyanate and a carboxylic acid is effected in the presence of a catalyst in an aprotic organic polar solvent.

Polymerization using two or more diamines can be conducted by a stepwise reaction procedure where to one diamine is added 10 to 99 mol % of an acid dichloride to initiate a reaction, then another diamine and then the acid dichloride are added to initiate a reaction, and so on, or alternatively a procedure where all the diamines are blended and to the mixture is added an acid dichloride to initiate a reaction. Polymerization using two or more acid dichlorides can be similarly conducted by a stepwise or simultaneous-addition procedure. In any case, a molar ratio of the total diamines to the total acid dichlorides is preferably 95 to 105:105 to 95. If the ratio is outside of the range, a polymer solution suitable for molding cannot be obtained.

Examples of an aprotic polar solvent used in manufacturing the aromatic polyamide of this embodiment include sulfoxide solvents such as dimethylsulfoxide and diethylsulfoxide; formamide solvents such as N,N-dimethylformamide and N,N-diethylformamide; acetamide solvents such as N,N-dimethylacetamide and N,N-diethylacetamide; pyrrolidone solvents such as N-methyl-2-pyrrolidone and N-vinyl-2-pyrrolidone; phenol solvents such as phenol, o-, m- or p-cresol, xylenols, halogenated phenols and catechol; hexamethylphoshoramide; and γ-butyrolactone, which is desirably used alone or as a mixture. Furthermore, aromatic hydrocarbons such as xylenes and toluene can be used.

In order to accelerate dissolution of a polymer, an alkali metal or alkaline-earth metal salt can be added to a solvent in 50% by weight or less.

The use of an aromatic diacid chloride and an aromatic diamine as monomers results in generation of hydrogen chloride as a byproduct, which is neutralized with a neutralizing agent including inorganic neutralizing agents such as calcium hydroxide, calcium carbonate and lithium carbonate which are salts of a cation of Group I or II in the periodic table with an anion such as hydroxide or carbonate ion, and organic neutralizing agents such as ethylene oxide, propylene oxide, ammonia, triethylamine, triethanolamine and diethanolamine. Furthermore, for improving humidity properties of a base film, to a polymerized system can be added, for example, benzoyl chloride, phthalic anhydride, acetyl chloride or aniline to block the ends of the polymer. A reaction between an isocyanate and a carboxylic acid is effected in the presence of a catalyst in an aprotic organic polar solvent.

Furthermore, the aromatic polyamide of this embodiment can contain 10% by weight or less of an inorganic or organic additive in order to improve surface forming and processability. Although the additive can be colorless or colored, a colorless and transparent material is preferable in the light of avoiding deterioration in the features of the transparent aromatic polyamide film of this embodiment. Examples of an additive for surface forming include inorganic particles such as $SiO_2$, $TiO_2$, $Al_2O_3$, $CaSO_4$, $BaSO_4$, $CaCO_3$, carbon black, carbon nanotube, fullerene, zeolite and metal fine powder; organic particles such as organic polymer particles including cross-linked polyvinylbenzene, cross-linked acrylates, cross-linked polystyrene, polyester particles, polyimide particles, polyamide particles and fluororesin particles; and inorganic particles processed by, for example, surface coating with any of the above polymers.

Furthermore, a dye can be added to the aromatic polyamide of this embodiment to combine tune compensation functions. Examples of dyes which can be suitably used include inorganic pigments such as cobalt blue and organic dyes such as phthalocyanine.

These polymer solutions as such may be used as a film-deposition stock solution. Alternatively, a polymer is isolated and then dissolved in any of the above organic solvents or an inorganic solvent such as sulfuric acid before being used as a film-deposition stock solution.

There will be described film formation. A film-deposition stock solution prepared as described above is used for film forming by a so-called solution film-deposition method. Examples of a solution film-deposition method include a dry-wet method, a dry method and a wet method. Any of these can be used for film deposition, but herein, a dry-wet method will be described as an example.

When a film is deposited by a dry-wet method, the stock solution is extruded from a nozzle on a support such as a drum and an endless belt to form a thin film. Then, the solvent is evaporated from the thin film layer, and the thin film is dried until it becomes self-maintaining. Drying can be conducted under the conditions of a temperature: room temperature to 220° C. and a period: up to 60 min. The smoother the surface of the drum or the endless belt used in this drying step is, the smoother a film obtained is. The film after the drying step is peeled from the support and introduced to a wet step, subjected to desalting and solvent removal, and further subjected to drawing, drying and heating to provide a retardation film.

A draw ratio as a surface draw ratio, which is a measure of drawing is preferably within a range of 0.8 to 8, more preferably 1.3 to 8 (a surface draw ratio is defined as a value obtained by dividing a film area after drawing by a film area before drawing. A value of 1 or less means relaxation). Heating is preferably conducted at a temperature of 200° C. to 500° C., preferably 250° C. to 400° C. for several seconds to several minutes. In addition, it is effective to slowly cool a film after drawing or heating; specifically, cooling at a rate of 50° C./sec or less is effective. The film prepared from the aromatic polyamide of this embodiment may be a monolayer film or laminate film.

There will be described a polarizing film as Embodiment 5 of this invention. A polarizing film which can be preferably used as this embodiment is prepared by forming a film as described in (1) or (2) below and transferring only a polarizing function layer to a base film by means of heat, pressure or an adhesive. Furthermore, it is also useful to separately prepare a mold-releasing film to be a matrix base for a polarizing film, forming a polarizing function layer in a peelable state on the mold-releasing film, then transferring only the polarizing function layer to a base film and sticking it by, for example, heat, pressure or an adhesive.

There are two preparation methods: (1) a polarizing film orientationally adsorbed by a polymer film in which iodine or a dichroic dye is strongly molecular-oriented in one axis direction and is laminated with a base film by, for example, heat, pressure, a glue or an adhesive; and (2) a resin pellet containing iodine and/or dichroic dye is shaped into a film by, for example, melt extrusion or solution casting; the film is drawn to form a polarizer in which iodine and/or a dichroic dye is strongly oriented in one axis direction; and then the polarizer is laminated with a base film by, for example, heat, pressure, a glue or an adhesive.

Examples of a resin used herein include polyvinyl alcohol resins such as polyvinyl alcohols, partially formated polyvinyl alcohols and partially saponified ethylene-vinyl acetate copolymers; polyester resins such as polyolefin resins, acrylic resins, PET (polyethylene terephthalate) and PEN (polyethylene naphthalate); polyamide resins; polyamide imide resins; polyimide resin; polycarbonate resins; and polysulfone resins.

There will be described a color filter as Embodiment 6. A color filter of this embodiment is any of two types, i.e., a film type color filter and a direct drawing type filter prepared by an ink-jet method.

There will be described first a film type color filter and then a direct drawing type color filter.

Embodiment 6: film type color filter

For a film type color filter, on a supporting substrate are formed black (black matrix), red, green and blue (color filter) layers. In this embodiment, on a supporting substrate are formed these four color filter resin layers, which are sequentially transferred on a color filter matrix base.

These four color filter resin layers may be made of either a photosensitive colored resin or a colored resin.

There will be described a case where a photosensitive colored resin is used. Photosensitive colored resins to be four color filters are deposited on separate first supporting substrates. Next, a cover film is laminated on each photosensitive resin, which is then wound-up. The first supporting substrate is laminated with a second supporting substrate via the photosensitive colored resin layers. It is then exposed from the side of the first supporting substrate via a mask. After the exposure, the first supporting substrate is peeled, developed and then dried.

Although depending on the type of a cross-linking agent contained in a photosensitive resin, a drying temperature must be lower than a temperature at which a cross-linking reaction is initiated. The temperature is generally determined on the basis of the pre-determined conditions before production in the light of relationship between a cross-linking agent and a manufacturing apparatus, but it is usually lower by 30° C. to 50° C. than an initiation temperature of the cross-linking reaction. The lower limit is determined so as to avoid an excessively longer drying time, while the upper limit is determined such that trailing of a lower part is avoided while an unwanted part is removed in development.

Generally, first a black matrix is transferred to a second matrix base for a color filter (hereinafter, referred to as "CF matrix base") to form a black matrix layer. During transferring each color filter to a CF matrix base, it is exposed from the side of the first supporting substrate, developed and then dried, to form individual colors in sequence. Thus, all of the four color filters are transferred and formed on the CF matrix base, to provide a color filter layer.

The color filter layer thus prepared is laminated on a functional film comprising, for example, a thin-film transistor (hereinafter, referred to as "TFT"), an interconnection and a pixel electrode. On the color filter layer, there may be formed a spacer layer for defining a distance to an opposite oriented film or a transparent electrode.

The photosensitive resin layer is preferably weakly sticked because it is laminated with a first supporting substrate and a cover film and then peeled.

In addition to the photosensitive colored resin, a colored resin may be used. In such a case, an unwanted part in the colored resin must be etched off via a photoresist after transferring. Thus, it must be weakly sticked during etching off while it must be firmly sticked after drying.

Among the four color filters, chromium can be used only in the black filter. Chromium can be deposited by physical vapor deposition.

Next, there will be detailed a color filter prepared by an ink-jet process as another embodiment of this embodiment.

Embodiment 6: ink-jet type color filter

An ink-jet type color filter as this embodiment is prepared by directly drawing a colored resin consisting of a pigment on a film by ink-jet technique. Color filter layers of black matrix, red, green and blue can be directly drawn on a surface of a functional film on which a color filter is to be formed. Alternatively, on a supporting substrate is formed a color filter, which may be then transferred to a functional film by a transfer method. A black matrix may be prepared by depositing chromium on a supporting substrate (the CF base as described for a film type) by physical vapor deposition. As an example, there will be described drawing the remaining three colors by ink-jet technique. Red, green and blue can be simultaneously or in this sequence drawn. When drawing red, green and blue in sequence, one color may be drawn and then dried before drawing the next color. The order of these colors is, of course, not limited to that in the above description.

As Embodiment 7 of this invention, there will be described an oriented film.

A liquid-crystal panel of this invention may be assembled as follows.

1. On a substrate cut from each of functional films A and B is applied an optically oriented material, which after drying, is subjected to optical orientation and polymerization to provide an optically oriented film. Then, the surfaces having the optically oriented film are faced each other via a spacer such that their optical orientation directions are orthogonal. Then, after applying a sealing material to the periphery of a display area, the substrates are laminated, a liquid crystal is injected and the injection port is sealed.

2. Each substrate cut from functional films A and B is subjected to optical orientation and polymerization to form an optically oriented film. Next, on the surfaces having the optically oriented film is placed a sealing material to be a spacer at a desired position, a liquid crystal is added dropwise and then the substrates may be laminated.

3. Although the above 1, 2 are methods where a liquid crystal is injected between the substrates cut from the functional films A and B, a panel may be prepared by applying an optically oriented material on a matrix base, which after drying, is then subjected to optical orientation and polymerization to form an optically oriented film; then transferring the optically oriented film to the functional films A and B between which a liquid crystal is to be sandwiched); then applying a sealing material; facing them as films such that their optical orientation directions are orthogonal; filling a liquid crystal as described in 1 or 2; after sealing, cutting into the shape of the panel or alternatively after laminating them via a sealing material, cutting into the shape of the panel, filling a liquid crystal and then sealing the port.

In the above assembling methods 1 and 2, optical orientation directions are not necessarily orthogonal, depending of properties of a liquid crystal or a configuration of a liquid-crystal panel.

An oriented film may be an optically oriented film or alternatively an oriented film endowed with orientation by rubbing a surface of a film on which a liquid crystal orienting agent has been applied. First, there will be described an optically oriented film and next a process for endowing orientation by rubbing.

Optically Oriented Film

An optically oriented film material used is an optically oriented material containing a dichroic dye having a polymerizable group. Here, the dichroic dye is preferably an azo dye derivative having a polymerizable group or an anthraquinone dye derivative having a polymerizable group. In particular, an azo dye derivative having a polymerizable group is preferably an optically oriented material represented by formula (4):

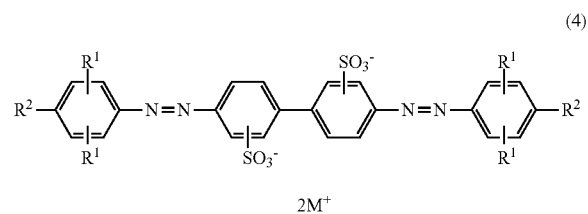

(4)

wherein $R^1$s are independently selected from the group consisting of hydrogen, halogen, carboxyl, halogenated methyl, halogenated methoxy, cyano and hydroxy; M represents hydrogen, alkali metal or $NH_4$; and $R^2$ represents a polymerizable group optionally having a linking chain.

An anthraquinone dye derivative having a polymerizable group is preferably an optically oriented material represented by formula (5):

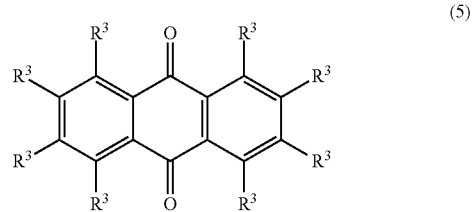

(5)

wherein $R^3$s independently represent a polymerizable group, and at least one of $R^3$s may have a linking chain and the remaining $R^3$s are at least one selected from the group consisting of hydrogen, halogen, hydroxy, nitro, sulfonic, sulfonate, halogenated methyl, cyano, amino, formyl, carboxyl, piperidino and a radical represented by general formula (6):

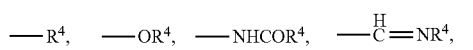

(6)

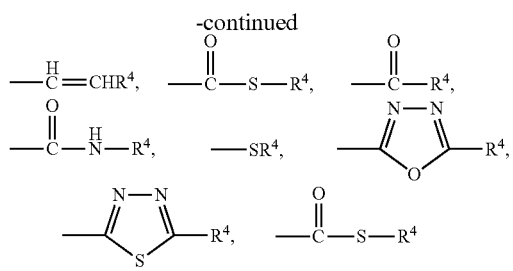

wherein $R^4$ is selected from the group consisting of hydrogen, alkyl, cycloalkyl, phenyl, piperidino and these organic radicals substituted with alkyl, cycloalkyl, phenyl, alkoxyl, cycloalkoxyl or phenoxy.

Furthermore, a polymerizable group in an optically oriented material containing a dichroic dye may be at least one selected from the group consisting of (meth)acryloyl, (meth)acrylamide, vinyl and vinyl ether.

On a substrate is applied one of the optically oriented material for an optically oriented film, which is then endowed a liquid-crystal orienting ability by irradiating it with a polarized light. It is then heated or irradiated with a light having a wavelength different from that used for endowing liquid-crystal orienting ability to initiate polymerization of the polymerizable group, giving an optically oriented film.

Figure 6A:
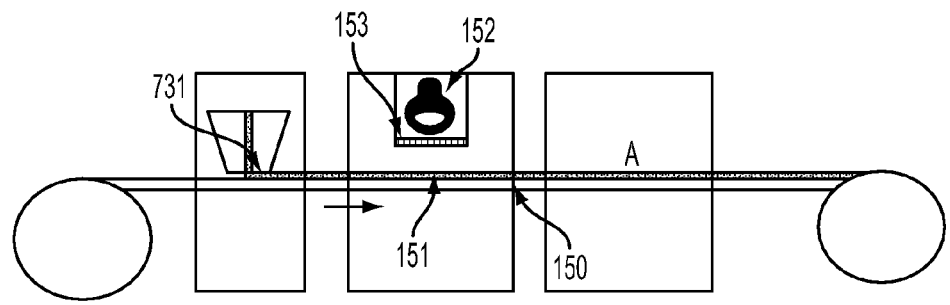
FIG. 6 is a schematic view showing a manufacturing process for an oriented film and a process for transferring the oriented film.

There will be described a process for manufacturing the optically oriented film of this embodiment with reference to the drawings. FIG. 6A is a conceptual view showing the step of feeding a supporting film 150 from a wind-off roll to a wind-up roll while during winding up the supporting film 150 into the wind-up roll, a solution of an optically oriented material is applied on the supporting film 150 by an appropriate method such as spin coating and printing, dried and then subjected to optical orientation and polymerization to provide an optically oriented film. After forming the optically oriented film, orientation is endowed by optical orienting. Optical orienting is a procedure of giving a liquid crystal orienting ability by irradiating a light having such a wavelength such that a dichroic dye derivative can be efficiently subjected to a photoreaction; for example, visible light and UV rays, preferably UV rays having a wavelength of around 300 to 400 nm. A film thickness is preferably 0.001 µm to 1 µm, more preferably 0.005 µm to 0.5 µm.

A polarized light used for optical orienting may be a linearly-polarized light or an elliptically-polarized light. Particularly, preferred is a linearly-polarized light obtained by filtering a light from a UV-ray source 152 such as a xenon lamp, high-pressure mercury-vapor lamp and a metal halide lamp through a polarized filter 153 or a polarizing prism such as a Glan-Thompson prism and a Glan-Taylor prism. Here, for obtaining pretilt in liquid crystal molecules, a polarized light may be irradiated from a direction oblique to a substrate or alternatively, after irradiation with a polarized light, a non-polarized light may be irradiated from an oblique direction.

When using a compound having a polymerizable group for forming an optically oriented film, change in orientation properties with time may be prevented by polymerization. Polymerization is often conducted generally by light irradiation such as UV rays or heating after optical orienting. In such polymerization, a polymerization initiator may be, as necessary, used. When polymerization is conducted by light irradiation, it is preferable for keeping the orientation state of the existing optically oriented material, to use a light having, a wavelength which is not absorbed by a moiety exhibiting anisotropic light absorption causing light orienting by these dichroic dye molecules (for example, an azobenzene moiety in an azo dye derivative and an anthraquinone moiety in an anthraquinone dye derivative), i.e., a wavelength different from that of the light for giving liquid crystal orienting ability.

Specifically, it is preferable to irradiate a non-polarized UV ray at a wavelength of 200 to 320 nm. On the other hand, when polymerization is conducted by heating, it is initiated by heating a substrate on which an optically oriented material has been applied and which has been subjected to optical orienting as described above. A heating temperature is preferably 100° C. to 300° C. both inclusive where orientation state is not changed by optical orienting, more preferably 100° C. to 200° C. both inclusive.

For photopolymerization, it is preferable to use a photopolymerization initiator as an initiator. A photopolymerization initiator may be any known photoinitiator without limitation; for example, 2-hydroxy-2-methyl-1-phenylpropan-1-one (Merck & Co. Inc., "Dalocure 1173"), 1-hydroxycyclohexyl phenyl ketone (Ciba-Geigy Corporation, "Irgacure 184"), 1-(4-isopropylphenyl)-2-hydroxy-2-methylpropan-1-one (Merck & Co., Inc., "Dalocure 1116"), 2-methyl-1-[(methylthio)phenyl]-2-morpholinopropane-1 (Ciba-Geigy Corporation, "Irgacure 907"), benzyl dimethyl ketal (Ciba-Geigy Corporation, "Irgacure 651"), a mixture of 2,4-diethylthioxanthone (Nippon Kayaku Co., Ltd., "KAYACURE DETX") and ethyl p-dimethylaminobenzoate (Nippon Kayaku Co., Ltd., "KAYACURE EPA"), a mixture of isopropylthioxanthone (Wordprekinsop Inc., "Cantacure-ITX") and ethyl p-dimethylaminobenzoate, acylphosphine oxide (BASF Inc., "Lucirin TPO").

For thermal polymerization, it is preferable to use a thermal polymerization initiator as an initiator. A thermal polymerization initiator may be any known thermal polymerization initiator without limitation.

Examples of a thermal polymerization initiator include peroxy compounds such as benzoyl peroxide, 2,4-dichlorobenzoyl peroxide, 1,1-di(tert-butylperoxy)-3,3,5-trimethylcyclohexane, n-butyl-4,4'-di(tert-butylperoxy) valerate and dicumyl peroxide; azo compounds such as 7-azobisisobutyronitrile; and tetramethylthiuram disulfide.

Although there has been described a method for forming an oriented film on a supporting film, the above method may be applied for preparing a film comprising an oriented film in place of a supporting film, e.g., depositing an oriented film on a transistor layer on a base film.

Figure 6B:
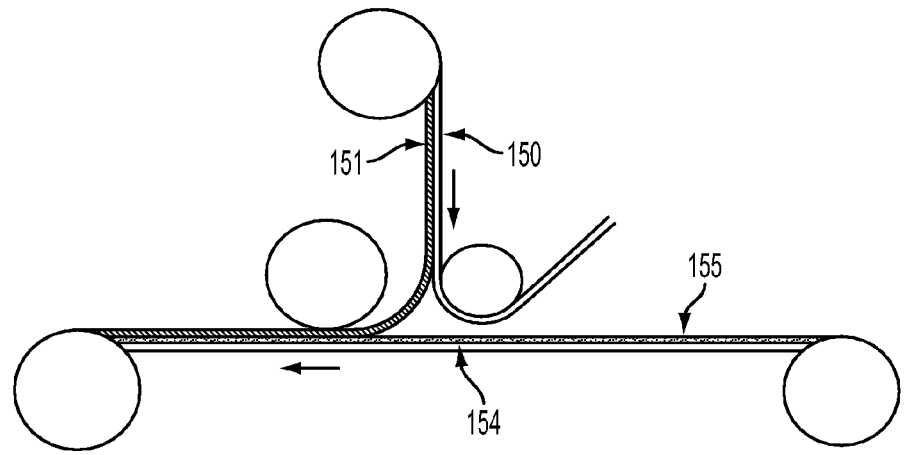

The oriented film deposited on the supporting film is transferred on a transistor layer 155 on a base film 154. In FIG. 6, transfer is effected by contacting the transistor layer 155 with the surface of the oriented film which is in contact with the supporting film, but transfer to the transfer layer 735 may be effected with the other surface of the oriented film. For an oriented film which has been oriented by rubbing its surface as described above, it is preferable to use the method shown in FIG. 6 for transferring. Transferring from a supporting film is useful in that a base film or an organic material may not be deteriorated because a temperature during orienting is not directly applied to the base film or the organic material to be a light-emitting layer in an organic EL.

Oriented Film Formed by Rubbing

As described for an optically oriented film, a liquid crystal orienting agent is applied on a supporting film by, for example, roll coating, spinner coating, printing, ink-jet printing. Next, a coating film is formed by heating the applied surface. In application of the liquid crystal orienting agent, a functional silane or functional titanium containing compound can be pre-applied to the surface of the substrate for further improving adhesiveness of the coating film with the functional films A and B. A heating temperature after application of the liquid crystal orienting agent is a temperature equal to or lower than an allowable temperature limit of the supporting film, preferably 80 to 230° C., more preferably 100 to 200° C.

A thickness of the coating film formed is preferably 0.001 µm to 1 µm, more preferably 0.005 µm to 0.5 µm.

The surface of the coating film formed is rubbed in a certain direction with a roll which is wrapped with a cloth made of fiber such as Nylon, Rayon and cotton. Thus, the coating film is endowed with liquid-crystal molecule orienting ability to become a liquid crystal oriented film.

Examples of a liquid crystal orienting agent in this invention include, but not limited to, those containing polyamic acid and/or polyimide.

A suitable sealing material is a photocurable resin composition containing an urethane (meth)acrylate oligomer having two or more urethane bonds and unsaturated bonds in one molecule, a maleimide derivative and a silane coupling agent. Since the sealing agent contains a particular compound, i.e., a maleimide derivative, it has a feature that without a photopolymerization initiator, it can be polymerized by UV rays to be a sealer for a liquid-crystal panel, which exhibits improved long-term stability and VHR (Vapor Hazard Ratio: obtained by dividing a saturation concentration in the air of each substance calculated from its inherent vapor pressure by an allowable exposure limit concentration (e.g., PEL) for each substance, which is a hygienic safety standard for chemical substance evaluation).

There will be detailed a backlight comprising a light-condensing film as Embodiment 8 of this invention.

FIG. 30 shows an embodiment of a backlight comprising a light-condensing film of this invention. This backlight comprises an optical guide 701 comprising a light source 705 on its edge and a light-condensing film controlling distribution of an outgoing light angle from the light source 705. The light-condensing film is disposed on the optical guide 701, in which an incident light from the entrance face outgoes from the outgoing face. The light-condensing film has flexibility indicated by a curvature radius of 40 mm or less. In the film, light collectors 703 made of an organic resin are arranged as an array on a light-diffusing film 704 having a coefficient of thermal expansion of 50 ppm/° C. or less. The end of the optical guide side in the light collector array 703 is firmly sticked with the outgoing face in the optical guide 701. In each light collector 703, the face firmly adhering to the optical guide 701 is flat and has a smaller area than the face in contact with the above light-diffusing film. The light collector array may have a one-dimensional arrangement pattern or two-dimensional arrangement pattern, but an ellipsoidal shape as shown in FIG. 31 is preferable in the light of in-plane uniformity of an emission brightness.

A light entering the edge of the optical guide 701 from the light source 705 propagates within the optical guide 701 while repeating total reflection. The propagating light enters the light-condensing film from a contact area between the outgoing face in the optical guide 701 and the light collector 703 in the light-condensing film. Thus, the lights propagating within the optical guide 701 sequentially enter the light-condensing film from the contact area, and the entering light repeats total reflection on the wall of the light collector 703 while outgoing from the outgoing face in the light-condensing film.

In terms of flexibility of a light-diffusing film in this invention, it is necessary that a curvature radius as a measure of bending resistance is 40 mm or less. When flexibility as a curvature radius is 40 mm, a roll with a minimum diameter p=100 mm used in a roll-to-roll process can be used.

It is necessary that a coefficient of thermal expansion of the light-diffusing film in this invention is 50 ppm/° C. or less. A plastic material can have a reduced coefficient of thermal expansion by containing an inorganic fillerss, and the light-diffusing film may be made of any of those described later in Example 1. An inorganic fillerss should be smaller than a wavelength of visible light for maintaining transparency of the film. When its particle size is 380 nm or less, there may be no practical problems although transparency is deteriorated in the end of the short-wavelength side in visible light. More preferably, with a particle size of 1 to 100 nm, transparency is not deteriorated over the whole visible range.

Examples of a light-diffusing film include a resin film with a convexo-concave surface, a film in which two or more transparent resins are combined in separate phases with convexo-concave interfaces and a resin film containing light-scattering particles. When using a film with an convexo-concave interface, it is not necessary to make the film light-diffusing.

For a resin film containing light-scattering particles, the light-scattering particles are preferably transparent and made of a material having a refractive index different from that in the light diffusing film; for example, resin beads, titanium dioxide, zinc oxide, alumina, ITO and silicon oxide. A particle size of the light-scattering particle may be 0.5 μm or more, more preferably 1.0 μm or more because within the range, a diffused light becomes wavelength dependent and thus tinting can be avoided. Furthermore, when a particle size of the light-scattering particle is ½ or less of a thickness of the light diffusion functional thin film, the particle does not affect light diffusing function; more preferably ¼ or less. For obtaining a coefficient of thermal expansion of 50 ppm/° C. or less, titanium dioxide, zinc oxide, ITO, alumina or silica is preferable.

A content of the fillers is 0.1% by weight to 90% by weight both inclusive, more preferably 0.5% by weight to 90% by weight both inclusive. Adequate light-diffusing function can be in 0.1% by weight or more while breakage due to brittleness can be avoided in 90% by weight or less. When using an inorganic material such as zinc oxide, ITO and silica as fillers, a content of 5% by weight or more may effectively reduce a coefficient of thermal expansion, and 10% by weight or more is more preferable.

In terms of light diffusion, a haze is preferably 30% or more. By employing the above configuration, a haze of 30% or more can be obtained (haze=(diffusion transmittance/total light transmittance) (100%).

There will be an organic EL device as a backlight source in a liquid-crystal panel as Embodiment 9 of this invention.

An organic EL device has a structure where an organic layer comprising a light-emitting layer made of an organic light-emitting material intervenes between an anode and a cathode facing each other. Generally, in an organic EL device, one electrode is a transparent electrode while the other electrode as a rear electrode is an opaque metal electrode.

Organic EL devices can be classified into two types: bottom emission type devices prepared by sequentially forming, on a substrate, a transparent electrode with a high transmittance, an organic layer comprising a light-emitting layer made of an organic light-emitting material and a light-impermeable rear electrode, where a light emitted from the light-emitting layer passes through the substrate; and top emission type devices prepared by sequentially forming, on a substrate, a rear electrode, an organic layer comprising light-emitting layer made of an organic light-emitting material and a transparent electrode where a light emitted from the light-emitting layer passes through the transparent electrode. The light-emitting layer may be made of a low molecular-weight material or a polymer material.

There will be described a structure of a flat light emitting device in this embodiment with reference to the drawings. It will be described using an organic EL device as a specific example. It will be, of course, understood that a device other than an organic EL device, for example, an inorganic EL device, may be used as long as a thin device structure can be formed.

Figure 7A:
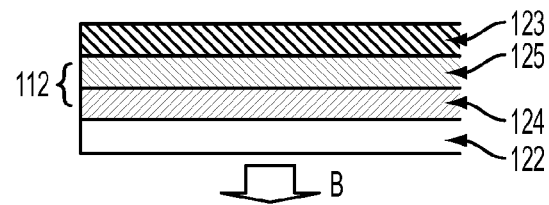
FIG. 7 is a cross-sectional structural view of an organic EL device according to this invention.

A concept of a light emitting device consisting of an organic EL will be described with reference to FIG. 7A. A light emitting device consisting of an organic EL has a structure where on an anode 122 made of transparent ITO (Indium Tin Oxide) are deposited an organic EL layer 121 and a cathode layer 123 having a smaller work function than that of the anode layer 122. Between a pair of electrodes 122 and 123 in the organic EL device having such a configuration, a desired power is applied from an unshown power supply to initiate light emission (emitted light B) from the organic EL layer 112 sandwiched between the electrodes 122 and 123.

The anode layer 122 may be made of a metal having a large work function such as nickel, gold, platinum and palladium and their alloys; a metal compound such as tin oxide ($SnO_2$) and copper iodide; or a conductive polymer such as polypyrrol. Commonly used are transparent electrodes made of ITO.

A cathode layer 123 is preferably made of a material as a good electron injector. Specifically, a metal material with a small work function (low work-function metal material) whereby an electron injection efficiency can be improved is used; generally, aluminum and alloys such as magnesium-silver and aluminum-lithium. The organic EL layer 112 may have, for example, a two-layer structure where from the side of the anode layer 122 are sequentially deposited a hole transport layer 124 and an organic light-emitting layer 125. The hole transport layer may be made of N,N'-diphenyl-N, N'-bis(3-methylphenyl)1,1'-biphenyl-4,4'-diamine (triphenyldiamine; hereinafter, referred to as "TPD"), while the organic light-emitting layer may be made of tris(8-hydroxyquinalinato)aluminum (Tris(8-hydroxyquinolinato)Aluminium, abbreviated as "Alq").

Besides the above structure, the organic EL layer 112 often improves transportability of holes and electrons in three-layer structure comprising a hole transport layer efficiently transporting holes which is in contact with an anode electrode (anode), a light-emitting layer containing a light-emitting material and an electron transport layer efficiently transporting electrons which is in contact with a cathode electrode (cathode). In addition, there may be appropriately disposed a lithium fluoride layer, a layer of an inorganic metal salt and/or layers comprising thereof.

In the light-emitting layer 125, an emitted light outgoes from the anode side as a transparent electrode.

Figure 7B:
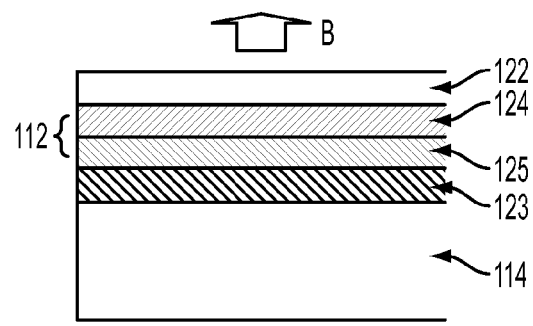

FIG. 7B shows a schematic structure of an organic EL device as another backlight source of this embodiment. On a substrate 114 is deposited aluminum to be a cathode to 100 nm by a common sputtering method. Subsequently, are sequentially deposited a light-emitting layer 125 to be an organic EL layer 112 and a hole transport layer 124 to 100 nm each by an application method, and then an ITO film to be an anode 122 to 100 nm by sputtering. Thus, an emitted light (emitted light B) from the organic EL layer 112 outgoes from the anode side.

Figure 7C:
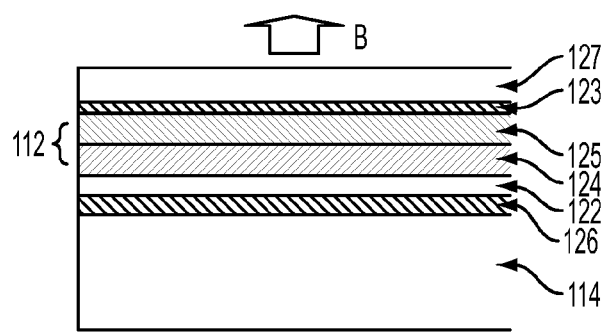

FIG. 7C shows a modified backlight source where on a substrate are sequentially deposited, as an organic EL device, an anode 122, a hole transport layer 124, a light-emitting layer 125 and a cathode 3. A process for producing an organic EL layer and thickness of each film are as described for FIG. 7B and thus are not described.

For allowing the anode 122 to act as a reflection film, the electrode in contact with the hole transport layer 124 is an ITO film 127 having a laminate structure consisting of an electrode made of transparent ITO and an aluminum film acting as a reflection film 126. The aluminum film may be deposited to a thickness of 100 nm by sputtering as described for the cathode in FIG. 7B.

For outputting a light to the side of the cathode 123, it is necessary that the aluminum film is sufficiently thin to prevent deterioration in transparency, thus giving a laminated film with an ITO film. After forming the aluminum film to 1 nm to 10 nm, a transparent electrode film such as an ITO film may be deposited. In this example, aluminum and an ITO film were deposited to 5 nm and 95 nm, respectively. When a thickness of the aluminum film is 1 nm or more, electron injecting performance is not deteriorated, while when it is 10 nm or less, transparency is not deteriorated.

For preparing a backlight source for a color liquid-crystal panel (apparatus), a light emitted from the light-emitting layer should be white (for example, daylight standard light source D65 (color temperature: 6500 K)). There are no materials which alone can emit a white light. A white light is, therefore, emitted by producing, from a plurality of light-emitting material, a plurality of colored lights, which are then combined. Combination of a plurality of colored lights may involve production of three primary colors, i.e., red, green and blue, or utilization of complementary color system such as blue and yellow and blue-green and orange, but the emitted light should be suitable for a spectral transmittance in each color filter.

When using a color filter comprising thee filters of red, green and blue, color display requires at least emitted lights at a wavelength capable of passing through a red, a green and a blue filters, respectively. If spectral transmittances of the red and the green filters are discontinuous at a wavelength between them, it is not necessary that a light at a wavelength which does not pass through the red or the green filter is emitted. Furthermore, when a light-emission maximum value is between green and blue, and the light is at a wavelength which can pass through both blue and green filters, it is not necessary that two colors of blue and green are independently emitted.

Since a light-emitting part in an organic EL device is an organic compound, the light-emitting part must be protected from an external atmosphere (e.g., moisture, oxygen). Thus, it is desirable to form, after forming the organic EL layer 112, a protective film made of $SiO_2$, SiN, $Al_2O_3$ or AlN as a continuous operation.

When forming the organic EL layer 112 by vapor deposition, it is preferable to form the protective film in the same vacuum chamber by sputtering. Here, it is preferable to form, as a continuous operation, the organic EL layer 112, the anode 122 made of transparent ITO and the protective film in sequence. In terms of a thickness of the protective film made of $SiO_2$, SiN, $Al_2O_3$ or AlN, 100 nm or more is adequate for protecting the organic EL device. Although there are no particular restriction to an upper limit of the thickness, 1 µm or less is acceptable in practical manufacturing.

Figure 7D:
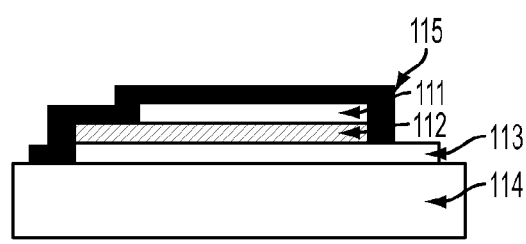

The protective film preferably covers, as shown in FIGS. 7D and 7E, the edge of the organic EL layer 112 as a light-emitting layer in a thin film light emitting device and the upper surface of the organic EL layer 112 which is not covered by a transparent electrode 111.

There will be described a base film as Example 1 of this invention.

EXAMPLE 1

Base Film

A base film to be a supporting substrate constituting a liquid crystal display panel must be thin, heat resistant, transparent to a light, particularly a visible light and optically isotropic, i.e., having a small phase difference (optical lag).

Furthermore, in terms of flexibility, it desirably has a curvature radius, r=40 mm or less as a measure of bending resistance. When r is at least 40 mm, a roll having a minimum diameter of φ=100 mm which is used in a roll-to-roll process can be used. In addition, a liquid-crystal panel or a liquid crystal display comprising a highly flexible supporting substrate is resistant to falling impact because it can absorb the impact by bending, resulting in improvement in shock resistance.

When a thin-shaped display device such as an electronic book is manufactured, it can be bent like a conventional paperback such as a pocket edition. Thus, it can be used without uncomfortable feeling.

When being mounted as a display device in an apparatus for a mobile application, it is essential that it is resistant to an impact and falling. In a conventional glass substrate, shock resistance is dependent on a part receiving a falling impact because of its material properties, and thus an impact to an edge may readily break the substrate. On the other hand, a plastic substrate exhibits a higher shock resistance than a glass, but when it receives an impact on an edge, the supporting substrate and a transistor or interconnection mounted on the supporting substrate are directly exposed to the impact as is in a glass substrate.

Reducing a weight of a liquid-crystal panel by improving flexibility of the supporting substrate and thinning the supporting substrate in the liquid crystal display panel may improve shock resistance owing to weight reduction.

In terms of a thickness, there are no particular restrictions to an upper limit when the substrate is used only in a roll-to-roll process. However, in the light of size reduction and weight reduction of the overall display device, the substrate is preferably thinner than 400 µm for a glass substrate, more preferably thinner than 200 µm for a plastic substrate. For meeting the requirements of size reduction and weight reduction in the overall display device, the thickness is preferably 10 to 150 µm, more preferably 10 µm to 100 µm. When it is 10 µm or more, wrinkling or breakage during carrying can be prevented.

In terms of heat resistance, the substrate is required to resistant to optical and mechanical distortion at a temperature when a functional film is formed. For the purpose of this, mechanical and optical variation is preferably at least 5% or less to a temperature history at 200° C., more preferably 5% or less to a temperature history at 250° C.

The term "optical variation" refers to deterioration in optical transparency and increase in a phase difference due to temperature variation and the term "mechanical variation" refers to deterioration in flexibility and variation in a dimension.

In terms of transparency, the substrate is required to be transparent in the visible range (380 nm to 800 nm). It exhibits higher transparency at least in the range of 450 nm to 700 nm, more preferably 400 to 700 nm, further preferably 380 nm to 800 nm (the visible range). When it exhibits higher transparency in the range of 450 to 700 nm, it is practically acceptable.

Transparency in the range of 400 nm to 700 nm is more preferable and may be substantially adequate even for a case where the most strict hue is needed, but further preferably, it exhibits a high light transmittance in the overall visible range of 380 nm to 800 nm. A wider wavelength range exhibiting transparency may result in an image display device capable of more precisely reproducing an original color. It is substantially acceptable that to a desired thickness of the base film, a light transmittance (wavelength; 550 nm) is 80% or more; more preferably 85% or more, further preferably 90% or more.

Examples of a plastic material for a base film in terms of heat resistance include acrylic resins, epoxy resins, cyclic olefin resins, polyimides and polyamides. Meanwhile, in terms of higher transparency and optical isotropy, an acrylic resin or a cyclic olefin resin may be preferably used.

For higher heat resistance, an acrylic resin is preferably an acrylic or methacrylic compound which is at least difunctional, more preferably at least trifunctional. Preferable examples include bisphenol-A diacrylate, bisphenol-S diacrylate, dicyclopentadienyl diacrylate, pentaerythritol triacrylate, tris(2-hydroxyethyl)isocyanurate triacrylate, pentaerythritol tetraacrylate, bisphenol-A dimethacrylate, bisphenol-S dimethacrylate, dicyclopentadienyl dimethacrylate, pentaerythritol trimethacrylate, tris(2-hydroxyethyl)isocyanurate trimethacrylate and pentaerythritol tetramethacrylate, which may be used as a mixture of two or more.

Examples of a cyclic olefin resin include addition (co)polymers of a cyclic olefin compound, addition copolymers of ethylene and a cyclic olefin compound and hydrogenated ring-opened (co)polymers of a cyclic olefin compound. The hydrogenated compound can be prepared by hydrogenating a ring-opened (co)polymer of a cyclic olefin in the presence of a hydrogenation catalyst.

A cyclic olefin compound may be one or more selected from, for example, bicyclo[2.2.1]hepta-2-ene, 5-methyl-bicyclo[2.2.1]hepta-2-ene, 5-ethyl-bicyclo[2.2.1]hepta-2-ene, 5-propyl-bicyclo[2.2.1]hepta-2-ene, 5-hexyl-bicyclo[2.2.1]hepta-2-ene, 5-decyl-bicyclo[2.2.1]hepta-2-ene, 5,6-dimethyl-bicyclo[2.2.1]hepta-2-ene, 5-methyl-5-ethyl-bicyclo[2.2.1]hepta-2-ene, 5-phenyl-bicyclo[2.2.1]hepta-2-ene, 5-cyclohexyl-bicyclo[2.2.1]hepta-2-enetricyclo[4.3.0.1$^{2,5}$]deca-3-ene, tetracyclo[4.4.0.1$^{2,5}$.1$^{7,10}$]dodeca-3-ene, 3-methyl-tetracyclo[4.4.0.1$^{2,5}$.1$^{7,10}$]dodeca-8-ene, 3-ethyl-tetracyclo[4.4.0.1$^{2,5}$.1$^{7,10}$]dodeca-8-ene, methyl 2-methyl-bicyclo[2.2.1]hepta-5-ene-2-carboxylate, 2-methyl-bicyclo[2.2.1]hepta-5-ene acrylate, 2-methyl-bicyclo[2.2.1]hepta-5-ene methacrylate, dimethyl bicyclo[2.2.1]hepta-5-ene-2,3-dicarboxylate, diethyl bicyclo[2.2.1]hepta-5-ene-2,3-dicarboxylate, 3-methyl-3-methoxycarbonyl-tetracyclo[4.4.0.1$^{2,5}$.1$^{7,10}$]dodeca-8-ene, bicyclo[2.2.1]hepta-5-ene-N-cyclohexyl-2,3-maleimide, bicyclo[2.2.1]hepta-5-ene-2-spiro-3'-N-phenylsuccinmide, bicyclo[2.2.1]hepta-5-ene-2-spiro-3'-N-cyclohexylsuccinmide, 2-[(3-ethyl-3-oxetanyl)methoxy]bicyclo[2.2.1]hepta-5-ene, 2-[(3-ethyl-3-oxetanyl)methoxymethyl]bicyclo[2.2.1]hepta-5-ene, (3-ethyl-3-oxetanyl)methyl-5-triethoxysilyl-bicyclo[2.2.1]hepta-2-ene bicyclo[2.2.1]hepta-5-ene-2-carboxylate, 5-methyidimethoxysilyl-bicyclo[2.2.1]hepta-2-ene, 5-[1'-methyl-2',5'-dioxa-1'-silacyclopentyl]-bicyclo[2.2.1]hepta-2-ene, 5-[1'-methyl-3',3',4',4'-tetraphenyl-2',5'-dioxa-1'-silacyclopentyl]-bicyclo[2.2.1]hepta-2-ene, 5-[1',4',4'-trimethyl-2',6'-dioxa-1'-silacyclohexyl]-bicyclo[2.2.1]hepta-2-ene.

Since a base film must show minimum dimensional change during a process for manufacturing a display, a coefficient of thermal expansion is preferably 50 ppm/° C. or less. A coefficient of thermal expansion of a plastic material can be reduced by adding inorganic fillers. Inorganic fillers must be smaller than a wavelength of the visible light for maintaining transparency of the film, and a particle size of 380 nm or less is practically acceptable although transparency may be deteriorated around at the shortest wavelength of the visible light. More preferably a size of 1 to 100 nm can be used without deterioration in transparency in the overall visible range. Although a size of 1 nm or less may be acceptable, it is difficult to prepare fillers with a size of 1 nm or less by current technique.

Examples of the inorganic fillers include titanium dioxide, zinc oxide, alumina and silicon oxide. The inorganic fillers can be incorporated, for example, by dispersing dry powdery silicon oxide particles using a mixer having higher dispersing ability; by blending a colloid (sol) dispersed in an organic solvent and other components and removing the organic solvent in vacuo optionally with stirring; or by blending a colloid (sol) dispersed in an organic solvent and other components, removing the solvent as necessary and then further removing the solvent by flow casting. An example of an apparatus having higher dispersing ability is a bead mill.

A plastic material into a film can be processed into a film by, for example, melt extraction or solution casting. In processing an acrylic or cyclic olefin resin, solution casting is preferably used. An acrylic resin can be formed into a film by casting a neat liquid monomer and curing it by heating or irradiation with an active energy ray. For cyclic olefin resins, those having an acryl or metharyl group in a side-chain substituent in a monomer unit can be heated or irradiated with an active energy ray, those containing an oxetanyl group can be treated with an acid generating agent, and those containing a hydrolizable silyl group can be hydrolized by liquid or gaseous hot water and subjected to condensation in the presence of a tin compound as a catalyst, to give cured films.

An active energy ray used in the curing is preferably UV rays. Examples of a lamp generating UV rays include a metal-halide lamp and a high-pressure mercury-vapor lamp. In curing with an active energy ray such as UV rays, preferably a photopolymerization initiator which generates radical is added. Examples of a photopolymerization initiator used here include benzophenone, benzoin methyl ether, benzoin propyl ether, diethoxyacetophenone, 1-hydroxy-cyclohexyl phenyl ketone, 2,6-dimethylbenzoyl-diphenylphosphine oxide, 2,4,6-trimethylbenzoyl-diphenylphosphine oxide and benzophenone. Two or more of these photopolymerization initiators may be combined. A content of a photopolymerization initiator is preferably 0.01 to 2 parts by weight to 100 parts by weight of an organic component having a (meth)acryl group. A too low content may lead to insufficient sensitivity to complete curing while a too high content may lead to excessive sensitivity which may cause a curing reaction during compounding, resulting in defective application.

In thermal polymerization, a thermal-polymerization initiator may be added as necessary. Examples of a thermal-polymerization initiator used here include benzoyl peroxide, diisopropyl peroxycarbonate and t-butyl peroxy(2-ethylhexanoate), which can be used an amount of 0.01 to 1 parts by weight to 100 parts by weight of an organic component having (meth)acryl group.

The base film of this example preferably has a higher transparency. Specifically, it has a higher light transmittance and is optically isotropic, i.e., a small phase difference. A light transmittance at wavelength 550 nm is 85% or more, more preferably 90% or more. A phase difference in a normal line direction is preferably 10 nm or less, more preferably 5 nm or less.

A thickness of the base film in this invention is preferably 10 to 300 µm. A thickness of less than 10 µm may lead to wrinkles or breakage during shipping while a thickness of more than 300 µm may tends to make roll-to-roll processing difficult.

There will be described a specific process for preparing a base film.

An acrylic resin type base film was prepared as follows. First, were mixed 120 parts by weight of dicyclopentadienyl diacrylate and 400 parts by weight of isopropyl alcohol dispersion type colloidal silicon oxide [silicon-oxide content: 30% by weight, average particle size: 10 to 20 nm]. While stirring the mixture at 45° C., volatile components were evaporated by 200 parts by weight in vacuo. Then, to the mixture was added 0.6 parts by weight of a photopolymerization initiator, 1-hydroxy-cyclohexyl phenyl ketone (Ciba Specialty Chemicals Inc., "Irgacure 184"), and the initiator was dissolved, to give a resin composition for a base film.

Using an applicator (not shown), the resin composition for a base film was applied by a die coater on a mold-release treated PET (polyethylene terephthalate) film such that a film thickness was to be 100 µm after curing the resin composition for a base film. Subsequently, in an oven controlled at 120° C., volatile components were evaporated and the residue was cured by a UV-ray irradiation apparatus. After the curing, the PET film was released from the mold to provide a base film.

A cyclic olefin resin type base film was prepared as follows. In 550 parts by weight of xylene were dissolved 100 parts by weight of a bicyclo[2.2.1]hepta-2-ene addition copolymer containing 3 mol % of 5-triethoxysilyl-bicyclo [2.2.1]hepta-2-ene having a weight-average molecular weight of 230,000, 1.5 parts by weight of tributyl phosphite and pentaerythrityl-tetrakis[3-(3,5-di-t-butyl-4-hydroxyphenyl)propionate] and of tris(2,4-di-t-butylphenyl)phosphite as antioxidants (0.5 parts by weight each), to prepare a resin composition for a base film.

Using an applicator (not shown), the composition was applied on a PET (polyethylene terephthalate) film by a die coater, and subjected to primary drying under gradual warming from 30° C. to 50° C. to obtain a film containing a solvent in 20 to 50 parts by weight. The film was peeled off from the PET film, exposed to a toluene-vapor atmosphere at 30° C., then subject to secondary drying at 50 to 200° C., and then exposed to a hot moisture atmosphere at 170° C. to provide a cured base film with a thickness of 100 µm.

In the acrylic resin type base film thus obtained, a light transmittance was 90% (550 nm, thickness: 100 µm), a phase difference was 3 nm, and a Young's modulus was 5.3 GPa. In the cyclic olefin resin type base film, a light transmittance was 91% (550 nm, thickness: 100 µm), a phase difference was 5 nm, and a Young's modulus was 2.9 GPa.

When 25% by weight of silicon oxide with an average particle size of 300 nm (maximum particle size: 400 nm) was added, no changes in a light transmittance, a phase difference or a Young's modulus were observed. When adding an inorganic fillers, a coefficient of thermal expansion was improved from 85 ppm/° C. to 35 ppm/° C. in the acrylic resin type and from 80 ppm/° C. to 38 ppm/° C. in the cyclic olefin resin type.

Both acrylic and cyclic-olefin resin types exhibited flexibility such that they could be wound into a roll with a radius of 30 mm.

An initial value was retained after storing at an high-temperature of 270° C. for 24 hours. Mechanical or optical deterioration was observed after storage at an elevated storage.

There will be described a specific process for forming a gas barrier layer on a base film.

Since a base film is a thin film made of an organic resin, common air components such as oxygen and moisture enters a liquid crystal layer and an organic EL layer. A gas barrier layer must be transparent because the substrate must transmit a light. Thus, examples of a material of the gas barrier layer include organic materials such as polyvinyl alcohols; organic-inorganic composite materials such as those of an organic material with an inorganic material including a clay mineral (an amorphous clay mineral such as $Al_2O_3$-$2SiO_2 \cdot 5H_2O$ and $Al_2O_3SiO_2 \cdot 2$-$3H_2O$, or a crystalline clay mineral such as $(Si,Al)O_4$ tetrahedral sheet and $(Al,Mg)(O, OH)_6$ octahedral sheet); and a thin film of an inorganic material such as silicon oxide and aluminum oxide. A film thickness may be more reduced by using an inorganic material because it exhibits good gas barrier properties under a high humidity atmosphere and is effective with a smaller thickness. Furthermore, two or more of these layers may be deposited.

A thickness of a gas barrier layer is preferably 1 to 10 µm when it is made of an organic material or an organic-inorganic composite material and preferably 10 nm to 1 µm when it is made of an inorganic material. When it is made of an organic material or an organic-inorganic composite material, a thickness of 1 µm or more can adequately prevent common air components such as oxygen and moisture from entering a liquid crystal layer or an organic EL layer. A thickness of 10 µm or less does not influence properties of the base film such as an expansion coefficient. When it is made of an inorganic material, a thickness of 10 nm or more can adequately prevent common air components such as oxygen and moisture from entering a liquid crystal layer or an organic EL layer, while a thickness of 1 µm or less can prevent breakage during bending.

A gas barrier layer can be formed on a film by an application method for an organic material or an organic-inorganic composite material and by any of various film deposition methods for an inorganic material. In an application method, a liquid such as a liquid organic material or a solution thereof is applied on a film and is dried or cured to form a film. Examples of film deposition include physical growth methods such as vacuum vapor deposition, ion plating and sputtering; and chemical vapor growth methods such as plasma CVD in vacuo, catalytic CVD and CVD under an atmospheric pressure. Among these, sputtering is particularly preferable because it can provide a dense film at a low temperature.

There will be described a specific process for forming a gas barrier layer.

Figure 8:
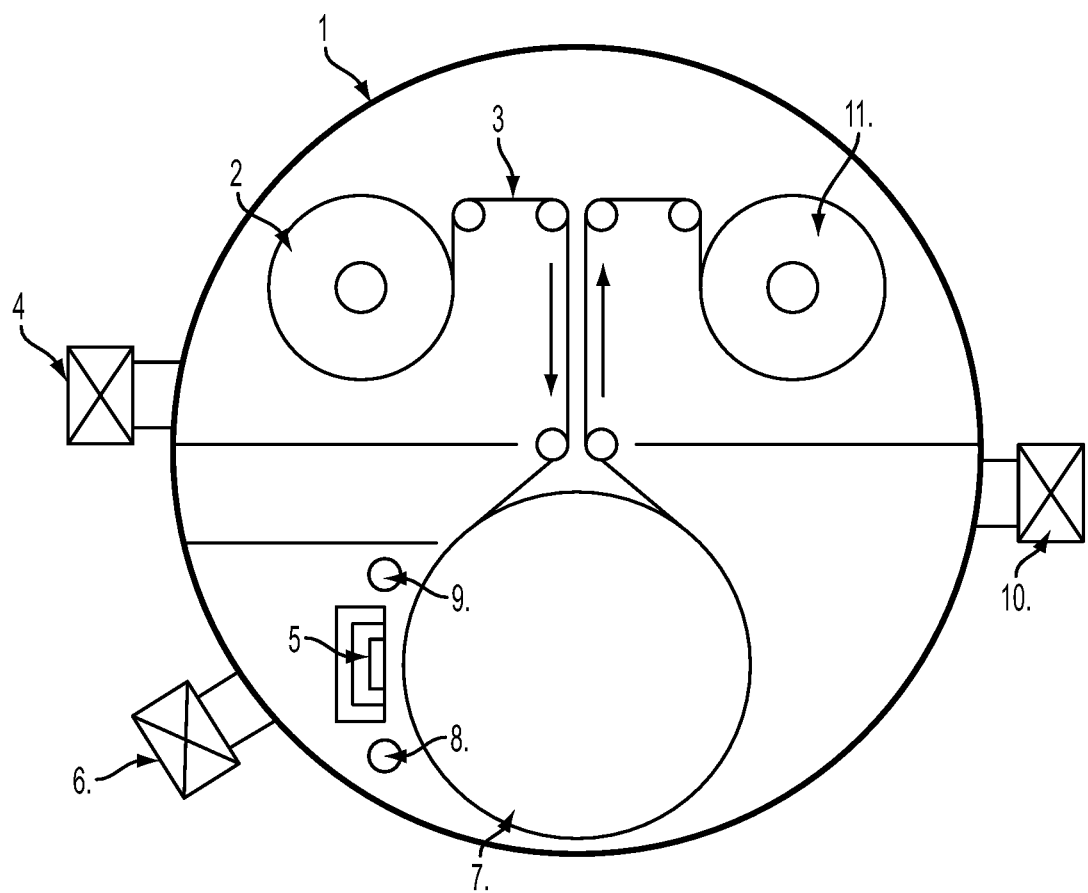
FIG. 8 is a conceptual view of an apparatus for manufacturing a barrier film on a base film, according to this invention.

A roll 2 of a base film 3 with a thickness of 100 µm, a width of 30 cm and a length of 100 m was set in the side of a wind-off roll in a magnetron sputter roll coater shown in FIG. 8. Argon and oxygen were introduced as a discharge gas and a reactant gas, respectively at a deposition pressure of 0.3 Pa and a temperature-controlling drum temperature 30° C., and then, using boron-doped silicon as a target, a pulse DC power source was operated to initiate reactive sputtering film deposition. An input electric power and a carrying speed were adjusted to deposit a gas barrier layer of silicon oxide ($SiO_x$; x is 1.6 to 1.9) with a thickness of 100 nm. After the deposition, the vacuum chamber was returned to an atmospheric pressure and then opened. Then, a film with a gas barrier layer was removed from the side of the wind-up roll 11.

Although the gas barrier layer was formed in one side of the base film in this example, it can be formed in both sides. In such a case, the layer may be formed in one side before a gas barrier is formed in the other side in a similar manner, or alternatively, while placing the target 5 shown in FIG. 8 in both front and rear sides, gas barrier films can be deposited on both sides in the base film in one step.

Although a magnetron sputter was used in this example, another sputtering method or vapor deposition may be employed. Chemical deposition may be used, but a configuration of a manufacturing apparatus is simpler in physical deposition.

FIGS. 9 and 10 show the manufacturing steps of transferring a thin-film transistor from a glass substrate to a base film as Example 2.

EXAMPLE 2

Thin-Film Transistor

There will be described the step of forming a thin-film transistor (TFT: Thin Film Transistor) on a glass substrate with reference to FIG. 9. As shown in FIG. 9A, on a glass substrate 201 is deposited a barrier film 202 as an oxide or nitride film to be an antietching layer to hydrofluoric acid, on which is then deposited an amorphous or polysilicon film. In this example, an amorphous silicon film 216a was deposited to 100 nm. These thin films can be deposited by, for example, plasma CVD or sputtering. Then, as shown in FIG. 9B, an excimer laser beam is irradiated to modify the amorphous silicon film into a polysilicon film 216b. Here, modification into a polysilicon film can be conducted by, in place of laser beam irradiation, solid-phase growth by thermal annealing.

As shown in FIG. 9C, a polysilicon film 216b is patterned into a desired shape, on which a gate insulating film 217 as an oxide film is then deposited to 100 nm by, for example, plasma CVD or sputtering. Then, as shown in FIG. 9D, a gate electrode 218 is formed, an area in which an n-channel transistor is to be formed is covered by a photoresist and then boron is implanted (D) by ion doping to form a p-type area Fa. Subsequently, as shown in FIG. 9E, an area in which a p-channel transistor is to be formed is covered by a photoresist 219 and phosphorus is implanted (E) by ion doping to form an n-type area Fb. Then, as shown in FIG. 9F, a source and a drain electrodes made of aluminum are formed. Then, an interlayer insulating film 220 as an oxide film is formed to 200 nm and a metal electrode 221 made of aluminum is formed to provide a transistor. A pixel-driving transistor unit for driving pixels in a liquid-crystal panel may be constituted by an n-MOS or p-MOS transistor alone. Such a transistor array can be appropriately arranged to form a desired circuit on a glass substrate. Then, in an area to be an image display unit, a transparent conductive film such as ITO is further deposited to form a desired pixel electrode. Finally, an oxide film with a thickness of 200 nm is formed as an electrode protective film for protecting the electrode. Thus, there is provided a TFT glass substrate for a liquid crystal display panel.

Next, there will be described a process for forming a device film on a base film by transferring the above transistor for a liquid crystal display panel on the base film with reference to FIG. 10.

Figure 10A:
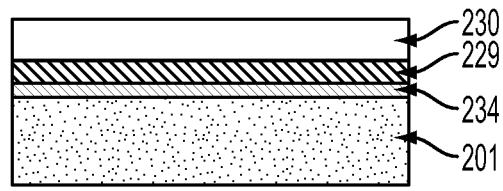
FIG. 10 is a process cross-sectional view illustrating a process for transferring a thin-film transistor according to this invention.
Figure 10B:
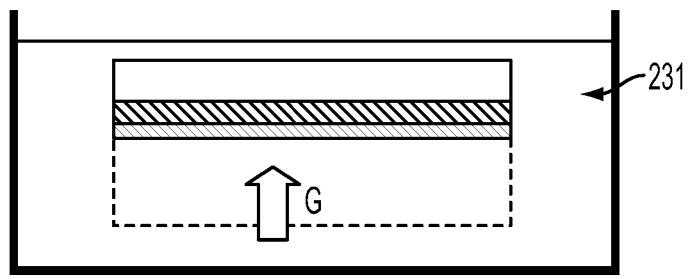

As shown in FIG. 10A, a protective film 230 is glued, with an adhesive, on a transistor-forming surface in a glass substrate 201 having a transistor array 229. Then, as shown in FIG. 10B, the substrate with the protective film is immersed in a glass etching solution of hydrofluoric acid 231 to etch a glass substrate 228 from its rear surface. Etching is terminated at a barrier layer 234 after etching the glass substrate 228 off.

Figure 10C:
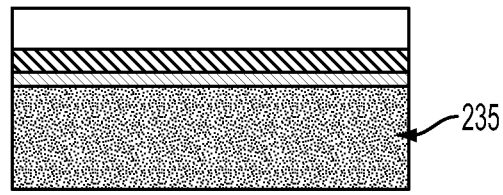
Figure 10D:
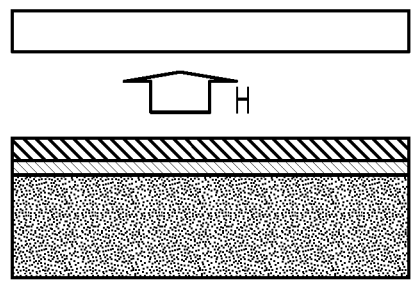

In addition to hydrofluoric acid, buffered hydrofluoric acid may be suitably used as a glass etching solution. After completely etching the glass substrate off, a base film 235 is laminated with the etching surface as shown in FIG. 10C. Finally, as shown in FIG. 10D, the protective film 230 and the adhesive are removed to complete transfer, giving a device layer formed on the base film. Here, the barrier film 202 in FIG. 9A may also act as an etching stopper when its etching rate is lower to the glass etching solution, so that the glass substrate etching step in FIG. 10B can be satisfactorily controlled. In addition, the protective film 230 must be made of a material resistant to a strong acid such as hydrofluoric acid. During etching, temperature variation in the etching solution must be prevented for uniform etching.

As described above, a TFT film substrate for a liquid crystal display panel can be prepared.

In this example, a supporting substrate is a glass substrate, an etching solution such as hydrofluoric acid is used for removing the supporting substrate, a barrier layer is a nitride film and a protective film is glued with an adhesive. Alternatively, for example, a substrate may be a quartz or silicon substrate, the supporting substrate may be removed by polishing and/or a hot-melt sheet which is glued by heating can be used.

There will be more specifically described a functional thin film such as a retardation film with reference to Examples. Before described Examples, a film on which a functional thin film is formed will be detailed.

The base film detailed in Example 1 is a film to be a substrate constituting a panel by forming a liquid-crystal panel. A supporting film for a functional film prepared in an intermediate step may be, but not limited to, the base film. Examples of a material which may be used for the supporting film include, besides those which can be used for the base film, polyesters, polyethylenes, polypropylenes, polyethylene terephthalates, polyvinyl alcohols, epoxy resins, polyimides, polyamides, polystyrenes, polycarbonates, polyolefins (e.g., polypropylene), polyhalogenated vinyls (e.g., polyvinyl chloride and polyvinylidene chloride), ethylene vinyl copolymers, vinyl acetates, or cellulose derivative resins (e.g., cellulose acetate, nitrocellulose and cellophane). A cover film may be made of a material as described for the supporting film. Of course, a material is appropriately changed, depending on the conditions during forming the functional thin film such as a light transmittance and a temperature condition during production.

In both cover film and supporting film, a coefficient of thermal expansion is preferably 50 ppm/° C. or less and a difference in a coefficient of thermal expansion in the base film is preferably ±30% or less, more preferably ±15% or less. Since a functional thin film formed on a supporting film is transferred to a functional thin film on a base film, it is particularly necessary to match a coefficient of thermal expansion in the supporting film with that in the base film.

In Examples below, a film meeting the above conditions is, of course, used, although no supporting film properties are particularly described.

In particular, it is necessary that when an optically functional thin film is not a thermally curable resin but a photocurable resin, a particle size of an inorganic fillers added to the resin is 1 nm to 200 nm, more preferably 1 nm to 150 nm. The lower limit is not restricted to 1 nm, and if the film can be manufactured, a thickness of 1 nm or less may be acceptable.

When adding an inorganic fillers (silicon oxide) with an average particle size of 150 nm (maximum particle size: 200 nm) to the acrylic resin type base film in Example 1 in an amount of 30% by weight, a transmittance of UV rays with a wavelength of 200 nm to 300 nm was 80%, which corresponded to adequate transparency for permitting curing by irradiating a photocurable resin formed on a film with UV rays from the bottom surface of the film.

There will be described a retardation film as Example 3 of this invention.

EXAMPLE 3

Retardation Film

Application Type Retardation Film

Retardation films can be classified into application type retardation films and lamination type retardation films. First, an application type retardation film will be described.

Using a flexo press, on a roll of a base film roll made of a polyether sulfone surface-treated with silicon oxide was applied a polyimide orienting agent "AL-1254" (JSR Corporation) as an oriented film, which was then dried at 180° C. for 1 hour and rubbed with a rayon cloth.

In addition, a coating film of an alkyl-chain modified poval (for example, Kuraray Co., Ltd., MP203 or R1130) may be endowed with such orienting ability by rubbing without firing. Furthermore, most organic polymer films which form a hydrophobic surface such as polyvinyl butyral and polymethyl methacrylate may be endowed with liquid crystal orienting ability by rubbing its surface.

A silicon dioxide oriented film may be deposited as described in Embodiment 2. It should be noted that it is formed by oblique deposition.

A polymerizable liquid crystal composition (A) was prepared from 50 parts by weight of a compound represented by formula (10):

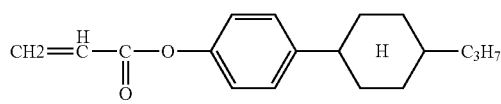

and 50 parts by weight of a compound represented by formula (11):

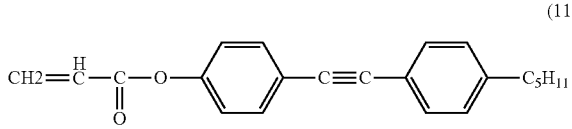

The composition thus prepared showed a nematic phase at room temperature, and a transition temperature from a nematic phase to an isotropic phase was 47° C. An $n_e$ (extraordinary-ray refractive index) and $n_o$ (ordinary refractive index) at 25° C. were 1.65 and 1.52, respectively. In methyl ethyl ketone was dissolved a polymerizable liquid crystal composition (C) consisting of 100 parts by weight of the polymerizable liquid crystal composition (A) and 1 part by weight of a photopolymerization initiator "IRG-651" (Ciba-Geigy). The solution was applied on the base film roll previously prepared, using a gravure coater, and then irradiated with UV rays at 365 nm at room temperature to 160 mJ/cm² for initiating curing of the polymerizable liquid crystal composition, to form a retardation film with a thickness of 1.6 µm. It was observed that the retardation film had a phase difference of 138 nm to a light with a wavelength of 550 nm and acts as a ¼ wavelength plate.

Lamination Type Retardation Film

There will be described an example of a lamination type.

In N-methyl-2-pyrrolidone (hereinafter, referred to as "NMP") were dissolved 85 mol % of 2-chloroparaphenylenediamine as an aromatic diamine and 15 mol % of 4,4'-diaminodiphenyl ether. To the solution was added 99 mol % of 2-chloroterephthalic dichloride, and the mixture was stirred for 2 hours to complete polymerization. The solution was neutralized with lithium hydroxide to give a solution of an aromatic polyamide with a polymer concentration of 10% by weight.

The polymer solution was cast on an endless belt, dried by hot air at 150° C. until it became self-supported and then peeled off from the belt. The film peeled from the belt was extended to a 1.10-fold length in a longitudinal direction of the film in a water bath at 40° C. while the residual solvent and inorganic salts were removed. Then, it was fed into a tenter, in which it was dried and heated by hot air at 280° C. It was then extended to a 1.5-fold length in a width direction in the tenter to give an aromatic polyamide film with a thickness of 4.0 µm.

Phase differences of this film were R(550)=140 nm, R(450)=164 nm and R(650)=126 nm. Thus, the film can act as a film for a ¼λ plate even when it has a ¹⁄₁₀ or less thickness in comparison with a conventional film.

A lag axis in this film was matched with the width direction. A dimensional change rate of the direction was 0.02%, a dimensional change rate in an orthogonal direction was 0.0%, and Young's moduli in a longitudinal direction (MD) and a width direction (TD) were 10 GPa and 16 GPa, respectively. They indicate that the film is considerably heat resistant and tension resistant.

The film had a minimum light transmittance of 80% within 450 to 700 nm and a light transmittance of 24% at 400 nm.

Then, the polymer solution was cast on a belt and a self-supported film was peeled off from the belt. The film was contacted with a roll heated to 100° C., and extended to a 1.8-fold length in a longitudinal direction by inter-roll extension. Next, the film extended in the MD direction was fed into a water bath at 40° C., and after removing the residual solvent and inorganic salts, introduced into a tenter. In the tenter, it was dried and heated by hot air at 300° C. It was then extended to a 2.2-fold length in a width direction in the tenter to give an aromatic polyamide film with a thickness of 3.0 µm. Phase differences of this film were R(550)=278 nm, R(450)=326 nm and R(650)=252 nm. Thus, the film can act as a film for a ½λ plate even when it has a ¹⁄₁₀ or less thickness in comparison with a conventional film.

A lag axis in this film was matched with the width direction. A dimensional change rate of the direction was 0.04%, a dimensional change rate in an orthogonal direction was 0.0%, and Young's moduli in a longitudinal direction (MD) and a width direction (TD) were 19 GPa and 9 GPa, respectively. They indicate that the film is considerably heat resistant and tension resistant.

The film had a minimum light transmittance of 79% within 450 to 700 nm and a light transmittance of 22% at 400 nm.

The retardation film described above is preferably laminated on a supporting film.

An aromatic polyimide or polyamide acid solution in this example is prepared as follows. A polyamide acid can be prepared by reacting a tetracarboxylic acid dihydrate and an aromatic diamine in an aprotic organic polar solvent such as N-methylpyrrolidone, dimethylacetamide and dimethylformamide. An aromatic polyimide can be prepared by heating the solution containing the above polyamide acid or alternatively by adding an imide-forming agent such as pyridine to obtain polyimide powder, which is then redissolved in a solvent. A polymer concentration in a deposition stock solution is preferably about 5 to 40 wt %.

The deposition stock solution can be used to form a retardation film. The retardation film thus obtained exhibited properties comparable to a retardation film made of an aromatic polyamide.

Herein, physical properties were determined and effects were evaluated as follows.

(1) Phase Difference

Determined by the following measuring apparatus.

Apparatus: Cell gap inspection system RETS-1100(Otsuka Electronics Co. Ltd.)

Measuring diameter: $\phi$ 5 mm

Measuring wavelength: 400 to 800 nm

Phase differences at wavelengths 450 nm, 550 nm and 650 nm determined as described above were R(450), R(550) and R(650), respectively.

(2) Dimensional Change Rate at 150° C.

A. Determination of a Lag Axis

A sample was placed on a universal stage and observed under crossed nicols by a polarization microscope. A direction with the maximum birefringence was defined as a lag axis. Alternatively, it may be a direction with the maximum molecular orientation as determined by an orientation meter (for example, Kanzaki Paper Co. Ltd., MOA-2001A).

B. Determination of a Dimensional Change Rate

Samples with a size of 150 mm (width: 10 mm) are taken in a lag axis direction and a direction orthogonal thereto. To the samples are marked reference lines at intervals of 100 mm in the longitudinal direction. The samples are placed in a hot-air oven without load and heated at 150° C. for 10 min. The samples are removed, cooled to an ambient temperature and spread on a polyvinyl chloride sheet such that no wrinkles are formed. A distance between reference lines (L: mm) are measured and a dimensional change rate is calculated in accordance with the following equation.

Dimensional change rate (%)=(|L−100|/100)(100

(3) Transparency of a Film (Light Transmittance)

Measured using the following apparatus. A transmittance (%) for a light at each wavelength is determined.

Transmittance (%)=$T1/T0$ wherein T1 is an intensity of a transmitted light through a sample, and T0 is an intensity of a light traveling by a certain distance in the air without passing through the sample.

Apparatus: UV meter U-3410 (Hitachi Instruments Co. Ltd.)

Wavelength range: 300 nm to 800 nm

Measurement speed: 120 nm/min

Measurement mode: transmission (4) Young's Modulus

Determined at a temperature of 23° C. and a relative humidity of 65% using Robot Tensiron RTA (Orientec Co. Ltd.). A test piece has a width of 10 mm and a length of 50 mm, and an extension speed is 300 mm/min. A point when a load passes 1N after the start of the test was defined as the origin of extension.

There will be described a polarizing film as Example 4 of this invention.

EXAMPLE 4

Polarizing Film

There will be described a polarizing film as Example 4 of this invention.

A polarizing film used in this example can be prepared by adsorption of iodine and/or a dichroic coloring agent such as a dichroic dye by a polyvinyl alcohol film made of a polyvinyl alcohol, a partially formated polyvinyl alcohol or a partially saponified ethylene-vinyl acetate copolymer, two-axis extension and then boric acid treatment. The polarizing film has a thickness of, but not limited to, about 5 to 50 μm.

A so-called H film (polyvinyl butyral film) can be used, which is prepared by extending a polyvinyl alcohol thin film with heating and immersing the film in a solution containing a large amount of iodine (generally, called an "H ink"). The H film could give a film with a thickness of 18 μm.

An additional example is a polarizing film prepared by shaping a resin pellet containing iodine and/or dichroic dye into a film by, for example, melt extrusion or solution casting, and uniaxially drawing the film to form a polarizing film in which iodine and/or a dichroic dye is strongly oriented in one axis direction. The polarizing film has a thickness of, but not limited to, about 1 to 10 μm.

Such a method can also provide a polarizing film with a film thickness of 10 μm to 20 μm. Examples of a resin used herein include polyvinyl alcohol resins such as polyvinyl alcohols, partially formated polyvinyl alcohols and partially saponified ethylene-vinyl acetate copolymers; polyester resins such as polyolefin resins, acrylic resins, PET (polyethylene terephthalate) and PEN (polyethylene naphthalate); polyamide resins; polyamide imide resins; polyimide resin; polycarbonate resins; and polysulfone resins.

The polarizing film is laminated on a supporting film by heat, pressure, a glue or an adhesive. The polarizing film is peeled off from the supporting film and then laminated on, for example, a protective film in an organic EL light emitting device on a functional film.

When the polarizing film is formed on a mold-releasing film to be a matrix base, only a polarizing function layer must be laminated on, for example, a protective film in an organic EL light emitting device on a functional film. It is, therefore, necessary that the polarizing film and the supporting film are peelably laminated. Furthermore, in the light of the fact that another layer is further deposited on the surface after peeling off the supporting film, the supporting film must be treated such that a mold release on the supporting film does not transfer to the polarizing film during the peeling.

The polarizing film must be protected from moisture or UV rays. Such protection can be achieved by laminating an optically transparent protective layer on one or both surfaces. A resin constituting the protective layer must be not only optically transparent and mechanically strong, but also heat resistant and moisture-proof. Examples of such a resin include cellulose, polycarbonates, polyesters, acrylic compounds, polyether sulfones, polyamides, polyimides and polyolefins. Among these, preferred are celluloses such as triacetylcellulose; polyesters such as polycarbonates and polyethylene terephthalate; and acrylic compounds.

A light from a light-emitting diode (LED) or organic EL device little contains UV ray components. When a light-emitting diode (LED) or organic EL device is used as a backlight in a liquid-crystal panel, UV-ray resistance should not be considered. Furthermore, an organic EL device is made of an optically transparent inorganic material such as $SiO_2$, SiN, $Al_2O_3$ and AlN for protecting an organic material to be a light-emitting layer in the organic EL device from moisture and/or oxygen.

A polarizing film for a backlight is often placed just over a protective film in an organic EL. In such a case, a protective film on one side of the polarizing film can be omitted. It is, therefore, not necessary to form a protective film for a polarizing film as in the prior art, so that a thinner polarizing film can be obtained.

A protective film may be formed on a polarizing film by directly laminating the polarizing film with the protective film for a polarizing film, or alternatively by first laminating the protective film for a polarizing film and a polarizing film on each matrix base and then peeling off the protective film for a polarizing film or the polarizing film from the matrix base while laminating it on the polarizing film or the protective film for a polarizing film. When using it as a polarizing film in a liquid-crystal panel, for example, when using an organic EL device as a backlight, it is preferable to laminating the polarizing film on a protective film for a polarizing film because the polarizing film is formed on the protective film in the organic EL device.

In this example, a total film thickness was 6 µm, i.e., a polarizing film (3 µm)+a protective film (3 µm).

When forming a protective film on one or both surface of a polarizing film, it is formed by lamination of an optically transparent protective layer. A resin constituting the protective layer must be not only optically transparent and mechanically strong, but also heat resistant and moisture-proof. Examples of such a resin include cellulose, polycarbonates, polyesters, acrylic compounds, polyether sulfones, polyamides, polyimides and polyolefins. Among these, preferred are celluloses such as triacetylcellulose; polyesters such as polycarbonates and polyethylene terephthalate; and acrylic compounds.

The protective layer may contain a UV-ray absorber such as salicylate compounds, benzophenol compounds, benzotriazole compounds, cyanoacrylate compounds and nickel complex salt compounds. Each surface of the protective layer may be processed by various methods to have, for example, a hardcoat layer, an antireflection layer and an antiglare layer.

A thickness of a protective layer is generally 80 µm or less, preferably 40 µm or less in the light of, for example, weight reduction, protecting function, handling properties and crack resistance during cutting in the thin film. When forming protective layers on both surfaces of a polarizer, these protective layers may be made of different resins.

An adhesive is used for laminating a protective film with a polarizer. There are no particular restrictions to an adhesive used herein as long as it can adequately gluing the protective film with the polarizer. An adhesive is applied on one or both surfaces of the polarizer by any of various methods such as a wire bar, a doctor blade and dipping and the polarizer is laminated with a protective layer. Furthermore, for ensuring an adhesive power in lamination, the adhesive layer is dried or cured by hot air, UV rays or infrared ray. Here, it is preferable to dry or cure the adhesive layer under the conditions which do not deteriorate polarizing performance of the polarizer.

Furthermore, the polarizing film comprises a glue layer because the film is laminated with a variety of optically functional members such as a liquid crystal cell or a retardation film in a liquid crystal display panel.

Such a glue may be selected from those containing a base polymer such as acrylic polymers, silicone polymers, polyesters, polyurethanes and polyethers. In particular, it is preferable to select from those which exhibits good optical transparency, appropriate wettability, appropriate cohesion force, good adhesiveness to a base material, weather resistance and heat resistance and can be used without peeling problems such as lift and detachment; for example, an acrylic glue.

A useful base polymer for an acrylic glue is an acrylic copolymer with a weight-average molecular weight of 100,000 or more prepared by blending an alkyl(meth)acrylate having an alkyl group with 20 or less carbon atoms such as methyl, ethyl and butyl with an acrylic monomer consisting of, for example, (meth)acrylic acid or hydroxyethyl(meth) acrylate such that a glass transition temperature becomes preferably 25° C. or less, more preferably 0° C. or less.

A gluing layer can be formed on a polarizing film, for example, by dissolving or dispersing a glue composition in an organic solvent such as toluene and ethyl acetate to prepare a 10 to 40% by weight solution, which is then directly applied on a polarizing film to form a glue layer, or alternatively by preliminarily forming a glue layer on a protective film and transferring the glue layer on a polarizing film to form a glue layer. A thickness of the gluing layer depends on its adhesive power, and generally within a range of 1 µm to 50 µm.

A gluing layer may, if necessary, contain fillerss such as glass fiber, glass beads, resin beads, metal powder and other inorganic powders; pigments; antioxidants; and UV absorbers such as salicylate compounds, benzophenol compounds, benzotriazole compounds, cyanoacrylate compounds and nickel complex salts. A thickness of the above polarizing film is 150 µm or less, preferably 100 µm or less in a configuration with protective layers in both surfaces (protective layer/polarizer/protective layer/glue layer) and 100 µm or less, preferably 50 µm or less in a configuration with a protective layer in one surface (protective layer/polarizer/glue layer).

When using a polarizing film according to this invention in a reflection type or semi-transmissive reflection type liquid crystal display panel, it may be laminated with a retardation film to be used as a circularly-polarized light film.

Examples of a retardation film include films made of, for example, polycarbonate, polyvinyl alcohol, polystyrene, polymethyl methacrylate, polyolefin, polyarylate or polyamide whose in-plane refractive index is controlled by uniaxial or biaxial drawing; films whose refractive index in a thickness direction is controlled by shrinking the raw-material resin film under adhesion to a thermally shrinkable film; and oriented films of a discotic liquid crystal or nematic liquid crystal. Here, two or more of the retardation films may be combined for improving contrast.

It is preferable to use a glue for integrating a polarizing film and a retardation film in the light of convenience in working and prevention of optical distortion. Here, a glue layer may be formed on one or both surfaces of the polarizing film or the retardation film before integrating them. A glue layer formed may consist of superimposed layers made of different compositions or types. Furthermore, when forming glue layers on both surfaces, their compositions or types may be different between the front and the rear surfaces of the polarizing film or the optical layer.

When using a ¼ wavelength plate as a retardation film, it is necessary to laminate the film such that an angle between an absorption axis of the polarizing film and a lag axis of the retardation film is within the range of 45°±1° or 135°±1°. If lamination precision deviates from the range, adequate function as a circularly-polarized light film cannot be achieved.

In the above circularly-polarized light film, it is preferable to employ a configuration that a retardation film is laminated on one side of a polarizer via a glue layer (protective layer/ polarizer/glue layer/retardation film/glue layer), using a polarizing film having a protective layer in one side. A thickness of the circularly-polarized light film having such a configuration is desirably 150 µm or less, preferably 100 µm or less.

A polarizing film according to this invention and a circularly-polarized light film therewith are suitably used in a liquid crystal display panel for a mobile device such as a notebook personal computer and a cellular phone, and laminated one or both sides of the liquid crystal cell via a glue. The polarizing films or the circularly-polarized light films formed in both sides of the liquid crystal cell may be the same or different. The film may be laminated on the liquid crystal cell by, but not limited to, preliminarily cutting the polarizing film or the circularly-polarized light film substantially into the size of the liquid crystal cell and applying a pressure to the film using a roll or press such that no bubbles enter between the liquid crystal cell and the polarizing film or the circularly-polarized light film without the liquid crystal cell being broken.

There will be detailed a color filter as Example 5.

Film Type Color Filter

There will be described a process for manufacturing a film type color filter as Example 5 with reference to FIG. 11. On a PET (polyethylene terephthalate) film 390 wound-up as a roll with a film thickness of 30 to 100 μm to be a first supporting substrate is applied, by an appropriate application method such as gravure coating, a photosensitive resin layer 391 with a coating film thickness of 10 μm of red (R) 395, green (G) 396 or blue (B) 397 to be a color filter or black (BK) 394 to be a black matrix. A coating film thickness of the photosensitive resin layer 391 is preferably 5 μm to 20 μm, more preferably 8 μm to 15 μm. When the thickness is 5 μm or more, the film can satisfactorily act as a color filter or black matrix. When the thickness is 20 μm or less, a light transmittance is not reduced.

In terms of a photosensitive resin layer 391, a coating film thickness is 10 μm and a film thickness of a color filter layer after drying is 1 μm.

The photosensitive resin layer is composed of a solvent component and a solid component. The solid component consists of a transparent resin component, a dispersing agent and a pigment. The transparent resin component consists of a polymerization initiator, a monomer and a thermal or optical cross-linking agent. The solvent component may be selected from ketones, esters and ethers with a boiling point of 100° C. to 200° C. and a vapor pressure of 10 mmHg or less. The monomer is preferably a polyfunctional acrylate monomer. If it is 10 mmHg or less, drying spot can be avoided. As a thermal or optical cross-linking agent, a (meth)acrylic acid-acrylate copolymer is desirable because it can improve a visible-light transmittance. A photopolymerization initiator is preferably selected from imidazole, acetophenone, triazine and thioxanthone initiators because they can minimize a dark reaction. In terms of a pigment, a particle size of 0.1 μm or less is acceptable because a light transmittance is not deteriorated.

In addition to a polyethylene terephthalate resin, the supporting substrate may be made of a resin selected from polyethylene resins, polypropylene resins, polyester resins, ethylene vinyl copolymer resins, polyvinyl chloride resins, cellulose resins, polyamide resins, polyimide resins, polycarbonate resins, polystyrene resins and vinyl acetate resins which are light-transmittable.

A film made of a polymer material for the first supporting substrate is advantageous in that in subsequent steps, a photosensitive resin 391 can be peeled off from the supporting substrate, washed and then reused.

There will be detailed the step of forming a black matrix with reference to the drawings. On a PET film 390 is applied a photosensitive colored resin 391 consisting of a material selected from carbon black, acetylene black and lampblack with a particle size of 5 nm to 200 nm and a cross-linking agent having a carboxyl group such as (meth)acrylamide and N,N-dimethyl(meth)acrylamide by a die head method or a gravure roll method, and the resin is dried at 180° C. using hot air, infrared ray or far-infrared ray. After cooling to an ambient temperature under cool air, a cover film 392 made of a polyester resin is laminated on the photosensitive colored resin 391, and then the film is wound into a wind-up roll (FIG. 11A).

Only in a black matrix, a chromium layer may be formed to a thickness of 0.1 μm to 0.2 μm. Although chromium can be deposited by physical vapor deposition, an organic resin film is more desirable herein.

There will be described preparation of a base film on which photosensitive resins to be R (red), G (green) and B (blue) in a color filter are similarly applied.

Next, from the wind-off roll is fed the base film 390 as a first base in which the cover film 392 is laminated with the photosensitive resin 391 for a black matrix while peeling off the cover film. Then, on the surface with a cover film 392 is laminated a second base 393 for a color filter made of a highly heat resistant resin. Subsequently, the film is exposed from the side of the base film 390 via a mask, the base film 390 is peeled, and the photosensitive resin 391 is developed to form a black matrix on the color filter base 393. Then, the cover film 392 is laminated on the surface in which the black matrix is formed (see FIG. 11B).

The cover film is a protective film for the photosensitive resin 392, the black matrix and the color filter, and is desirably weakly-adhesive so that it can be easily glued or peeled.

As used herein, weak adhesion means that the material can be released together with a base supporting a gluing layer without chemical or physical influence on the other material during peeling. Such property can be achieved by dissolving a film made of a self-adhesive material such as EVA (ethylenevinyl acetate) resin or an adhesive made of an acrylic resin in a solvent, applying the solution as a thin film on a cover film and then drying under warm air, curing by UV rays or curing by electron beam the applied thin film.

Of course, the above cover film can be used not only for preparing a color filter but also for preparing another optically functional film.

A photosensitive resin must also weakly adhere to the first supporting substrate. Herein, it can be glued to the supporting substrate utilizing self-adhesiveness of the photosensitive resin.

When laminating a layer made of a photosensitive resin 391 on a CF base 393, they are pressed with a pressure of 2 kg/cm² while heating both or one of the sides facing each other in the layer made of the photosensitive resin 391 to 60° C. During the process, the metal roll must be heated by an appropriate method such as electromagnetic induction so as to evenly heat the layer made of the photosensitive resin 391. Furthermore, a pressure must be evenly applied. Thus, it is desirable to apply a linear pressure from a gap between a pair of rolls. Herein, the roll may be heated by heating one or both of the pair of rolls for conducting heat from the roll(s).

Since a layer made of a photosensitive resin 391 is laminated on a CF base, it is desirable to block oxygen during exposure and to form an oxygen blocking film made of silicon oxide or alumina to a film thickness of 10 nm to 50 nm when using a polymer resin film as the CF base. The oxygen blocking film is equivalent to a gas barrier film in a base film, which is not limited to a silicon oxide or alumina film. For an inorganic material such as silicon oxide and alumina, a film thickness is preferably 10 nm to 50 nm. A film thickness of 10 nm or more is adequate to block oxygen while a thickness of 1 μm or less does not lead to a particular problem in manufacturing.

Furthermore, for avoiding damage on the layer made of a photosensitive resin 39 during lamination, it is preferable to form an excoriation-resistant protective film made of a polyester or polyethylene resin for a CF base made of a polymer resin. A film thickness may be within a range of 10 µm to 200 µm, and a film having a thickness of 10 µm or more may have adequate excoriation resistance, resulting in no damage on the photosensitive resin 391. A film thickness of 200 µm or less may not lead to a particular problem in manufacturing.

It is, of course, preferable to form a protective film not only for manufacturing a color filter but also for improving excoriation resistance during lamination.

An oxygen blocking film made of silicon oxide can be formed by, for example, a continuous CVD apparatus. An oxygen blocking film made of alumina may be formed by a continuous PVD apparatus.

Exposure may be satisfactorily conducted by a method using a common extra-high voltage light as a light source such as contact exposure and reduced projection exposure. A laser apparatus may be used as a light source for reduced projection exposure. After development, the polymer resin in the photosensitive resin 391 is crosslinked by overheating or UV-ray irradiation.

Thus, the photosensitive resin becomes stable while its adhesiveness to the CF base is improved.

Then, a red filter is formed on the CF base 393 comprising the black matrix as described above. Subsequently, in a similar manner, a green and a blue filters are formed to provide a color filter layer 399 on the CF base (see, FIG. 12). This is just an example, but the order of the colors can be determined as appropriate.

When the resin can be in a continuous process applied on the base film, dried and laminated on the CF base or when using a manufacturing apparatus capable of conducting such a continuous process, the cover film 392 may be omitted.

A manufacturing apparatus comprises a wind-off roll and a wind-up roll within it, and processes a film fed from the wind-off roll. Its inside is shielded from the outer atmosphere and preferably has a cleanliness factor of at least 1000 or less (a density of dusts with a size of 0.1 to 0.5 µm or less is $1000/m^3$ or less). Furthermore, the inside is more preferably under an atmosphere of an inert gas such as nitrogen, helium and argon.

Figure 12:
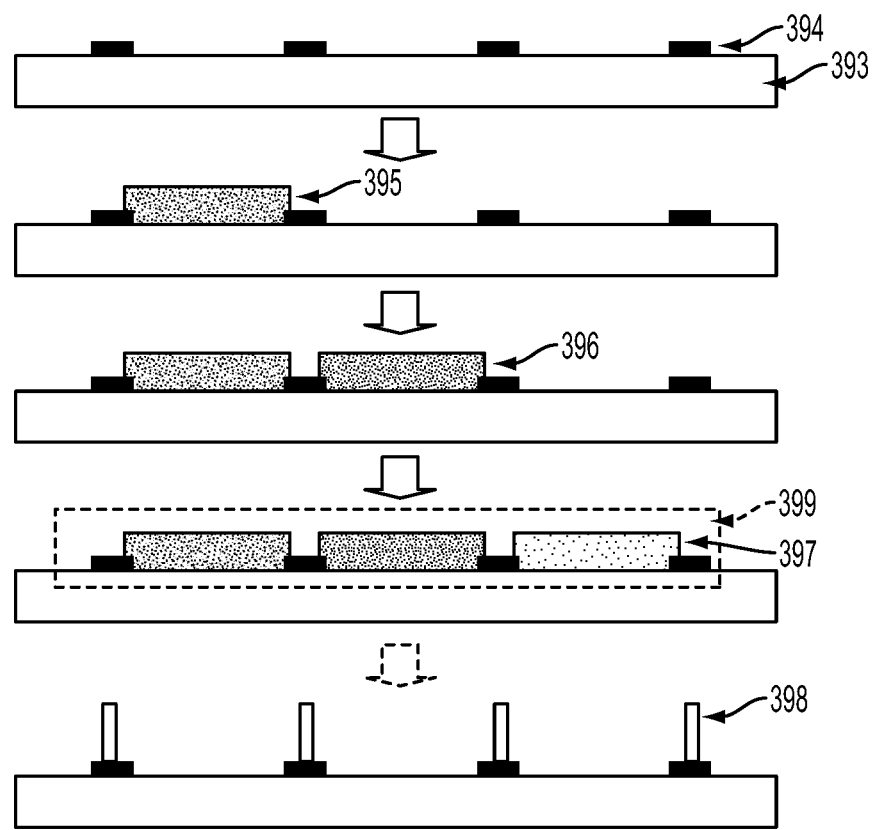
FIG. 12 is a conceptual view illustrating a process for manufacturing a color filter according to this invention.

The color filter may comprise a spacer on the black matrix. Herein, as shown in FIG. 12, all of R (red), G (green) and B (blue) constituting the color filter may be formed as described above, before forming a spacer.

A spacer may be formed as a cylinder or prism as described for the color filter. Its position on the black matrix may be inside of the black matrix. In the light of an alignment margin, the spacer is preferably designed to be at a position inside of the maximum misalignment. A preferable height is 3 µm to 5 µm.

Figure 13:
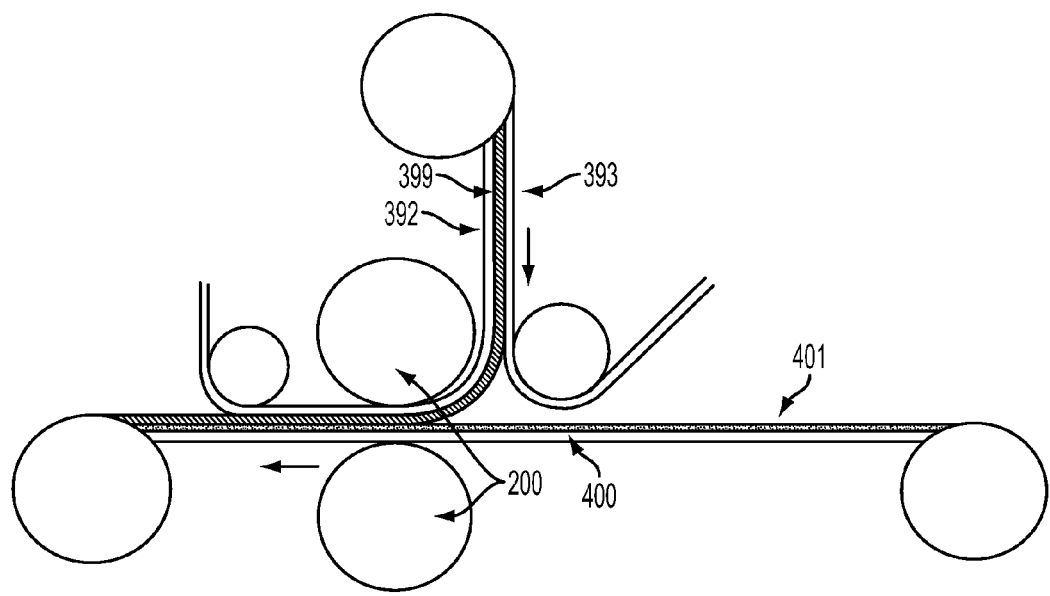
FIG. 13 is a conceptual view illustrating a process for manufacturing a color filter according to this invention.

The color filter layer 399 formed on the CF base 393 is transferred onto a functional film comprising a TFT layer 381 where a TFT device, an interconnection and a pixel electrode are formed on a base film 380, which is drawn from the wind-off roll to the wind-up roll as shown in FIG. 13.

In FIG. 13, the CF base in the color filter 399 is peeled, after which the color filter 399 is transferred to the TFT layer 401 via the cover film 392 by a transfer roller. After the transfer, the cover film 392 is peeled off.

In FIG. 13, assuming that the spacer 398 is formed on the side which contacts with the cover film 392 and the color filter 399, the side without a spacer in the color filter 399 is involved in the transfer to the TFT layer. When no spacers 398 are formed, the color filter 399 may be transferred to the TFT layer 401 on the side which contacts with the cover film.

The cover film 392 may be, without being peeled, wound into a wind-up roll together with the base film.

Although there has been described a configuration where the color filter layer formed on the CF base 393 is transferred, the layer may be laminated with the CF matrix base 393 using a base film.

Since the first supporting substrate 390 is peeled in addition to the cover film 392, the photosensitive resin 391 and the color filter layer 399 must be weakly adhesive to the substrate like the cover film.

Although a photosensitive resin is used in this example, a colored resin may be used. When using a colored resin, on a colored resin is applied a photoresist, which is then exposed, developed, dried and subjected to etching for removing an unnecessary colored layer (not shown).

There will be an ink-jet type color filter as Example 5.

EXAMPLE 5

Ink-Jet Type

A color filter can be prepared, for example, by an ink-jet process as follows.

Examples of a resin material used for forming a color filter layer include, but not limited to, polyimide resins, PVA derivative resins and acrylic resins. For example, in terms of an acrylic resin, suitable resins are those with a molecular weight of about $5 \times 10^3$ to $100 \times 10^3$ prepared using about 3 to 5 monomers selected from alkyl acrylates or alkyl methacrylates such as acrylic acid, methacrylic acid, methyl acrylate and methyl methacrylate; cyclic acrylates and methacrylates; and hydroxyethyl acrylate and methacrylate.

A diluting monomer may be, if necessary, added for adjusting properties such as viscosity and curability of a color filter layer. Examples of a diluting monomer include bifunctional monomers such as 1,6-hexanediol diacrylate, ethyleneglycol diacrylate, neopentylglycol diacrylate and triethyleneglycol diacrylate; trifunctional monomers such as trimethylolpropane triacrylate, pentaerythritol triacrylate and tris(2-hydroxyethyl)isocyanate; and multifunctional monomers such as di(trimethylolpropane)tetraacrylate and di(pentaerythritol)penta- and hexa-acrylates. A suitable content of the diluting monomer is about 20 to 150 parts by weight to 100 parts by weight of the acrylic resin.

Examples of a pigment used for preparing a colored composition include organic dyes, i.e., red pigments such as C. I. Nos. 9, 19, 81, 97, 122, 123, 144, 146, 149, 168, 169, 177, 180, 192 and 215, green pigments such as C. I. Nos. 7 and 36, blue pigments such as C. I. Nos. 15:1, 15:2, 15:3, 15:4, 15:6, 22, 60 and 64, purple pigments such as C. I. Nos. 23 51319 and 39 42555:2, yellow pigments such as C. I. Nos. 83, 138, 139, 101, 3, 74, 13 and 34, black pigments such as carbon, and body pigments such as barium sulfate, barium carbonate, alumina white and titanium.

A dispersing agent used for preparing a colored composition may be a surfactant, a pigment intermediate, a dye intermediate or Solsperse. Suitable examples of an organic dye derivative include azo, phthalocyanine, quinacridone, anthraquinone, perylene, thioindigo, dioxane and metal complex salt derivatives. The organic dye derivatives are appropriately selected from those having a substituent such as hydroxy, carboxyl, sulfone, carboxamide and sulfonamide which exhibit good dispersibility.

A content of the pigment is about 50 parts by weight to 150 parts by weight to 100 parts by weight of an acrylic resin. A content of a dispersing agent is about 1 part by weight to 10 parts by weight to the pigment. For adjusting spectral properties of a color filter, a suitable pigment may be added as appropriate.

A thermal crosslinking agent used for preparing a colored composition may be a melamine resin or an epoxy resin. Examples of a melamine resin include alkylated melamine resin such as a methylated melamine resin and a butylated melamine resin and mixed etherated melamine resins, which may be of a high-condensation type or a low-condensation type.

Examples of the above epoxy resin include glycerin, polyglycidyl ether, trimethylolpropane polyglycidyl ether, resorcinol diglycidyl ether, neopentylglycol diglycidyl ether, 1,6-hexanediol diglycidyl ether and ethyleneglycol(polyethyleneglycol) diglycidyl ether.

A content of a thermal crosslinking agent is suitably 10 to 50 parts by weight to 100 parts by weight of an acrylic resin. Suitable examples of a solvent used for preparing a colored composition include toluene, xylene, ethyl cellosolve, ethyl cellosolve acetate, diglyme, cyclohexanone, ethyl lactate and propyleneglycol monomethyl ether acetate which may be used alone or in combination of two or more, depending on a monomer composition, a particular thermal crosslinking agent and a diluting monomer.

A colored composition used for forming a color filter layer comprises a resin, a pigment, a dispersing agent, a thermal crosslinking agent and a solvent as described above. The colored composition is prepared as follows. First, an acrylic resin and a pigment are kneaded using three rolls into chips, to which are then added a dispersing agent and a solvent to prepare a paste. To the paste are added a thermal crosslinking agent and a diluting monomer to prepare an application solution of a colored composition.

On a supporting substrate are applied the application solutions of black (black matrix), red, green and blue in a predetermined pattern by an ink-jet process. Ink-jet apparatuses may be classified into a piezo conversion system or a heat conversion system, based on difference in an ink discharge system. In particular, a piezo conversion system is suitable. Preferred is an apparatus with an ink atomizing frequency of about 5 to 100 KHz and a nozzle diameter of about 1 µm to 80 µm, having four heads, each of which has 1 to 1,000 nozzles.

The number of heads may vary depending on the number of colors to be applied. When three colors, i.e., red, green and blue, are applied, three heads are used. Preferably, the number of heads are at least equal to the number of colors applied and each head is assigned to each color.

Before applying the solution on the supporting substrate by an ink-jet process, an underlying layer matching a resin and/or a solvent in the application solution may be formed for adjusting ink receptivity and wettability in advance. The underlying layer may be made of a polyimide resin, a PVA derivative resin, an acrylic resin and/or an epoxy resin composition, to which porous particles of silicon oxide or alumina may be added. A matrix light-shielding layer may be formed by a photolithographic method or the above transfer method, which may be conducted before or after forming the color filter layer by an ink-jet process.

If necessary, over the color filter layer may be formed an overcoat layer, which is used for improving apparent flatness, durability represented by moisture resistance and chemical resistance in the color filter layer, and for ensuring barrierhood for preventing elution from the color filter layer. Examples of a material suitably used include transparent resins such as thermosetting acrylic copolymers containing maleimide and epoxy resin compositions. The color filter formed on the supporting substrate can be transferred to a functional film as described for a film type color filter.

When forming the overcoat layer before transfer, the transfer may be conducted on the side opposite to the overcoat surface in the color filter as described for the film type filter.

Although the color filter layer was formed on the supporting substrate in this example, the solution may be directly applied on a functional film by an ink-jet process. Here, the color filter layer is dried on the functional film, so that a color filter can be formed on the functional film. By forming a cover film on the color filter layer, deterioration of the color filter during storage can be avoided. As described for the case where a color filter is formed on a supporting substrate, an overcoat layer may be formed over the color filter layer.

There will be detailed a light collector array and a rear emitting light source comprising the light collector array as Example 6 of this invention with reference to the drawings.

FIG. 30 is a schematic cross-sectional view of a rear light source according to this example.

An optical guide 701 is an acrylic resin type film with a film thickness of 300 µm containing 20% by weight of silica with the maximum particle size of 100 nm and an average particle size of 50 nm.

There is formed a light collector array on an optical guide 701. On the light collector array, there is formed a light diffusing film 704.

A light diffusing film 704 has a film thickness of 40 µm and contains 25% by weight of an inorganic fillers consisting of silica with an average particle size of 2 µm and the maximum particle size of 10 µm. It is an acrylic resin type film as described for the optical guide 701.

For color display, a rear light source in a liquid crystal must be a white light and a light source 705 is an array of light-emitting diodes 706 emitting R (red), G (green) and B (blue) (see, FIG. 30B). Although three primary colors are used in this example, two colors which are mutually a complementary color, for example, blue and yellow may be used or a white light-emitting diode may be used.

When the optical guide 701 is so thin, specifically thinner than the light-emitting diode in the light source, light can be focused and guided to the optical guide 701 by a well-known method.

When a reflection film 702 is formed in a surface facing the light collector array of the optical guide 701, a light from the light source can be efficiently utilized. The reflection film 702 is an aluminum thin film with a thickness of 10 µm. There are no particular restrictions to a film thickness, but the upper limit may be generally 20 µm in the light of limits of a weight and a thickness. With the lower limit of 1 µm or more, it may act as a reflection film.

In this example, a light is collected into the light collector array 703 (only one array is shown in FIG. 30C) formed in the in the outgoing face of the optical guide 701 and then is taken utilizing total reflection as shown in FIG. 30C. Thus, a reflection film 702 is not essential, but in terms of reuse of a reflection light in an interface, the light can be efficiently used by forming a reflection film in the rear surface of the optical guide.

The light collector may have a variety of shapes as shown in FIG. 31, but it must be formed such that an area of the surface contacting with the optical guide in the light collector is smaller than an area of the surface facing the above surface in the light collector.

In addition to the shape shown in FIG. 31, the light collector may preferably have a cross-sectional shape such as an arc, a parabola, an ellipse, a part of a trapezoid and a combination thereof. Furthermore, in view of adhesiveness to the optical guide, its top is preferably flat.

Figure 32:
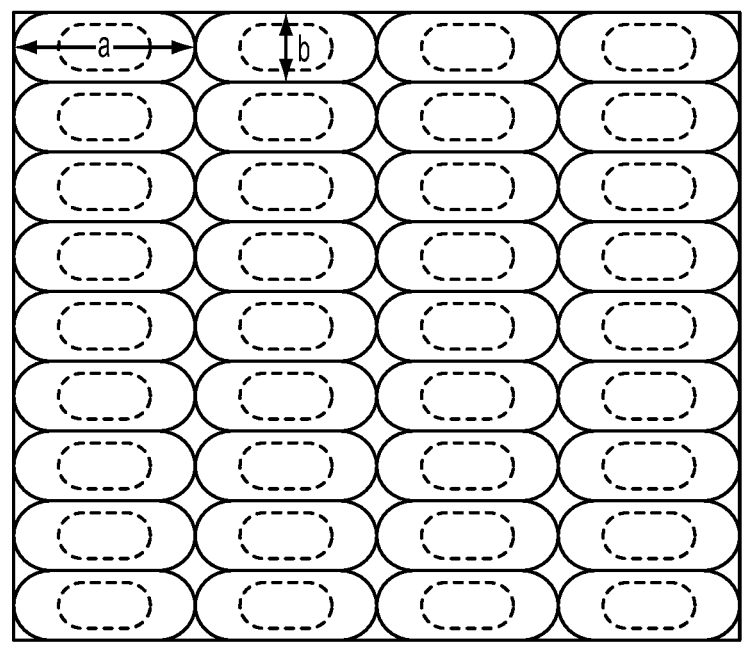
FIG. 32 is an overhead view of a light collector array.

FIG. 32 is an overhead view of a light collector array. In the light collector, "b" is preferably 10 μm to 100 μm both inclusive, more preferably 20 μm to 70 μm both inclusive. When it is 10 μm or more, no interference fringes are formed in a liquid crystal. When it is 100 μm or less, a light efficiency is not reduced.

There are no restrictions to the dimension "a", but it is generally 500 μm to 10 μm because no defects are generated during manufacturing a light collector array and defective transfer can be prevented during transfer.

A thickness is b/3 or more. For reducing a film thickness, the dimension "b" in the light collector is preferably 20 μm to 60 μm both inclusive. When the dimension "b" in the light collector is 20 μm to 60 μm both inclusive, the light collector can be formed to a thickness of 7 μm to 20 μm.

In this example, a light collector with a=200 μm, b=50 μm and a thickness of 10 μm is used.

Thus, a rear-emitting light source could be formed to a thickness of 350 μm (0.35 mm). In other words, a thickness could be reduced in comparison with 0.8 mm in a conventional optical guide. In a conventional optical guide, a larger optical guide requires a larger film thickness, whereas in this invention, increase in a dimension does not lead to a larger film thickness of the optical guide. Furthermore, in a rear-emitting light source of this invention, a flexible thin film can be used in an optical guide, so that impact resistance can be also significantly improved.

Figure 33:
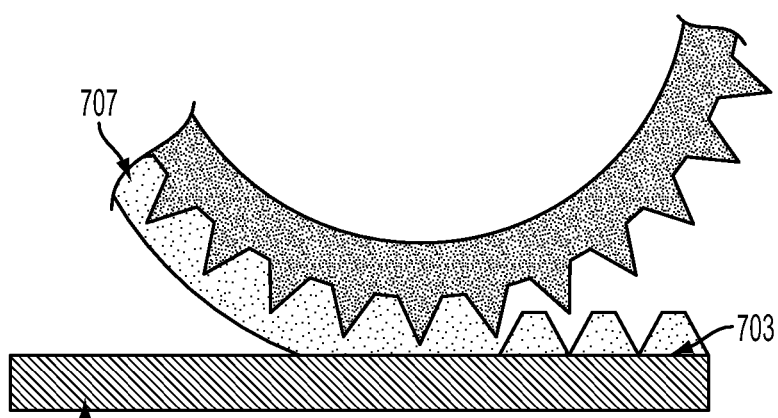
FIG. 33 shows a process for manufacturing a light collector.
Figure 34:
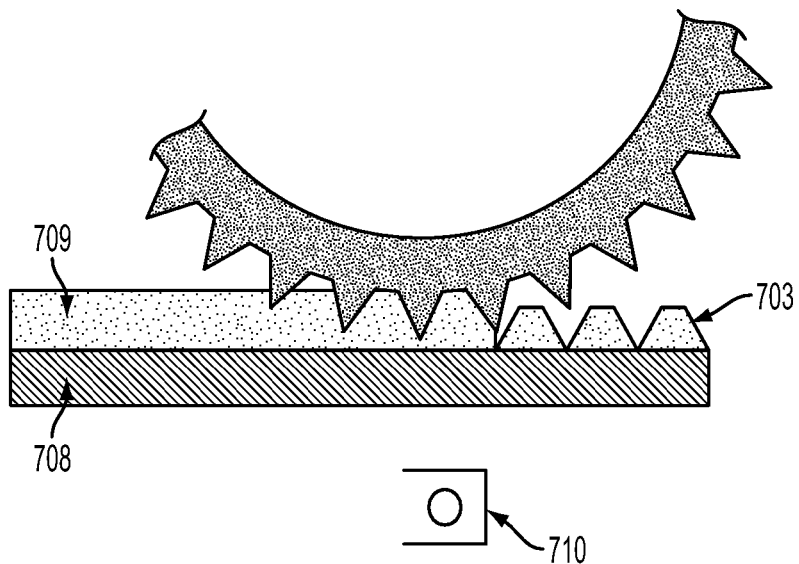
FIG. 34 shows a process for manufacturing a light collector.
Figure 35:
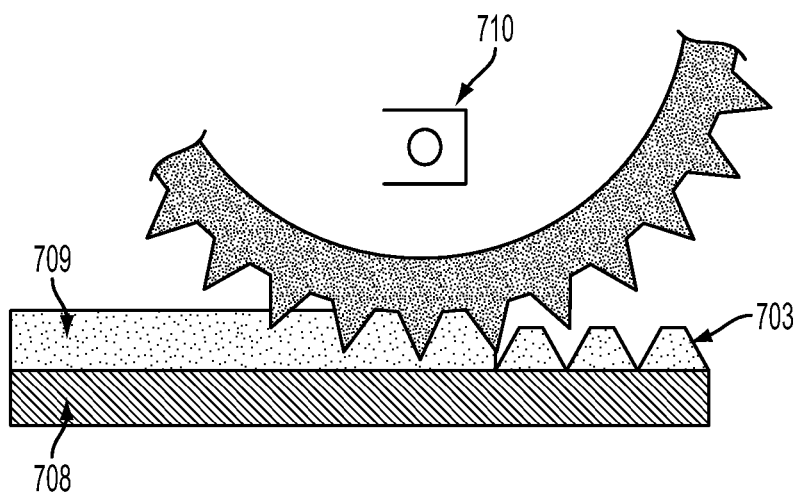
FIG. 35 shows a process for manufacturing a light collector.

Next, there will be described a process for manufacturing a light collector array. A light collector array can be prepared by coating a female die with a resin, curing the resin while pressing the supporting film from the resin side and releasing the cured resin from the female die (FIG. 33), or alternatively, by coating a base film with a resin, curing the resin while pressing the resin side against a female die and releasing the cured resin from the female die (FIGS. 34, 35). As will be detailed later, UV rays can be irradiated from the rear side of the supporting film 708 (see, FIG. 34), or alternatively from the side of the female die (FIG. 35).

A thermosetting resin may be used in place of a UV cure resin 709. However, since only a part pressed by the female die should be heated, it is preferable to use a UV cure resin.

In such a case, curing of the resin does not have to completely proceed, but may be to a degree such that a pattern shape can be retained.

A resin for pattern curing which can be used may be, for example, a resin which can be cured by an active energy ray or heating.

In this example, the use of an acrylic resin as described for a base film is illustrated, but a resin used is not limited to an acrylic resin.

When a light collector is made of a material as described for the optical guide light collector, a light efficiency is improved because a refractive index is substantially equivalent in the optical guide and the light collector so that a light is not reflected in an interface between the optical guide and the light collector.

An active energy ray used for curing is preferably UV rays. Examples of a lamp generating UV rays include a metal halide type lamp and a high-pressure mercury-vapor lamp.

In curing with an active energy ray such as UV rays, preferably a photopolymerization initiator which generates radical is added. Examples of a photopolymerization initiator used here include benzophenone, benzoin methyl ether, benzoin propyl ether, diethoxyacetophenone, 1-hydroxy-cyclohexyl phenyl ketone, 2,6-dimethylbenzoyl-diphenylphosphine oxide, 2,4,6-trimethylbenzoyl-diphenylphosphine oxide and benzophenone. Two or more of these photopolymerization initiators may be combined. A content of a photopolymerization initiator is preferably 0.01 to 2 parts by weight to 100 parts by weight of an organic component having a (meth)acryl group. A too low content may lead to insufficient sensitivity to complete curing while a too high content may lead to excessive sensitivity which may cause a curing reaction during compounding, resulting in defective application.

In thermal polymerization, a thermal-polymerization initiator may be added as necessary. Examples of a thermal-polymerization initiator used here include benzoyl peroxide, diisopropyl peroxycarbonate and t-butyl peroxy (2-ethylhexanoate), which can be used an amount of 0.01 to 1 parts by weight to 100 parts by weight of an organic component having (meth)acryl group.

When a UV-ray cure resin is used and the film has a high transmittance to a wavelength curing mainly the UV-ray cure resin, UV rays may be irradiated from the film side (FIG. 34). When the film has a low transmittance to the wavelength, the female die can be formed by using a transparent material which is transparent to the wavelength and UV rays may be irradiated from the female die side (FIG. 35).

Figure 36:
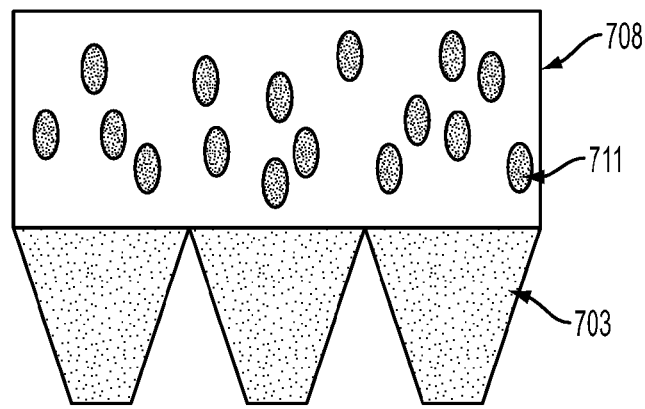
FIG. 36 shows a structure of a light diffusing film and a light collector array.
Figure 37:
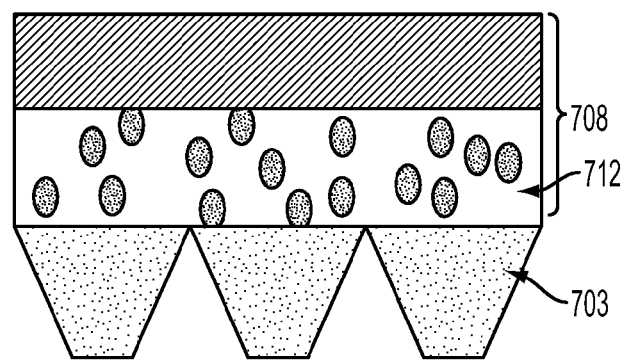
FIG. 37 shows a structure of a light diffusing film and a light collector array.
Figure 38:
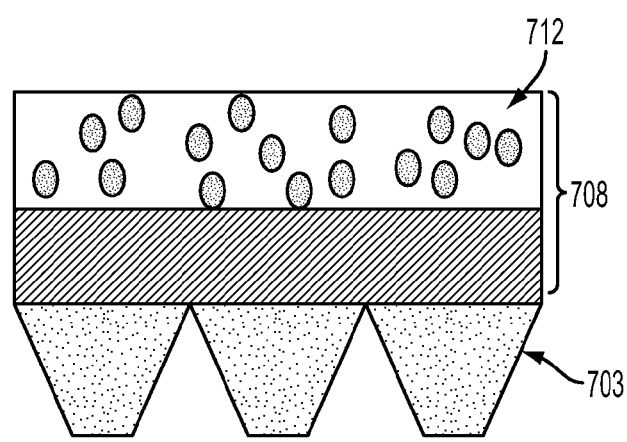
FIG. 38 shows a structure of a light diffusing film and a light collector array.

When using a film comprising light-scattering particles, the light diffusing film may be a single film as shown in FIG. 36, or a laminated film as shown in FIGS. 37 and 38. In FIG. 37, the light diffusing film is formed just over the light collector array. In FIG. 38, the light diffusing film is formed on a supporting film. Any of the configurations shown in FIGS. 36 to 38 may be employed.

Next, there will be described a process for manufacturing a rear light source having the configuration shown in FIG. 31. A light collector array is formed on a supporting film as described for FIGS. 33 to 35. Then, the light collector array is transferred on a base film to be an optical guide. For a supporting film endowed with light scattering function, the supporting film with the array can be laminated.

In terms of a reflection film, a reflection film made of, for example, a metal (e.g., aluminum) is preliminarily formed on a surface facing the surface in the base film to be an optical guide on which a light collector array is to be formed, to a film thickness of 10 μm. A functional film on the reflection film can be formed as described in Example 8 and therefore will not be described in detail.

Figure 39:
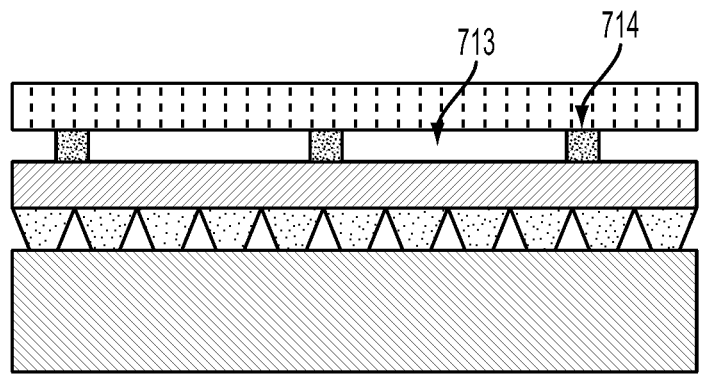
FIG. 39 is a cross-sectional view of a liquid-crystal panel.

FIG. 39 shows a schematic cross-sectional view of a liquid crystal structure comprising the light collector array thus obtained.

Figure 40:
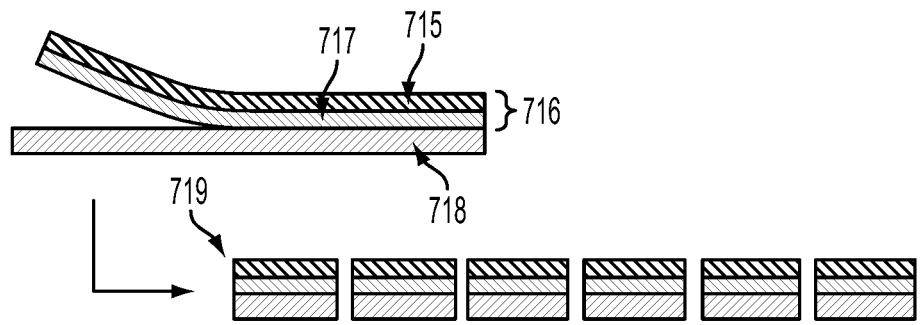
FIG. 40 shows a process for manufacturing a liquid-crystal panel.

FIG. 40 shows that without being cut, an uncut sheet of base film is laminated to form a plurality of liquid-crystal panels on the base film, which are then cut into individual liquid-crystal panels by precise cutting.

Since a process for manufacturing a liquid-crystal panel in FIG. 40 is as described above, it will not be described in detail.

Figure 41:
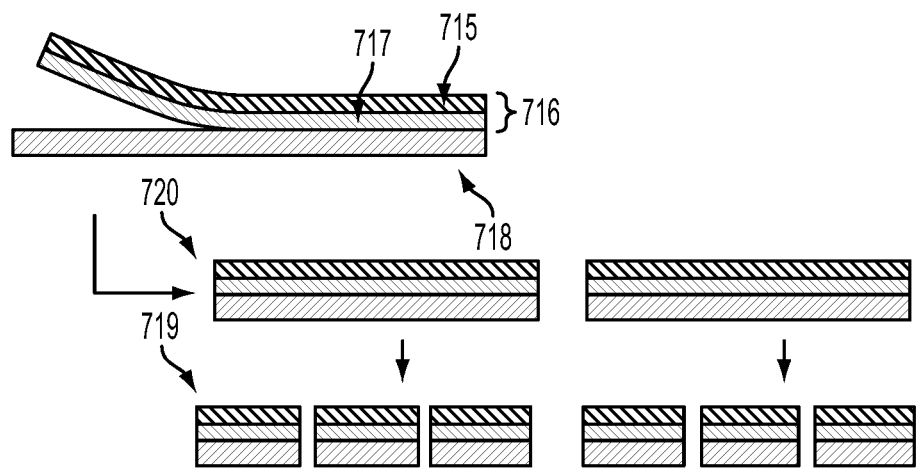
FIG. 41 shows a process for manufacturing a liquid-crystal panel.
Figure 42:
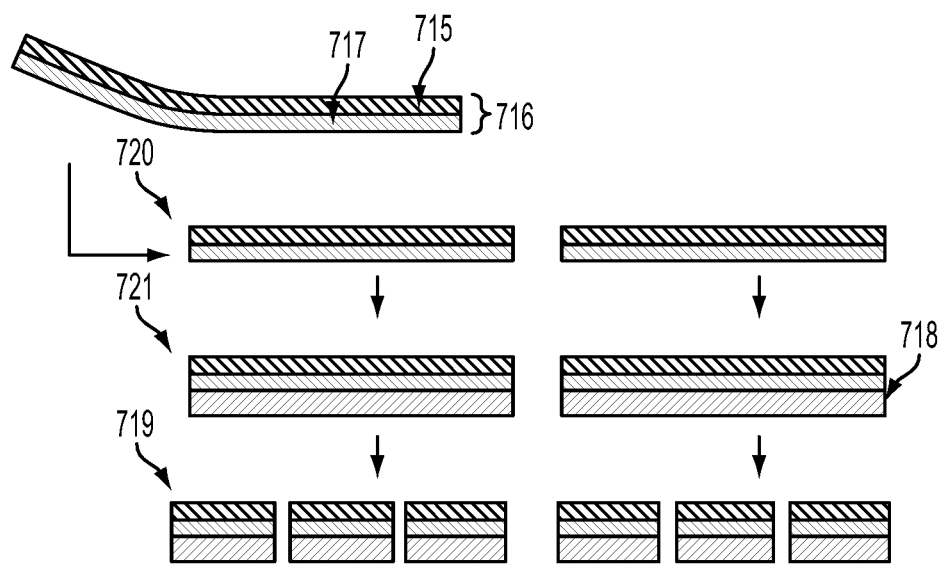
FIG. 42 shows a process for manufacturing a liquid-crystal panel.

After laminating the optical guide with the liquid crystal cell, the film can be precisely cut in accordance with a size of each liquid crystal display device (FIG. 40), or the liquid crystal cell can be cut into a particular number of pieces, which is then precisely cut in accordance with a display size (FIG. 41). Alternatively, after the liquid crystal cell is cut into a particular number of pieces, they can be laminated with the optical guide (FIG. 42).

Cutting in this process may be conducted by, for example, cutting by laser beam scanning or punching by a Thomson blade. For obtaining a liquid-crystal panel by precise cutting, it is necessary to cut over a sealing material. A width of the liquid crystal sealing material is desirably 2 mm or more. A width of less than the range may cause defects such as detachment during cutting. It is desirably 3 mm or more.

There are no particular restrictions to the upper limit of a cutting margin. However, a too large margin may cause problems such as a larger loss and a larger panel area. The upper limit may be, therefore, generally about 5 mm.

Even when using a light collector as a rear light source, a liquid-crystal panel comprising a rear light source with a thickness of about 470 µm could be prepared. Although a film with a thickness of 300 µm was used as an optical guide in this example, an optical guide with a film thickness of 200 µm was prepared with no problems. Here, a film thickness of the liquid-crystal panel was about 370 µm.

There will be described a configuration of an organic EL device as Example 7.

A light-emitting layer comprises a single layer or multiple layers made of an organic compound or a complex with a thickness of several ten nanometers to several hundred nanometers comprising a light-emitting layer. In comparison with the single-layer structure, the appropriately combined multiple-layer structure improves a binding efficiency between an electron and a hole in the light-emitting layer and thus a combined excitation energy improves a light-emitting efficiency.

A light-emitting layer has, for a three-layer structure, a configuration comprising a hole transport layer efficiently transporting holes which is in contact with an anode electrode (anode), a light-emitting layer containing a light-emitting material and an electron transport layer efficiently transporting electrons which is in contact with a cathode electrode (cathode). In addition, there may be appropriately disposed a lithium fluoride layer, a layer of an inorganic metal salt and/or layers comprising thereof.

In the above description, a light-emitting layer and a hole or electron transport layer may have, besides a single layer configuration, a multiple layer configuration for providing white light emission and efficient transportation of holes or electrons, respectively.

For using as a backlight for a liquid crystal, a light emitted from an organic EL device should be white (for example, daylight standard light source D65 (color temperature: 6500 K)). However, to date, there are no single light-emitting materials which can emit a white light. A white light is, therefore, emitted by coincidentally producing, from a plurality of light-emitting material, a plurality of colored lights, which are then combined. A combination of multiple colored lights may be that containing three light maximum wavelengths of three primary colors, i.e., blue, green and blue, or alternatively that containing two light maximum wavelengths utilizing complementary color system such as blue and yellow and blue-green and orange, but the emitted light should be suitable for a spectral transmittance in each color filter.

Light emission from an organic EL involves utilizing a fluorescence from an organic material or exciting an organic material as a light-emission host and then utilizing a phosphorescence dopant which emits a phosphorescence by transition between the excited state and a spectral term with a different multiplicity. To date, no single materials capable of emitting a phosphorescence have been found. However, an organic material capable of emitting a phosphorescence alone can be, of course, used.

A white light may be obtained from a combination of these fluorescence-emitting organic materials, a pair of phosphorescence-emitting organic materials and a pair of a fluorescence-emitting organic material and a phosphorescence-emitting organic material.

There are no particular restrictions to a combination of materials for a light-emitting layer for obtaining a white light, and they may be combined such that a wavelength range matches a spectral transmittance in each color filter. In particular, when utilizing a phosphorescence, examples of a light-emission host include materials containing, as a motif, a partial structure such as carbazole derivatives, biphenyl derivatives, styryl derivatives, benzofuran derivatives, thiophene derivatives, arylsilane derivatives. Among others, carbazole derivatives and biphenyl derivatives are preferable light-emitting materials exhibiting a higher light-emission efficiency.

When forming a hole transport layer, there are no restrictions to a material as long as it can transport holes from an anode to a light-emitting layer. Thus, it may be appropriately selected from those commonly used as a charge-injection material for holes in a photoconductive material and known materials used for a hole transport layer in an EL device.

When forming an electron transport layer, there are also no particular restrictions to a material. The material may be appropriately selected from well-known materials capable of transporting electrons from a cathode to a light-emitting layer.

A light-emitting layer can be formed by any of known methods for forming a film such as vacuum deposition, spin coating, casting, spraying, ink-jet application, painting and printing.

A reflection film preferably has a reflectance of at least 60% for efficiently reflecting a light from a light-emitting layer or an outside light.

A transparent electrode layer is made of a metal material with a thickness of several tens nanometers to several hundred nanometers having a transmittance of 60% or more for reducing loss of a transmitting outside light or light from a light-emitting layer.

A metal material used as an anode may be appropriately selected from known metals, metal oxides, alloys, electrically conductive compounds and mixtures thereof. A material having a work function of 4 eV or more may be, however, preferably used because holes can be efficiently injected into the light-emitting layer.

Examples of an anode material include metals such as Au; and conductive materials such as CuI, indium tin oxide (ITO), indium zinc oxide (IZO), $SnO_2$ and ZnO.

When an anode is light-reflective, an anode with a high reflectance may be a laminate of the above material and a metal material with a high reflectance such as aluminum. For example, an anode may be a laminate of ITO/aluminum in sequence from the light-emitting layer. Alternatively, an aluminum film may be formed as a reflection film, with which an ITO is laminated via an insulating film such as an oxide film to form an anode.

A metal material used as a cathode may be appropriately selected from known metals, alloys, electroconductive compounds and mixtures thereof. A material having a work function of 4 eV or less may be, however, preferably used because electrons can be efficiently injected into the light-emitting layer.

Examples of a metal material for a cathode include sodium, sodium-potassium alloys, magnesium, lithium, magnesium/ silver mixtures, magnesium/aluminum mixtures, magnesium/indium mixtures, aluminum, aluminum/aluminum oxide mixtures and rare-earth metals.

When a transparent electrode is used as a cathode, it can be formed by laminating a cathode material film with an anode electrode material with a high transmittance. For example, a transparent cathode can be formed by sequentially laminating an aluminum film/ITO from the light-emitting layer.

Both cathode and anode are formed by, for example, vapor deposition or sputtering. Alternatively, an electrode may be formed by dispersing an electroconductive compound with an appropriate binder resin and applying the dispersion.

An electrode pattern may be formed by forming an electrode and then patterning it into a desired shape by photolithography, or by using a mask having an opening with a desired shape during vapor deposition or sputtering.

Next, there will be described specific manufacturing a light-emitting layer in an organic EL device. The structural formulae of materials PVK, Ir6, Ir12, CBP, (NPD, BC and Alq3 used in the manufacturing are as follows:

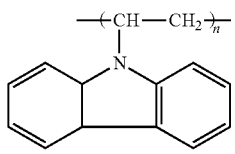

PVK

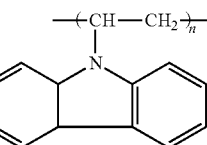

BC

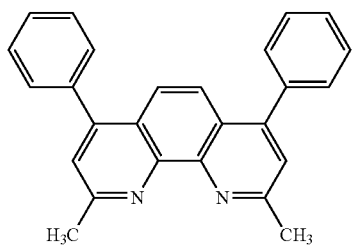

Alq3

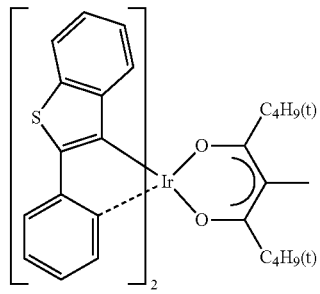

Ir-6

Ir-12

α-NPD

CBP

An organic EL device with configuration 1 utilizes a polymer material PVK as a light-emission host, Ir6 as a phosphorescence dopant and a phosphorescence of Ir12. This is a top emission type device having two light-emission maximum wavelengths, from Ir6 having a maximum wavelength in a red range and Ir12 having a maximum wavelength between a green and a blue ranges, but embodiments of an organic EL device are not limited to this.

First, a surface of a base film on which an organic EL device is to be formed was etched by oxygen plasma. Next, on the etched base film were sequentially deposited aluminum to 100 nm and ITO to 50 nm by sputtering and a metal anode electrode to be a reflection electrode layer. Subsequently, on the reflection electrode layer was applied a PEDOT/PSS solution (polyethylene dioxythiophene-polysulfonic acid dopant; baytron from Bayer AG) to 100 nm by printing, to form a hole transport layer. After drying by heating, on the layer was applied a solution of 30 mg of PVK as a light-emission host, 0.2 mg of the phosphorescence dopant Ir6, 2.0 mg of the phosphorescence dopant Ir12, 2 mg of an electron-transporting material 2-(4-biphenylyl)-6-(4-t-butylphenyl)1,3,4-oxadiazole (OXD) in 2 mL of dichloromethane to a film thickness of 100 nm by printing to form a light-emitting layer, which was then dried by heating.

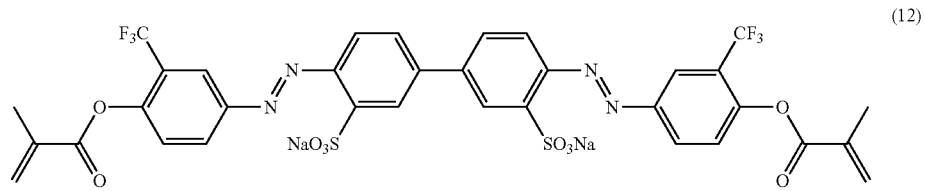

(12)

Then, using a stainless steel mask having an opening with a given electrode shape, lithium fluoride was deposited to a film thickness of 0.5 nm by sputtering. By sputtering were aluminum to 10 nm and ITO to 100 nm, to form a transparent cathode as a transparent electrode layer.

The materials used for forming an organic EL device with configuration 2 were CBP, Ir6, Ir12, (NPD, BC and Alq3.

The organic EL device of this configuration is of a bottom emission type emitting a light having two emission maximum wavelengths which utilizes a low-molecular weight material CBP as a light-emission host, a phosphorescence dopant Ir6 and phosphorescence of Ir12. However, embodiments of an organic EL device are not limited to this.

First, a surface of a base film on which an organic EL device is to be formed was etched by oxygen plasma. Next, on the etched base film was deposited ITO to a film thickness of 100 nm to form a transparent anode electrode to be a transparent electrode layer. Then, using a stainless steel film plate having an opening of 100 mm×100 mm for masking, (NPD was deposited to a film thickness of 20 nm at a deposition rate of 0.5 nm/s by resistance heating of vacuum deposition under an atmosphere of vacuum at 10-4 Pa to form a hole transport layer. Subsequently, using a mask, on the hole transport layer were co-deposited, by resistance heating, CBP as a light-emission host, the phosphorescence dopant Ir6 and the phosphorescence dopant Ir12 at vapor deposition rates of 0.5 nm/s, 0.005 nm/s and 0.02 nm/s, respectively to a film thickness of 30 nm, to form a light-emitting layer. Then, on the light-emitting layer were vapor deposited BC at a vapor deposition rate of 5 Å/s to a film thickness of 10 nm by resistance heating using a mask and then Alq3 at a vapor deposition rate of 5 Å/s to a film thickness of 40 nm to form a laminated electron-transport layer.

Next, using a stainless steel mask having an opening with a given electrode pattern shape, on the layer were sequentially deposited lithium fluoride at a vapor deposition rate of 0.01 nm/s to a film thickness of 0.5 nm and aluminum at a vapor deposition rate of 1 nm/s to a film thickness of 100 nm by resistance heating, to form a metal cathode as a counter-electrode layer.

There will be described assembling of a panel as Example 8 of this invention.

EXAMPLE 8

Assembling a Panel

An optically oriented film was formed as follows:

To 99 parts by weight of a compound represented by formula (12) was added 1 part by weight of a photopolymerization initiator "Irgacure-651" (Ciba-Geigy), and the mixture was dissolved in dimethylformamide to prepare a 5% solid solution. The solution was filtrated with a 0.1 µm filter to obtain an optically oriented material solution.

This solution was evenly applied on each of functional films A and B cut from the roll by a flexographic press, and dried at 100° C. for 15 min. The coating film thus formed was irradiated with linearly-polarized UV rays at a wavelength of about 365 nm to an accumulative light amount of 30 J/cm$^2$ from a extra-high pressure mercury lamp, for optical orientation. Next, the same surface was irradiated with non-polarized UV rays at a wavelength of about 313 nm to an accumulative light amount of 50 J/cm$^2$ from a extra-high pressure mercury lamp to initiate polymerization of the optically oriented material.

An oriented film with a thickness of 0.02 µm was obtained.

Subsequently, there will be described lamination using a sealing material.

For the purpose of synthesizing a sealing material, in a reaction vessel equipped with a nitrogen gas inlet tube, a stirrer and a reflux condenser were 500 parts of a carboxyl-containing diol, Placcel-205BA (Daicel Chemical Industries Ltd.: a number average molecular weight=500), 444 parts of isophorone diisocyanate, and then 0.1 parts of tin octoate, and the mixture was reacted at 60° C. for 1 hour. Then, to the mixture were added 260 parts of 2-hydroxypropyl acrylate, 0.4 parts of t-butylhydroquinone as a polymerization inhibitor and 0.2 parts of tin octoate as a catalyst, and then the mixture was reacted at 70° C. for 11 hours, to prepare a carboxyl-containing urethane acrylate with 0.05% of the residual isocyanate.

In a reaction vessel were placed 18 parts of PTG-850 (Hodogaya Chemical Co., Ltd.: polytetramethyleneglycol with a number average molecular weight of 850), 9.8 parts of maleimide caproate, 1.2 parts of p-toluenesulfonic acid, 0.06 parts of 2,6-tert-butyl-p-cresol and 15 parts of toluene, and the mixture was reacted with stirring for 4 hours under the conditions of 240 torr and 80° C., while removing water generated.

The reaction mixture was dissolved in 200 parts of toluene and the resulting solution was washed with 100 parts of a saturated sodium bicarbonate solution 3 times and 100 parts of saturated saline 1 time. The organic layer was concentrated to provide a maleimide derivative, i.e., polytetramethyleneglycol bis(maleimide caproate).

In a flask were placed 55 parts of the carboxyl-containing urethane acrylate, 5 parts of polytetramethyleneglycol bis (maleimide caproate) described above, 5 parts of a silane coupling agent KBM-803 (Shin-Etsu Chemical Co., Ltd.) and 40 parts of isobornyl acrylate, and the mixture in the flask was melt-blended with stirring at 80° C. for 1 hour until no unmelted compounds in the sample were present, to obtain a photocuring resin composition.

The photocuring resin composition containing aluminum oxide balls with a diameter of 3 μm was applied desired parts of the functional films A and B comprising the liquid crystal oriented film (for example, an outer edge, an outer edge of each pixel cell), which were disposed facing each other and then laminated. The sealing material was cured by irradiation with UV rays to 500 mJ/cm$^2$ from a metal halide lamp. Then, a desired liquid crystal was injected and the injection port was sealed using the photocuring resin composition as described above.

There will be described a specific example of preparing an oriented film by rubbing.

A liquid crystal orienting agent was applied on a supporting film using a printer for application of a liquid crystal oriented film, and then dried on a hot plate at 150° C. for 90 min, to form a coating film with an average dry film thickness of 0.06 μm. The coating film was rubbed by a rubbing machine having a roll wrapped with a rayon cloth under the conditions of a roll revolution of 400 rpm, a stage travelling speed of 3 cm/sec and a hair pushing length of 0.4 mm. After being washed with water, the film was dried on a hot plate at 100° C. for 5 min to obtain an oriented film.

There will be described an active driving type liquid crystal display panel as Example 9 of this invention.

FIG. 14 is a cross-sectional view of an active driving type liquid crystal display panel according to this example.

Figure 27:
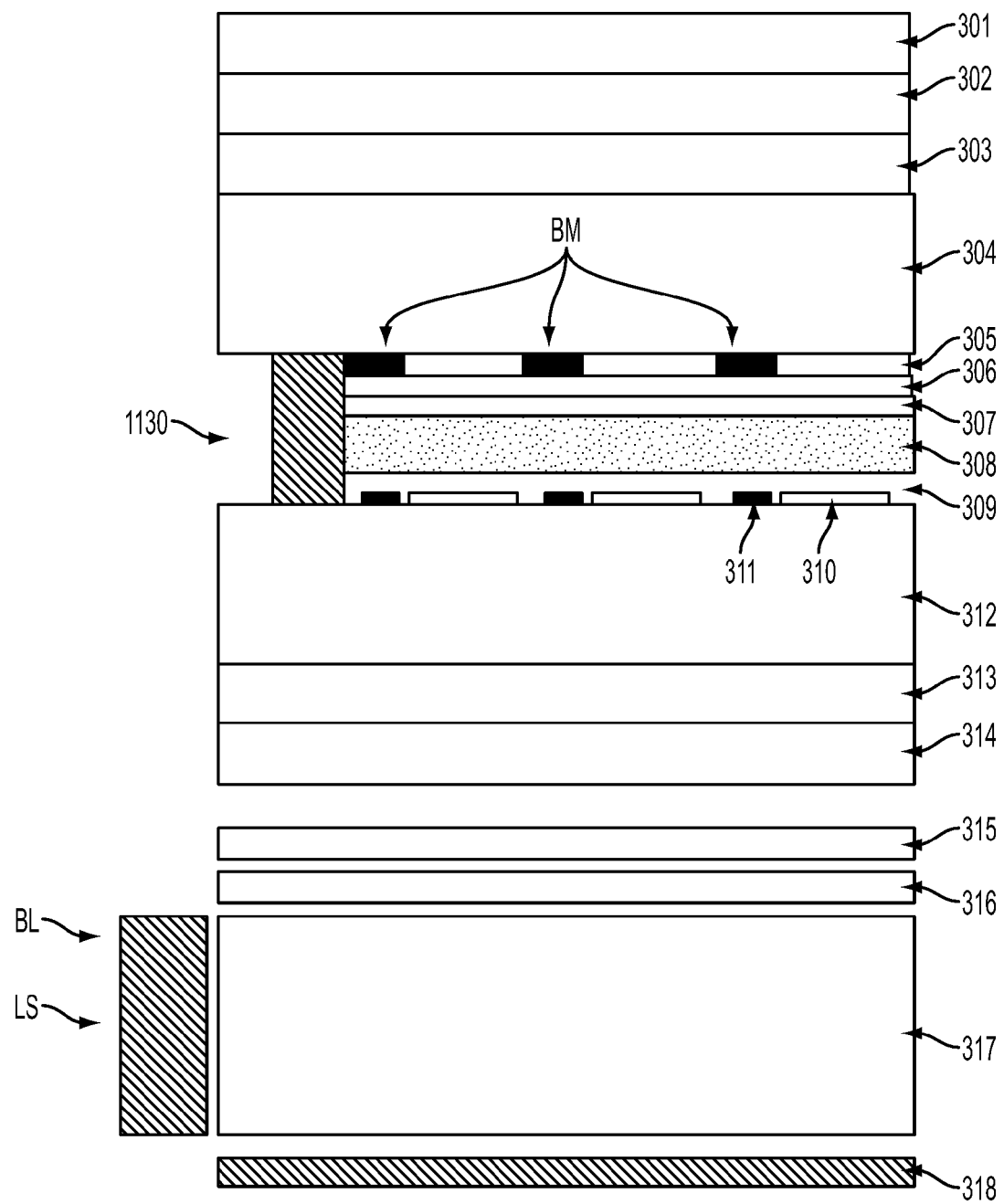
FIG. 27 is a cross-sectional structural view of a liquid-crystal panel according to the prior art.
Figure 29A:
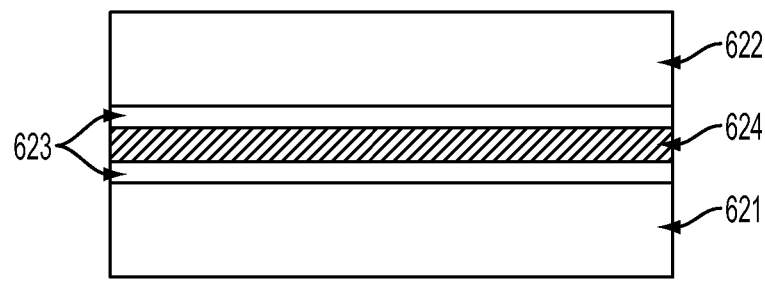
FIG. 29 is a cross-sectional structural view of a liquid-crystal panel according to the prior art.
Figure 29B:
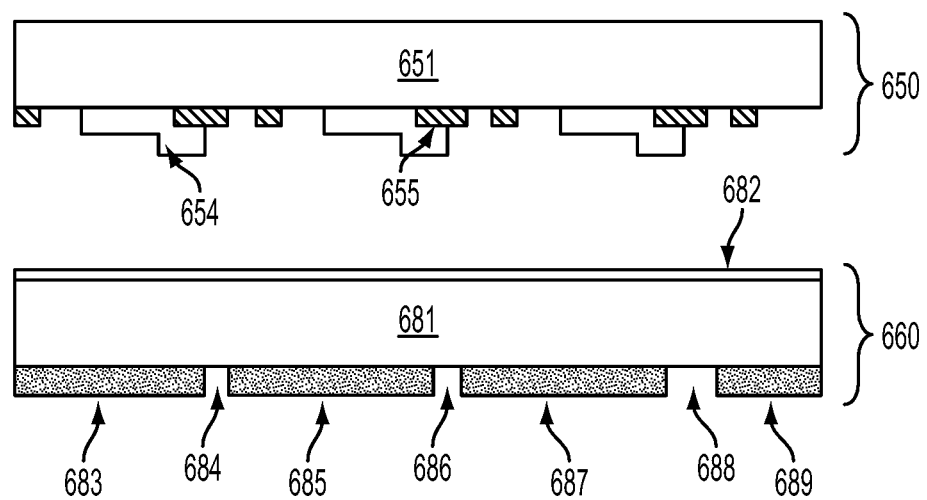

FIG. 14 shows a semi-transmissive liquid crystal display panel as described in terms of the prior art, except in contrast to FIG. 27, a backlight unit is a backlight using a light-condensing film in place of an LED light source and a glass substrate is a base film.

A liquid-crystal panel unit comprises functional films, i.e., a first, a second and a third functional films.

The first functional film has a configuration where a pixel electrode 360, a device layer 375 consisting of an interconnection and a thin-film transistor 361, and an oriented film are transferred on a base film 362 as described above. The second functional film has a configuration where a color filter 355, a transparent electrode 356 and an oriented film 357 are transferred on a base film 354 as described above. The third functional film has a configuration where at least in a light collector film, a light collector 366 and a supporting film 365 are transferred on a base film 368.

The retardation film 363 and the polarizing film 364 may be formed by transfer onto the transparent electrode 365 or onto the base film 362.

There will be described a method for transferring functional thin films to both sides of a base film with reference to FIG. 15.

On the device layer 375 formed on the base film 362 in the first functional film 372 were transferred the oriented film 359 formed on the second functional film 371. On the base film 362 in the first functional film 372 was transferred an optically functional thin film 376 consisting of a retardation film and a polarizing film formed on the third functional film 377.

Figure 15:
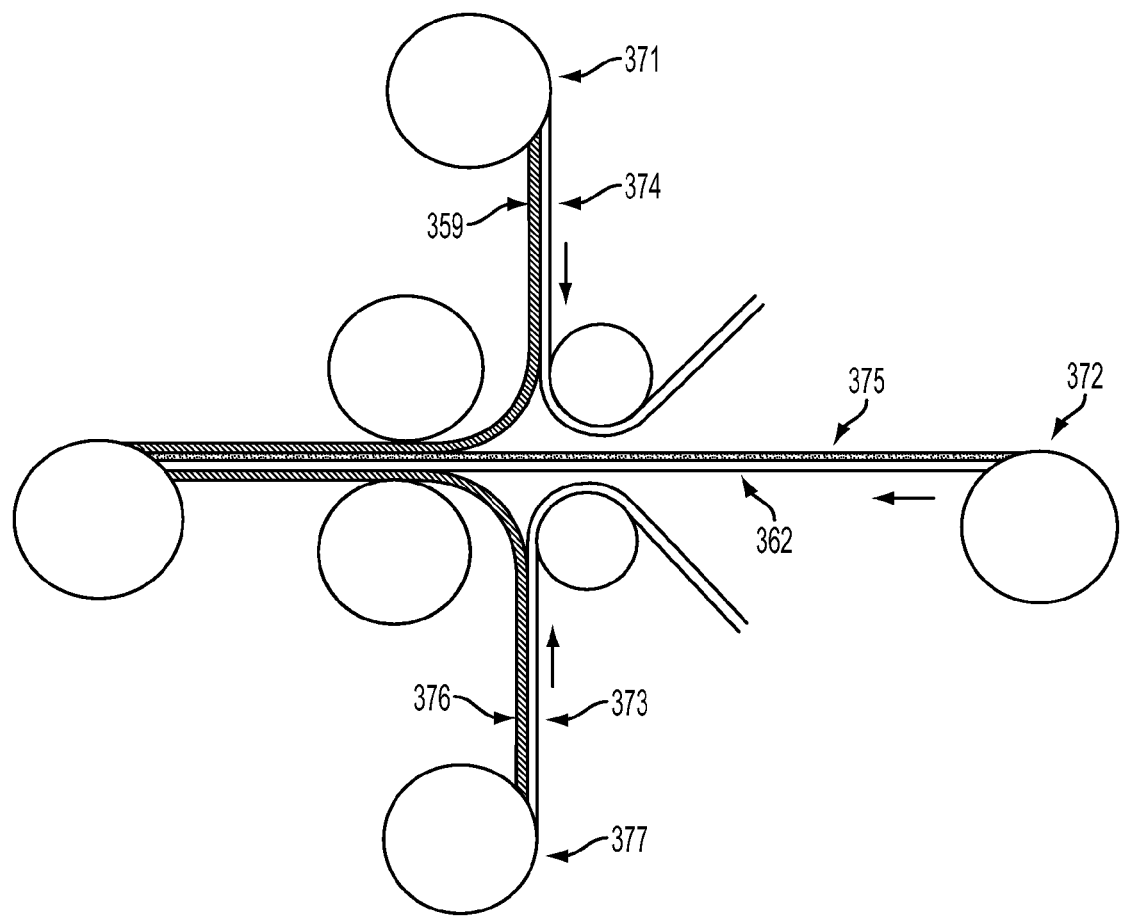
FIG. 15 shows a process for manufacturing a liquid-crystal panel.

In FIG. 15, there are not formed a cover film over the first, the second or the third functional film, but it may be formed.

The optically functional thin film 376 may be transferred on the matrix base 373 in any order. As described above for FIG. 3, it may transferred in the order according to the design.

The base film 362 in the configuration shown in FIG. 14 may be omitted by sequentially transferring a light-condensing film, an optically functional thin film, a pixel electrode and so forth on the base film 368.

Although the above structure is similar to that of the prior art shown in FIG. 14, a flexible base film is used as a substrate, so that the substrate may be thinner and softer. Thus, an impact can be absorbed by flexion of the substrate, resulting in significant improvement in impact resistance. The pixel electrode in FIG. 14 is semi-transparent and its surface has an irregularity by the prior art.

There will be detailed the active driving type liquid crystal display panel of Example 9 with reference to the drawings.

FIG. 16 is a cross-sectional view for describing a configuration of an active driving type liquid crystal display panel according to this invention. The active driving type liquid crystal display panel of this example has a configuration where a liquid crystal is sandwiched between a second functional film comprising a backlight and a first functional film comprising thin-film transistor as shown in the bottom part of FIG. 16. A thickness of both of the second functional film comprising a backlight and the first functional film comprising a thin-film transistor is about 0.2 mm.

As shown in FIG. 16, the first functional film comprises, in one surface of a plastic substrate (base film) to be a supporting substrate, a thin-film transistor circuit 402, a pixel electrode 403, a color filter 404 consisting of red, green and blue, a spacer A and an oriented film 405. In the other surface, a linearly-polarized light film and a retardation film are formed (not shown). Furthermore, the spacer may be suitably formed in the second functional film.

The second functional film B comprises a light collector 412, a supporting film 411, a reflection electrode 413, a polarizing film 410, a retardation film 409, a transparent counter electrode 408 facing the pixel electrode 403 in a liquid crystal device and an oriented film 407, where the oriented film 405 formed on the first functional film and the oriented film 407 formed on the functional film B are disposed facing each other and a liquid crystal 406 fills the space between them.

In the surfaces of the backlight and the functional film which is in contact with a liquid crystal, there is formed an oriented film for orienting the liquid crystal to a desired direction and a spacer A is provided in the lower side of the black matrix for keeping a distance between them constant.

A pitch of pixel electrodes in FIG. 16 depends on a resolution of the active driving type liquid crystal display panel. For example, for an active driving type liquid crystal display panel comprising three color filters of R (red), G (green) and B (blue) with a resolution of 200 ppi (pixEL per inch), a pitch of pixel electrodes is 25400 μm/200/3=42.3 μm.

The various layers in FIG. 16 may be formed with a film thickness as follows. The transparent electrode, the counter electrode and the pixel electrode comprises an ITO film with a thickness of 0.1 μm to 0.2 μm. The thin-film transistor and the interconnection are a polysilicon film and a metal film (generally, aluminum or an aluminum alloy), respectively, with a thickness of 0.1 μm to 0.2 μm. The backlight unit comprising a light-condensing film has a thickness of 0.4 mm to 0.6 mm including a thickness as a base film. The liquid crystal part has a thickness of 2 μm to 6 μm. The retardation film has a thickness of 0.5 μm to 10 μm (conventionally, 100 μm to 300 μm). The polarizing film has a thickness of 5 μm to 50 μm (conventionally, 100 μm to 250 μm). The oriented film has a thickness of 0.01 μm to 0.2 μm (conventionally, 0.04 μm to 2 µm). The color filter has a thickness of 1 µm to 3 µm (conventionally, 100 µm to 200 µm).

In this example, the transistor layer, the color filter, the polarizing film, the retardation film, the oriented film and the liquid crystal part could be formed in 0.5 µm, 2.5 µm, 8 µm, 7 µm, 0.1 µm and 6 µm, respectively. The base film used was an acrylic resin type film with a film thickness of 100 nm. The backlight used in the light-condensing film could be formed in about 470 µm. Thus, the liquid-crystal panel had a thickness of about 490 µm (0.49 mm) including the backlight. That is, the liquid-crystal panel could be formed with a reduced film thickness.

The liquid-crystal panel can be wounded-up into a roll with a radius of 40 mm. Thus, a nonconventional liquid-crystal panel was manufactured, which can be handled like a paper.

In this invention, film thicknesses of the color filter/the retardation film/the polarizing film/the oriented film can be significantly reduced in comparison with those in the prior art by modifying a manufacturing process and/or materials. Thus, a distance between the color filter and the reflection electrode can be adequately small in relation to the pixel electrode pitch of about 40 µm. In this example, the distance was reduced to 15 µm or less because the thicknesses were as follows: the liquid crystal part (3 µm), retardation film (3 µm), polarizing film (6 µm) and oriented film (0.01 µm).

As a result, in comparison with a semi-transmissive liquid crystal display panel, a reflectance in the reflection film can be comparable to a conventional reflective liquid crystal display panel, and a liquid crystal display panel can be prepared, which has a light efficiency of the backlight comparable to a conventional transmissive liquid crystal display panel.

Specifically, a liquid crystal display structure comprising a liquid crystal display panel of this example operates as a reflective liquid crystal display in a bright place by reflecting an outside light, while operating as a transmissive liquid crystal display in a dark place, using a backlight. Thus, a light efficiency can be improved in both outside light and rear light source in comparison with a conventional semi-transmissive liquid crystal display. Furthermore, in a bright place, it acts as a reflective liquid crystal display, so that it can provide an image comparable to a reflective liquid crystal display while in a dark place, a backlight intensity can be reduced, compared with a semi-transmissive liquid crystal display.

A liquid crystal display refers to a device displaying an image on the basis of image data input from the outside (for example, a device displaying an image on the basis of an image signal input from the outside like a display for a personal computer). An information terminal such as a television having display function, a notebook type personal computer, a cell phone and a PDP is distinguished from an electronic equipped with a liquid crystal display.

By providing a surface of a display device with an apparatus for monitoring an illumination intensity, a backlight can be OFF in a bright place, which contributes reduction in power consumption. In a mobile device driven by a battery such as a cell phone, a battery life can be effectively increased.

Furthermore, since a distance between a color filter and a reflection film can be adequately reduced in relation to an electrode pitch, there can be provided a novel liquid crystal display panel in which a light reflected by a reflection film does not enter a filter of another color and thus a light efficiency is not reduced.

There will be described a manufacturing process of this example with reference to the drawings.

Figure 17:
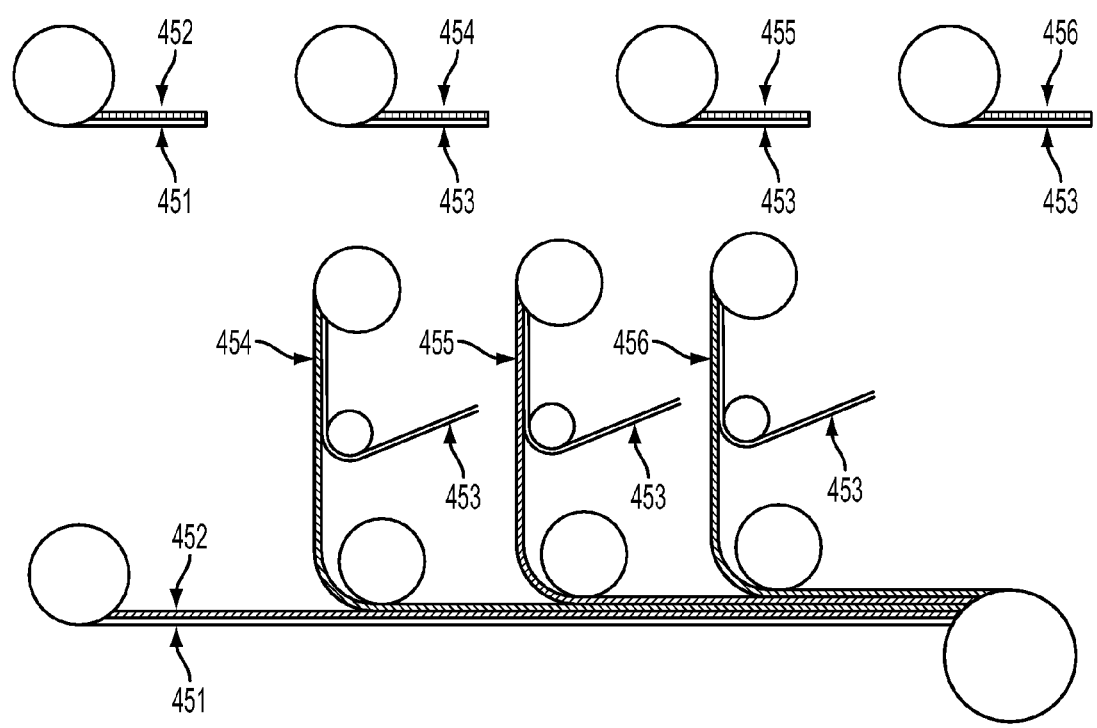
FIG. 17 is a conceptual view illustrating a process for manufacturing a liquid-crystal panel according to this invention.

A process for manufacturing a functional film A will be described with reference to FIG. 17. As shown in FIG. 17, first are prepared a first film comprising a transistor layer 452 on a base film 451, a second film comprising a color filter on a supporting film 453, a third film comprising a spacer on a supporting film 453 and a fourth film comprising an oriented film 456 on a supporting film 453. Then, the first film comprising the transistor layer is fed from a wind-off roll to a wind-up roll. In the course of the feeding, after peeling off the supporting film 453, a color filter formed 454 on the second film is transferred onto the transistor layer 452; then, after peeling off the supporting film 453, the spacer 455 on the third film is transferred onto the color filter 454; and finally, after peeling off the supporting film, the oriented film 456 on the fourth film is transferred onto the spacer, to form a functional film A.

A functional film B is, although being not shown, prepared as described for the functional film A. First, are prepared a fifth film comprising a reflection electrode on a base film, a sixth film comprising an organic light-emitting layer on a supporting film, a seventh film comprising a transparent electrode on a supporting film, an eighth film comprising a polarizing film on a supporting film, a ninth film comprising a retardation film on a supporting film and a tenth film comprising an oriented film on a supporting film. Next, the fifth film comprising the reflection electrode is fed from a wind-off roll to a wind-up roll. In the course of the feeding, after peeling off the supporting film 453, the organic light-emitting layer on the sixth film is transferred onto the reflection electrode; then, the transparent electrode on the seventh film is peeled off and transferred to the organic light-emitting layer; and the polarizing film on the eighth film is peeled off from the supporting film and transferred to the transparent electrode. After transferring the transparent electrode, a protective film for protecting an organic light-emitting layer made of an organic material is deposited by physical vapor deposition. The protective film may be made of an organic material or a mixture of an organic and an inorganic materials. Here, a protective film may be formed on a supporting film and then deposited on a transparent electrode using a transfer method described above.

Next, the phase difference formed on the ninth film is transferred onto the polarizing film, a transparent electrode is deposited on the retardation film by physical vapor deposition, the oriented film on the tenth film is transferred onto the transparent electrode to prepare a functional film B.

The oriented films formed on the functional films A and B are placed facing each other such that they forms a given angle, and then the space between the oriented films is filled with a liquid crystal to prepare a liquid-crystal panel.

There will be described operation of the panel according to this example with reference to FIG. 16.

First, there will be described operation as a transmissive liquid crystal display panel. A white light emitted from a backlight 414 consisting of a base film 413 as an optical guide and a light-condensing film 412 is non-polarized, but only one linearly-polarized light passes through a polarizing layer 410, to a liquid crystal layer 406. Here, an orientation state of liquid crystal molecules is controlled by the presence or the absence of an applied potential to the pixel electrode 403 as a transparent electrode. That is, in an extreme orientation state, a linearly-polarized light entering from the bottom of FIG. 16 passes through the liquid crystal layer as it is. A light at a wavelength within a particular range passes through the pixel electrode 403 consisting of the color filter 404 and the transparent electrode and then substantially completely absorbed by the polarizing layer 400. Therefore, the pixel develops black.

In contrast, in another extreme orientation state, a polarization state of a light passing through the liquid crystal layer 406 is changed and a light passing through the color filter 404 substantially totally passes through the polarizing layer 400. Therefore, this pixel most strongly develops a color determined by a color filter. In an orientation state between these extremes, a light partially passes through the layer, so that the pixel develops an intermediate color.

Here, when the color filter material is electrically conductive, a voltage applied to a transparent electrode in a pixel for applying a given voltage to the liquid crystal can be reduced. Therefore, the color filter material is desirably electrically conductive.

Next, there will be described a modification of Example 9 with reference to the drawings. Although in modification 1 of Example 9, a functional film A has a configuration that a thin-film transistor circuit and a color filter are sequentially transferred to a base film as shown in FIG. 16, a functional film prepared by sequentially transferring a color filter and a thin-film transistor may be used. FIG. 18 is a cross-sectional view showing a configuration of modification 1. A difference from that in FIG. 16 is positional relationship between the thin-film transistor and the color filter.

There will be described a configuration where a color filter is disposed in the liquid crystal side of the transparent electrode in the liquid crystal in the functional film 2 side where a backlight is to be formed, as modification 2 of Example 9.

Although the color filters 404 are disposed in the liquid crystal side in the functional film A in Example 9 and modification 1, these may be disposed in the backlight side of the functional film B. FIG. 17 shows modification 2 of Example 8. Difference from Example 9 and modifications 1 and 2 is that the color filters 404 are disposed in the functional film in the backlight side and in the liquid crystal side of the transparent electrode in the liquid crystal device.

Although being not shown, the various modifications can be, of course, prepared by the manufacturing process described in Example 10.

Although Example 9 shows coincidentally forming a backlight and a liquid crystal device in a functional film, films having various functions may be sequentially formed on a functional film. In particular, a functional film B in the backlight side comprises an organic EL device and a part of a liquid crystal device. Thus, the film have many functions such as a reflection electrode, a light-emitting layer, a transparent electrode, a sealing layer, polarizing function and a transparent electrode, leading to a longer manufacturing process. Continuous production using a roll-to-roll system may be advantageous in a production efficiency. However, since a pass rate in each production process is not 1, an yield of the functional film B in the backlight side is particularly reduced. For solving the problem, a plurality of film substrates are used and functions to be provided are distributed among these substrates instead of concentrating various functions to a single film substrate. That is, it is desirable to increase an yield by unitization.

There will be described forming an irregularity in a reflection electrode as Example 10 of this invention.

This example essentially comprises the steps of forming an irregularity on a substrate consisting of a base film or functional film and then forming a reflection film. The reflection film formed on the convexo-concave is provided as a diffuse reflection film by (1) forming the reflection film with a metal thin film. Here, the reflection film can be formed with a reduced film thickness or partially formed to give a semi-transparent film by which a light is transmitted/reflected in a desired ratio. (2) A desired semi-transparent film made of an insulating material other than a metal can be provided by making a refractive index difference between media for forming a reflective polarizing film and a light diffusing surface in place of using a metal film.

Transparency in a reflection film depends on a design of a liquid crystal. Semi-transparency is sometimes required, and any transparency is sometimes not required. When any transparency is not required, the film can be designed to have a transmittance of 0%.

The reflection film may be made of a material appropriately selected according to a wavelength range to be reflected; for example, a metal exhibiting a higher reflectance in a visible-light wavelength range of 300 nm to 800 nm, such as aluminum, gold and silver can be formed by an appropriate method such as vacuum deposition and sputtering. A known reflection-increasing film (see, for example, Kogaku Gairon 2 (Compendium of Optical Science Vol. II), Junpei Tsujiuchi, Asakura Book Co., 1976) can be deposited as described above. A thickness of the reflection film is preferably 0.01 μm to 50 μm. Only a necessary part in the reflection film may be patterned by, for example, photolithography or mask vapor deposition. A function as a semi-transparent and semi-reflective film can be controlled by adjusting a thickness of the reflection film or a numerical aperture in patterning depending on a desired transmittance.

Next, there will be described a light diffusing film providing a light diffusing function by its surface irregularity, as well as a method for forming an irregularity on the surface of the above substrate by the light diffusing film.

The reflection film may be provided with an irregularity by forming an energy-sensitive resin layer on a surface in the above substrate where the irregularity to be formed, irradiating the energy-sensitive resin layer with an active energy ray via a patterned mask or by a direct drawing method and then removing the exposed part or the unexposed part in the resin layer by a developing solution; by forming a thin film layer on the surface in which the irregularity to be formed and pressing a surface of a transfer mold onto the thin film layer for transferring; or alternatively, by depositing a thin film layer on a transfer mold and then transferring the thin film layer to a surface where the irregularity is to be formed.

First, there will be described a method for forming an irregularity from an energy-sensitive resin layer.

An energy-sensitive resin layer may be formed by, for example, roll coater application, spin coater application, spraying, dip coater application, curtain flow coater application, wire bar coater application, gravure coater application, air knife coater application and cap coater application. Thus, an energy-sensitive resin layer is applied on a surface where an irregularity is to be formed.

The patterned mask or the direct drawing pattern has a regular or irregular pattern consisting of an active energy ray blocking part and an active energy ray transmitting part, and has a distance between the active energy ray blocking part and the active energy ray blocking part or between the active energy ray transmitting part and the active energy ray transmitting part of preferably 1 μm to 50 μm, more preferably 5 μm to 20 μm.

There are no particular restrictions to a pattern shape; examples generally include a circle, an ellipse, a ring, a polygon, a curve, a straight line or a combination thereof. Examples of a light source for an active energy ray include a carbon arc lamp, an extra-high pressure mercury lamp, a high pressure mercury lamp, a xenon lamp, a metal halide lamp, a fluorescence lamp, a tungsten lamp and an excimer laser; preferably, a light source emitting a light at a wavelength of 436 nm or less. A dose of the active energy ray is preferably 0.01 J/cm² to 1 J/cm², more preferably 0.01 J/cm² to 0.5 J/cm², particularly preferably 0.05 J/cm² to 0.1 J/cm².

When the energy-sensitive resin layer is a negative type resin layer, the layer is irradiated with an active energy ray using a mask having a pattern consisting of an active energy ray blocking part for an area where the energy-sensitive resin layer is to be removed and an active energy ray transmitting part for the remaining area, and then the energy-sensitive resin layer is developed. Specifically, an unexposed part is removed completely or to a desired depth by spraying an aqueous solution containing an inorganic alkali or its salt such as sodium hydroxide, potassium hydroxide, sodium carbonate, potassium carbonate, sodium hydrogen carbonate, potassium hydrogen carbonate and sodium meta-silicate; or an organic base or its salt such as monoethanolamine, diethanolamine, triethanolamine, tetramethylammonium hydroxide, triethylamine and n-butylamine, or immersing in such an aqueous solution.

If necessary, all parts in an energy-sensitive negative type resin layer where an irregularity must be maintained are as a whole heated or irradiated with an active energy ray, to correct or fix the surface irregularity. Although there has been described an example with a negative type energy-sensitive resin layer, a composition of the energy-sensitive resin layer is not particularly restricted, and thus may be of a negative or a positive type.

On an energy-sensitive resin layer, a surface irregularity can be formed as described above, using, for example, a negative resist from Hitachi Chemical Co., Ltd. (CR-700). When the energy-sensitive resin layer is of a positive type represented by, for example, a positive resist from JSR Corporation (PC403), the above pattern can be inverted to form a similar surface irregularity.

Next, there will be described a process of forming a thin film layer on a surface where an irregularity is to be formed and pressing a transfer mold surface to the thin film layer as another aspect of this example.

The irregularity formed as described above can be used to prepare a transfer mold. Here, the mold has an inverse shape to the original surface irregularity. A surface shape after transferring using the transfer mold reflects the original surface shape, i.e., is identical to the original shape.

Alternatively, the shape obtained by the above surface irregularity forming process can be used as a direct transfer mold, whose surface irregular shape is then used as a mold for forming a transfer mold. Here, since transfer is conducted twice, the transfer mold has the surface irregularity identical to that in the original surface irregularity.

Alternatively, a thin film layer can be formed on a surface where an irregularity is to be formed, and then a transfer mold surface is pressed to the thin film layer for transferring, to form a surface irregularity.

Although methods for transferring a surface irregularity will not be specifically listed, such transfer can be also conducted by depositing a thin film layer on a transfer mold and then transferring the thin film to which a surface irregularity has been transferred, besides the method involving pressing a transfer mold to a thin film layer. Of course, transfer can be conducted by any of those described in the above embodiments and other examples.

A transfer mold used may have a structure where a plurality of fine surface concaves and convexes are formed in the whole surface or a desired part of a substrate material surface such as a sheet, a belt, a roll, a scroll or a partial curve of such a material. It may be laminated on a pressure device or sandwiched between a surface where a surface irregularity is to be formed and the pressure device. During the pressing step, heat or a light may be applied.

By seamlessly forming a belt, roll or scroll type transfer mold, a surface irregularity may be easily made seamless. A surface irregularity degree in the transfer mold should be generally designed, taking into consideration deformation during curing a transferred thin film layer. After curing, the thin film layer preferably has the following dimensions: a difference between a convex and a concave is 0.1 µm to 15 µm, particularly 0.1 µm to 5 µm; a convex pitch is 0.7 µm to 150 µm or a pixel pitch whichever smaller both inclusive, particularly 2 µm to 150 µm or a pixel pitch whichever smaller both inclusive.

Figure 19:
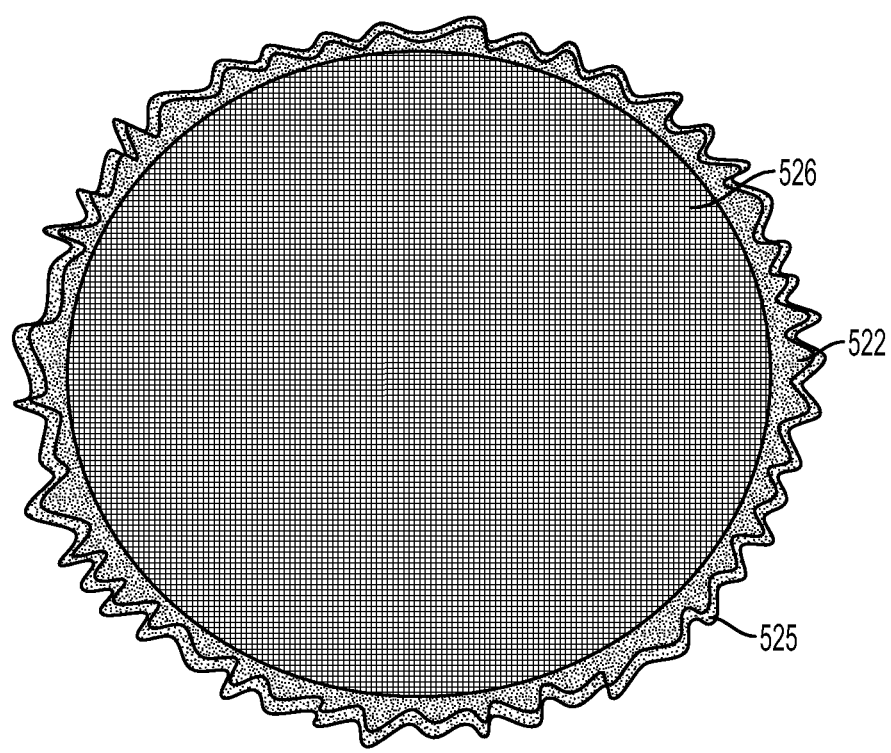
FIG. 19 is a cross-sectional view of a transfer roller for forming an irregularity in a thin film.
Figure 21:
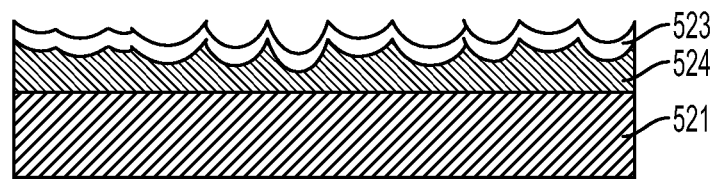
FIG. 21 is a cross-sectional view of a reflection film having a concave curve structure.

FIG. 19 shows a cross-sectional view of a transfer mold used for forming a surface irregularity and FIG. 21 is a cross-sectional view of an example of a functional film, which is comprised of a base film 521, an irregular film 522, a reflection film 523, a thin film layer 524, a chemically stable thin film 525 and a core 526.

Although being not shown, a surface irregularity may be formed on a metal belt surface, on which a film material may be applied to form an irregularity.

Figure 20:
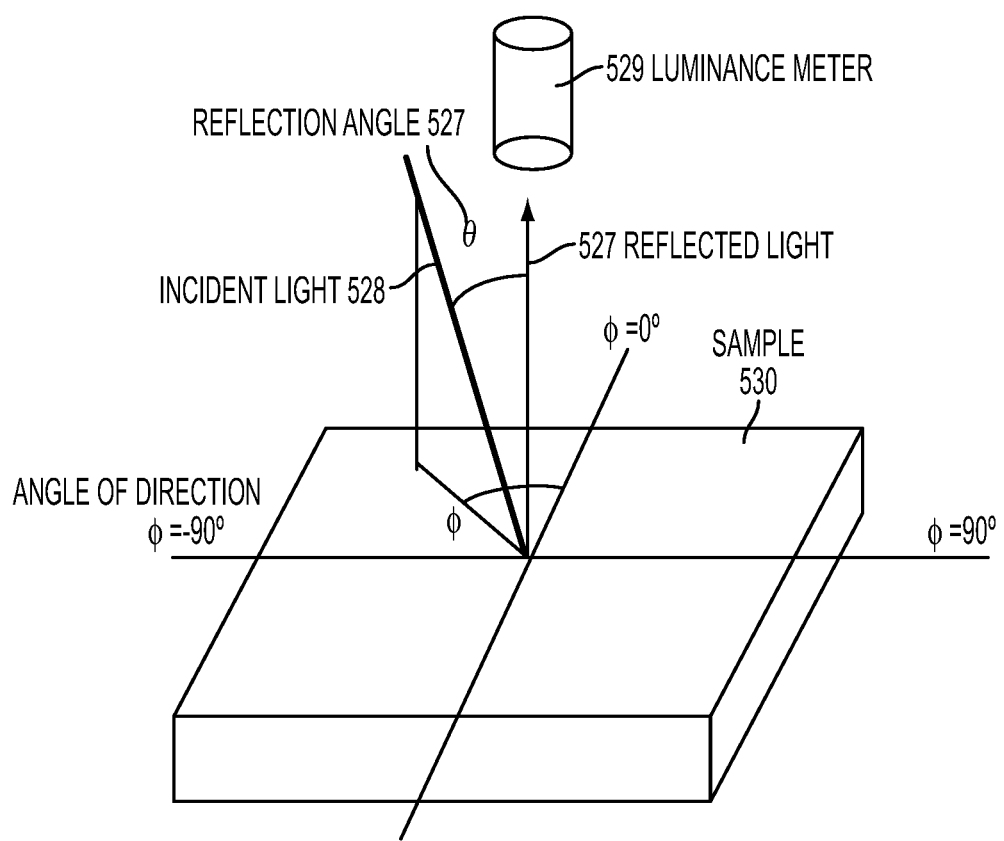
FIG. 20 shows an apparatus for measuring reflection properties.
Figure 22:
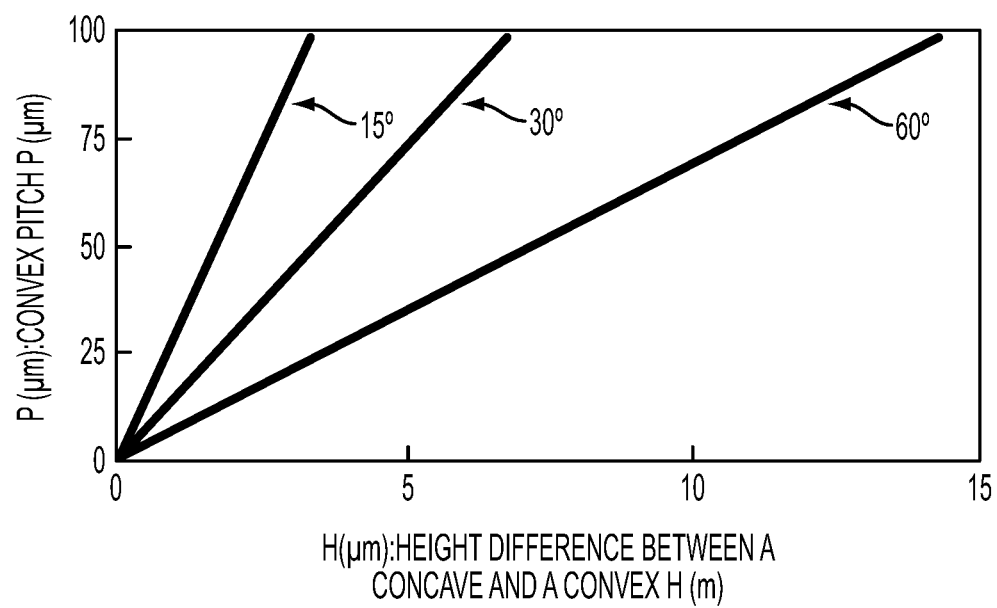
FIG. 22 shows a relationship between a pitch and a height in an irregularity indicating good properties of a reflection film having a concave curve structure.

FIG. 20 shows an apparatus for measuring reflection properties of a diffuse reflection film. Assuming that an angle formed between a reflected light 527 and an incident light 528 is θ, a diffuse reflection film exhibiting good reflection properties can be obtained by increasing a brightness, i.e., a reflection intensity observed in a normal line direction of the diffuse reflection film within a required range of θ. For the required θ range of −60° to 60°, in a diffuse reflection film whose surface irregularity is formed with the concave curve as shown in FIG. 21, a diffuse reflection film exhibiting good reflection properties can be obtained when a relationship between a height H of the concave and the convex and the pitch P of the convex is near a straight line represented by the equation P=7×H as shown in FIG. 22.

For θ of −15° to 15°, when it is near a straight line represented by the equation P=30×H, a diffuse reflection plate exhibiting good reflection properties can be obtained. This means that when attempting to obtain diffuse reflection to a normal line with a light source within a range of 60° and further attempting to obtain further strong diffuse reflection within a range of 15°, a shape combining the range near the two straight lines represented by the equations P=7×H and P=30×H may be acceptable. It is, of course, not necessary that all of concaves and convexes are contained in the above range near the two straight lines because a plurality of shapes are inevitably formed in the process for manufacturing the surface irregularity. Furthermore, influence of gap uniformity and light interference in the liquid crystal layer must be taken into consideration.

Therefore, assuming that a deformation rate in the thin film layer is "a", an irregularity degree of the transfer mold surface is preferably such that a height difference between a concave and a convex in a convex surface is 0.1×a µm to 15×a µm, particularly, 0.1×a µm to 5×a µm; a convex pitch is 0.7 µm to 150 µm or a pixel pitch whichever smaller both inclusive, further 2 µm to 150 µm or a pixel pitch whichever smaller. The value of "a" depends on a material for the thin film layer; for example, it may be 2, 1 or 0.7.

Figure 23:
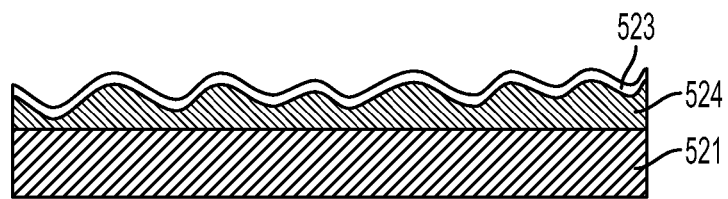
FIG. 23 is a cross-sectional view of a reflection film having concave-convex combined curve structure.
Figure 24:
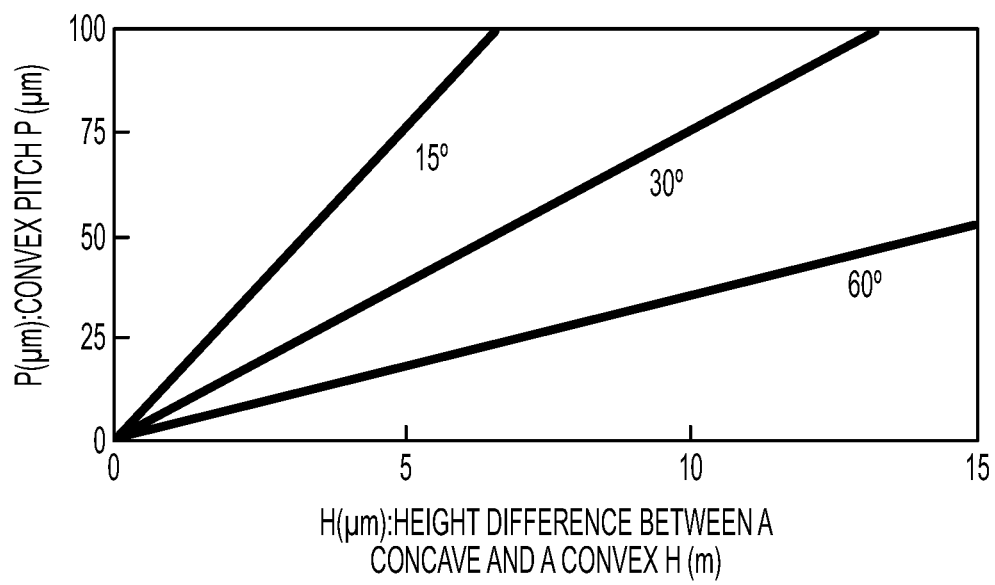
FIG. 24 shows a relationship between a pitch and a height in an irregularity indicating good properties of a reflection film having a concave-convex combined curve structure.

When the surface irregularity in the reflection film is formed by the concave/convex complex curve as shown in FIG. 23, reflection properties from a light source within 60° to a normal line are excellent in the case that a relationship between a height H of the concave and the convex shown in FIG. 24 and a convex pitch P is near a straight line represented by the equation P=3.5×H. It is not necessary that the surface irregularity is arranged periodically in plane, but it may be irregularly arranged.

In an LCD, moire may be generated when the period of the surface irregularity is inconsistent with the pixel pitch. The period of the irregularity is preferably equal to the pixel pitch or the pitch divided by an integer, or alternatively the irregularity is irregularly arranged. By arranging the irregularity in the transfer mold surface, it can be used in an LCD without moire as long as periodicity is deliberately provided.

There are no particular restrictions to the surface shape of the irregularity, but preferably selected from, besides a complex plane, a concave surface, a convex surface, a concave-convex complex surface, a concave or convex surface approximate to a sphere or paraboloid and a concave-convex surface, because by using a curved surface, a diffused light may be obtained from a light source position within a wider range.

In particular, for a diffuse reflection film for a semi-transparent and semi-reflective type LCD, a smaller average height difference H is preferable in the light of a cell gap and Δnd (refractive index (thickness) because a light diffusing surface must be formed within the LCD cell. However, since a convex pitch P cannot be so reduced to generate optical interference, the lower limit of an average height difference H is determined from the above equation for P and H. Hereinafter, θ is an absolute value for better understanding.

A refractive index "n" of an LCD cell depends on its structure; for example, a diffusion direction E required when n=1.3 is a range of less than 50.3°. With a diffusion direction of 50.3° or more, total reflection occurs in an interface between the LCD cell and the air. Therefore, it is necessary to reduce a reflection intensity R in a diffusion direction of 50.3° or more while increasing a reflection intensity R of less than 50.3°. For example, a diffusion direction θ required when n=1.5 is a range of less than 41.8°. In a diffusion direction of 41.8° or more, total reflection occurs in an interface between the LCD cell and the air. Therefore, it is necessary to reduce a reflection intensity R in a diffusion direction of 41.8° or more while increasing a reflection intensity R of less than 41.8°.

In general, a viewer watches an LCD at the front. Here, incident light is less from the direction of the eye to the LCD while being more from a direction of 10° or more from the eye to the LCD. For example, when n=1.5, incident light from the air at 22.8° becomes a light of 15° after passing through an interface between the LCD cell and the air. Therefore, it is necessary to particularly increase a reflection intensity R near a direction of θ=15° of the diffuse reflection film formed within the LCD cell.

For example, when n=1.3, incident light from the air at 19.7° becomes a light of 15° after passing through an interface between the LCD cell and the air. Therefore, it is necessary to particularly increase a reflection intensity R near a direction of θ=15° of the diffuse reflection film formed within the LCD cell. For manufacturing a light diffusion surface used for a diffuse reflection film for a reflection type LCD, it is necessary to design an average height difference H and a pitch P by producing an equation in the light of the above reflection intensity properties.

A transfer mold can be manufactured by pressing a direct transfer mold to a deformable supporting film. A temporary supporting film can be a supporting film formed by the steps of forming a deformable undercoating layer, to which a direct transfer mold is pressed and curing, if necessary, the undercoating layer. During the step of pressing, heat or a light may be applied.

When forming a thin-film flat light emitting device or liquid crystal device such as an organic EL device and an inorganic EL device on a reflection film, the surface of the reflection film must be flat.

As described above, for the purpose of this, a reflection film comprising a surface irregularity can be deposited on a substrate consisting of a base film or functional film and then a flattening film can be laminated.

Figure 25:
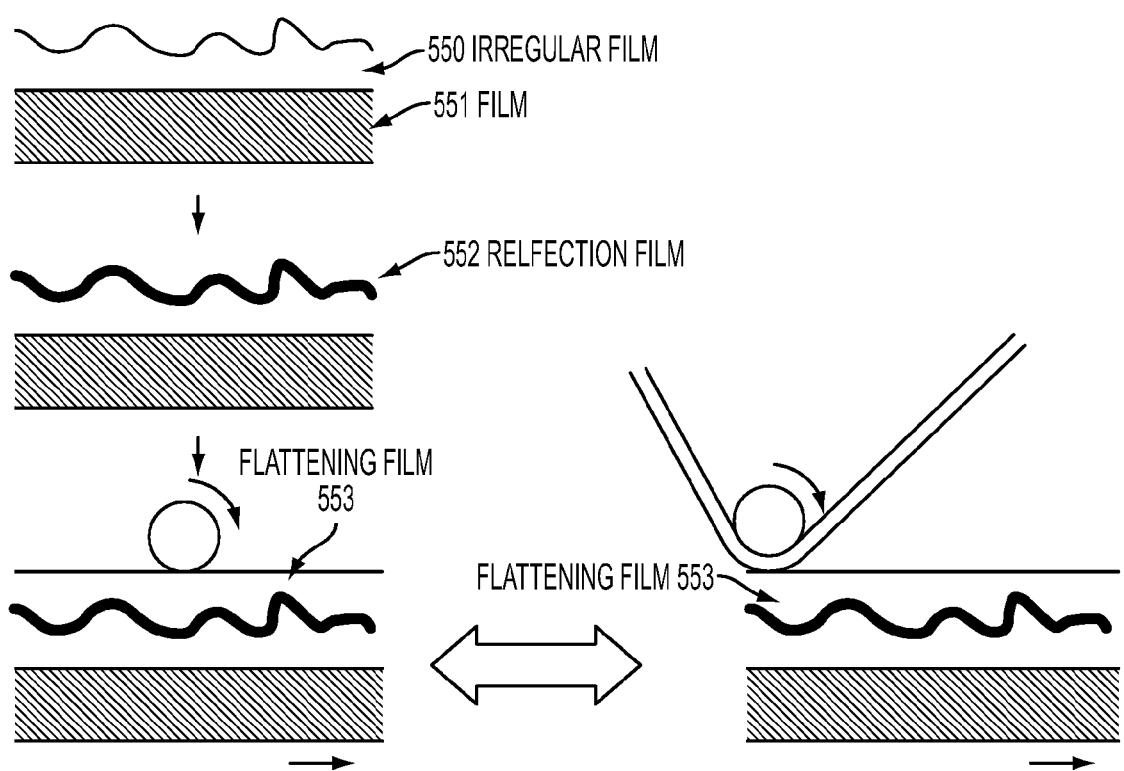
FIG. 25 shows a method for flattening a surface of a reflection film having an irregular surface.

This example will be described with reference to FIG. 25. A surface irregularity is formed on a substrate consisting of a base film or a functional film as described above. The surface irregularity may be formed by forming an energy-sensitive resin layer on a surface in the above substrate where the irregularity to be formed, irradiating the energy-sensitive resin layer with an active energy ray via a patterned mask or by a direct drawing method and then removing the exposed part or the unexposed part in the resin layer by a developing solution; by forming a thin film layer on the surface in which the irregularity to be formed and pressing a surface of a transfer mold onto the thin film layer for transferring; or alternatively, by depositing a thin film layer on a transfer mold and then transferring the thin film layer to a surface where the irregularity is to be formed. Then, a reflection film is formed, which can be also formed as described above without any problems.

Finally, a flattening film is deposited on the reflection film. The flattening film can be deposited by, for example, application, lamination or transfer. This figure shows examples of both lamination and transfer.

It is necessary that a surface in the flattening film to be in contact with the surface irregularity is deformed along with the shape of the surface irregularity, while the opposite side to the surface to be in contact with the surface irregularity is flat. There are no particular restrictions to its material as long as the above function can be achieved; thus, for example, an organic resin can be used.

A reflection film may be formed by preliminarily forming a reflection thin film on a surface irregularity in a transfer mold, depositing a thin film layer and then transferring the thin film layer to a surface in which an irregularity is to be formed.

A flattened layer consisting of a reflection film and an undercoating layer may be formed by preliminarily forming a reflection thin film on a surface irregularity in a transfer mold comprising an undercoating layer, depositing a thin film layer and transferring the thin film layer to a surface in which an irregularity is to be formed.

The undercoating layer may be made of, for example, at least one organic polymer selected from polyolefins such as polyethylene and polypropylene; ethylene copolymers such as those of ethylene and vinyl acetate, ethylene and an acrylate, ethylene and vinyl alcohol; polyvinyl chloride; copolymers of vinyl chloride and vinyl acetate; copolymers of vinyl chloride and vinyl alcohol; polyvinylidene chloride; polystyrene; styrene copolymers such as those of styrene and (meth)acrylate; polyvinyl toluene; vinyl toluene copolymers such as those of vinyl toluene and (meth)acrylate; poly(meth)acrylate; (meth)acrylate copolymers such as those of butyl(meth)acrylate and vinyl acetate; cellulose derivatives such as cellulose acetate, nitrocellulose and cellophane; polyamides; polystyrene; polycarbonates; polyimides; polyesters; synthetic rubbers; and cellulose derivatives.

If necessary, for curing the film after forming the surface irregularity, an additive such as a photoinitiator and a monomer having an ethylenic double bond may be preliminarily added. Alternatively, photosensitivity of the material may be negative or positive.

A temporary supporting film used in this invention may be made of a chemically and thermally stable material which can be formed into a sheet or plate. Examples include polyolefins such as polyethylene and polypropylene; polyhalogenated vinyls such as polyvinyl chloride and polyvinylidene chloride; cellulose derivatives such as cellulose acetate, nitrocellulose and cellophane; polyamides; polystyrene; polycarbonates; polyimides; polyesters; and metals such as aluminum and copper. Among these, particularly preferred is a biaxially stretched polyethylene terephthalate which is dimensionally stable.

Although a thin film layer may be made of, for example, a composition comprising a deformable organic polymer, an inorganic compound or a metal, preferably an organic polymer composition which can be applied on a film and wound-up as a film is used. Furthermore, if necessary, to the material, additives such as dyes, organic pigments, inorganic pigments, powders and their composites may be added alone or in combination.

The thin film layer may be made of a photosensitive resin composition or a thermosetting resin composition. There are no particular restrictions to a dielectric constant, a hardness, a refractive index and a spectral transmittance of the thin film layer.

Among these, preferred are those exhibiting good adhesiveness to a film and good peelability from a film. Examples of a material which can be used include polyolefins such as acrylic resins, polyethylene and polypropylene; polyhalogenated vinyls such as polyvinyl chloride and polyvinylidene chloride; cellulose derivatives such as cellulose acetate, nitrocellulose and cellophane; polyamides; polystyrenes; polycarbonates; polyimides; and polyesters. Alternatively, those exhibiting photosensitivity may be used. Optionally, a photosensitive resin which can be developed by, for example, an alkali, can be used for removing an unnecessary part while leaving a part where the surface irregularity must be present. For improving heat resistance, solvent resistance and shape stability, a resin composition curable by heat or a light after forming the surface irregularity may be used. Furthermore, an additive such as a coupling agent and an adhesiveness-endowing agent may be added to improve adhesiveness to a film. For improving adhesiveness, an adhesiveness-endowing agent may be applied to an adhering surface in a film or thin film layer.

A resin which can be developed by an alkali is preferably selected from those having an acid number of 20 to 300 and a weight average molecular weight of 1,500 to 200,000; preferable examples include copolymers of a styrene monomer and maleic acid or their derivatives (hereinafter, referred to as an "SM polymer"), and copolymers of a carboxyl-containing unsaturated monomer such as acrylic acid and methacrylic acid with a monomer such as styrene monomers, alkyl methacrylates (e.g., methyl methacrylate, t-butyl methacrylate and hydroxyethyl methacrylate) and alkyl acrylates having a similar alkyl group.

Examples of an SM copolymer include those prepared by copolymerizing a styrene or its derivative (styrene monomer) such as styrene, (-methylstyrene, m- or p-methoxy styrene, p-methylstyrene, p-hydroxystyrene and 3-hydroxymethyl-4-hydroxy-styrene with a maleic acid derivative such as maleic anhydride, maleic acid, monomethyl maleate, monoethyl maleate, mono-n-propyl maleate, mono-iso-propyl maleate, n-butyl maleate, mono-iso-butyl maleate and mono-tert-butyl maleate (hereinafter, referred to as "copolymer (I)"). Copolymer (I) may include a copolymer (I) modified by a compound having a reactive double bond such as an alkyl methacrylate (e.g., methyl methacrylate and t-butyl methacrylate) (copolymer (II)).

The above copolymer (II) can be prepared by reacting an acid anhydride or carboxyl group in copolymer (I) with an unsaturated alcohol such as allyl alcohol, 2-butan-1,2-ol, furfuryl alcohol, oleyl alcohol, cinnamyl alcohol, 2-hydroxyethyl acrylate, hydroxyethyl methacrylate and N-methylolacrylamide and an epoxy compound having one oxirane ring and one reactive double bond such as glycidyl acrylate, glycidyl methacrylate, allyl glycidyl ether, (-ethylglycidyl acrylate and monoalkyl-monoglycidyl itaconate. Here, it is necessary that a carbonyl group required for alkali development remains in the copolymer. In the light of photosensitivity, it is also preferable to endow a polymer other than an SM polymer which has a carboxyl group, with a reactive double bond as described above.

By forming a thin film layer and/or an undercoating layer to a film thickness larger than a height difference in a transfer mold having a surface irregularity, the surface irregularity can be readily reproduced. If the film thickness is equal or smaller than the difference, a surface irregularity may be deformed, and furthermore, during forming a surface irregularity, a thin film layer is broken in a convex in the transferred surface irregularity, leading to formation of a flat part which may result in insufficiently efficient reflection properties.

The thin film layer and the undercoating layer may be formed by, for example, roll coating, spin coating, spraying, wheeler coating, dip coating, curtain flow coating, wire bar coating, gravure coating, air knife coating or cap coating.

When a surface irregularity is transferred using a negative type photosensitive resin as the thin film layer, its shape stability is ensured by curing its photosetting part by exposure using a light-emitting apparatus. Examples of an applicable light-emitting apparatus include a carbon arc light, an extra-high pressure mercury lamp, a high-pressure mercury-vapor lamp, a xenon lamp, a metal halide lamp, a fluorescence lamp, a tungsten lamp and an excimer laser. The light-emitting apparatus may be selected from those for forming a pattern such as pixels and BM, as long as it can cure a preformed irregularity. Thus, an apparatus which can emit a light quantity equal to or more than the quantity which can initiate a photosensitive resin. Therefore, a UV-irradiating apparatus using a scattered light can be used, which can be incorporated in a line generally used as a substrate washing machine. Such a machine can be used to form the film with a lower cost and a larger allowance in an exposure in comparison with a procedure using a photomask. Although a material whose photosensitivity is negative has been used above, it may be of a positive type.

Exposure is conducted before or after peeling off the transfer mold. Furthermore, if necessary, the irregularity may be cured by heating preferably at 50 to 250° C. Heating is conducted after peeling off the transfer mold.

Figure 26:
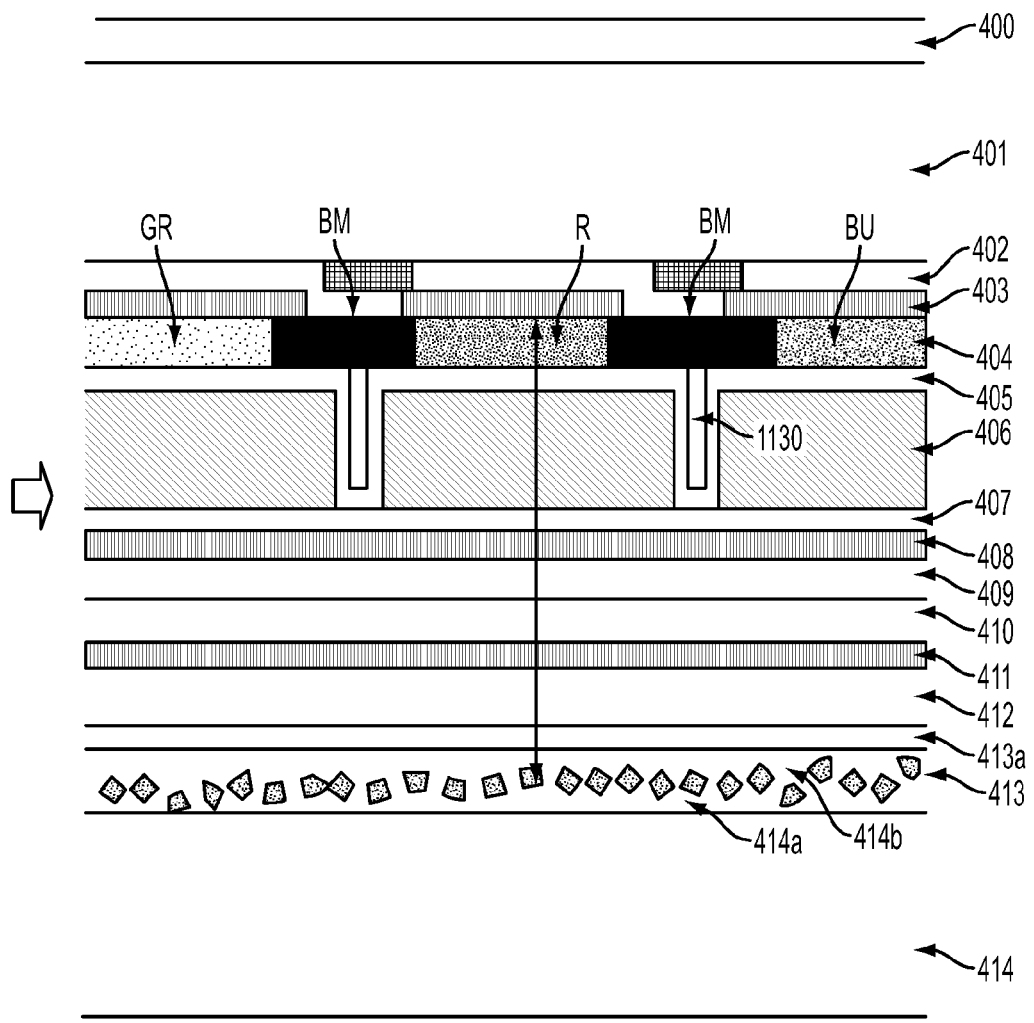
FIG. 26 is a structure cross-sectional view of a liquid-crystal panel comprising a reflection film having an irregular surface.

FIG. 26 shows a liquid crystal structure having the reflection electrode with an irregular shape described in Example 10.

In FIG. 26, a reflection electrode is formed on a base film in an irregular shape. In this figure, on a base film 414 is transferred an irregular film 414a, on whose surface is then formed a reflection electrode 413 and a transparent electrode is formed on a flattening film 414b for flattening.

An organic EL device has a structure shown in FIG. 7C. Although being not shown, it may have the same liquid crystal structure as that in the prior art. For the purpose of this invention, it can, of course, have a variety of structures.

What is claimed is:

1. A process for manufacturing a light-condensing layered film,
the light-condensing layered film comprising
a light-condensing film and a long light-guiding film, the light-condensing film comprising an array of light collectors, the array of light collectors comprising an organic resin, the array of light collectors being disposed on a long light-diffusing film with a flexibility of 40 mm or less of a curvature radius and a coefficient of thermal expansion of 50 ppm/.degree. C. or less; the array of light collectors comprising a first surface and a second surface opposed to the first surface, the second surface contacting the long light diffusing film, the first surface being flat and having a smaller area than the second surface; wherein the long light-guiding film is laminated on the surface facing the light diffusing film in the light collector in the light-condensing film;

the process comprising the steps of:
filling a first irregularity in a support corresponding to a second irregularity for the array of light collectors with the organic resin to form the second irregularity made of the organic resin for the array of light collectors;
transferring the second irregularity made of the organic resin from the support to the long light-diffusing thin film to form the array of light collectors, the array of light collectors; and
laminating the long light-guiding film on the second surface of the array of light collectors exposing the second irregularity.

2. The process for manufacturing a light-condensing layered film as claimed in claim 1, wherein the transferring step comprises curing the organic resin in the form of the first irregularity under pressure.

* * * * *